US010986817B2

(12) United States Patent
Singh et al.

(10) Patent No.: US 10,986,817 B2
(45) Date of Patent: Apr. 27, 2021

(54) METHOD AND SYSTEM FOR TRACKING HEALTH IN ANIMAL POPULATIONS

(71) Applicant: Pixobot, Inc., Lincoln, NE (US)

(72) Inventors: Vishal Singh, Lincoln, NE (US); Brian Schupbach, Lincoln, NE (US); Andrew Uden, Lincoln, NE (US); Aaron Mathankeri, Lincoln, NE (US); Adam Sonty, Lincoln, NE (US); Alex Heine, Lincoln, NE (US); Colton Franco, Lincoln, NE (US); Paul Hoffmeyer, Walton, NE (US); Jacob Armstrong, Lincoln, NE (US); Matt Leacock, Lincoln, NE (US); Spencer Kelle, Lincoln, NE (US); Perry Howell, Lincoln, NE (US)

(73) Assignee: INTERVET INC., Madison, NJ (US)

( * ) Notice: Subject to any disclaimer, the term of this patent is extended or adjusted under 35 U.S.C. 154(b) by 120 days.

(21) Appl. No.: 16/108,000

(22) Filed: Aug. 21, 2018

(65) Prior Publication Data
US 2019/0053470 A1 Feb. 21, 2019

Related U.S. Application Data

(63) Continuation-in-part of application No. 15/366,920, filed on Dec. 1, 2016, which is a continuation-in-part
(Continued)

(51) Int. Cl.
*A01K 29/00* (2006.01)
*A01K 11/00* (2006.01)

(52) U.S. Cl.
CPC .......... *A01K 29/005* (2013.01); *A01K 11/004* (2013.01); *A01K 11/006* (2013.01)

(58) Field of Classification Search
CPC .. A01K 11/004; A01K 11/006; A01K 29/005; H04W 24/00; H04W 24/10; H04W 56/00; H04W 56/0005; H04W 56/0015
See application file for complete search history.

(56) References Cited

U.S. PATENT DOCUMENTS

| 85,575 A | 1/1869 | Drake |
| 377,588 A | 2/1888 | Walsh, Jr. |

(Continued)

FOREIGN PATENT DOCUMENTS

| AU | 199534570 | 10/1994 |
| AU | 2003239832 | 5/2002 |

(Continued)

OTHER PUBLICATIONS

AU Office Action dated Sep. 19, 2017 for Australian Patent Application No. 2016266101.
(Continued)

*Primary Examiner* — Daniel L Cerioni
*Assistant Examiner* — Raymond P Dulman

(57) ABSTRACT

An animal health monitoring system includes a plurality of animal tag assemblies configured for being disposed on members of an animal population, each of the animal tag assemblies including one or more sensors configured to measure one or more animal characteristics of a member of the animal population. The system includes a concentrator communicatively coupled to the plurality of animal tag assemblies and configured to acquire one or more animal characteristics from the plurality of animal tag assemblies. The system includes a controller communicatively coupled to the concentrator and configured to receive the acquired one or more animal characteristics from the plurality of animal tag assemblies from the concentrator, determine a health state of one or more of the members of the animal population based on the received one or more animal
(Continued)

characteristics, and report the determined health state to one or more user devices.

24 Claims, 26 Drawing Sheets

Related U.S. Application Data of application No. 15/212,091, filed on Jul. 15, 2016, now abandoned, which is a continuation-in-part of application No. 14/958,829, filed on Dec. 3, 2015, now abandoned, which is a continuation-in-part of application No. 14/847,930, filed on Sep. 8, 2015, now abandoned, said application No. 15/366,920 is a continuation-in-part of application No. PCT/US2015/049006, filed on Sep. 8, 2015.

(60) Provisional application No. 62/046,702, filed on Sep. 5, 2014, provisional application No. 62/110,230, filed on Jan. 30, 2015, provisional application No. 62/184,158, filed on Jun. 24, 2015, provisional application No. 62/214,568, filed on Sep. 4, 2015, provisional application No. 62/549,358, filed on Aug. 23, 2017.

(56) References Cited

U.S. PATENT DOCUMENTS

| | | | |
|---|---|---|---|
| 584,121 A | 6/1897 | Sanders | |
| 818,783 A | 4/1906 | Philippi | |
| 823,079 A | 6/1906 | Rais | |
| 1,016,752 A | 2/1912 | Leith | |
| 1,188,510 A | 6/1916 | Timson | |
| 1,364,137 A | 1/1921 | Pannier | |
| 1,759,400 A | 5/1930 | Hobbs | |
| 1,843,314 A | 2/1932 | Berntson et al. | |
| 1,863,037 A | 6/1932 | Archbold | |
| 2,078,827 A | 4/1937 | Ketchum | |
| 2,420,020 A | 5/1947 | Snell | |
| 2,553,400 A | 5/1951 | Blair | |
| 2,570,048 A | 10/1951 | Cooke et al. | |
| 3,091,770 A | 6/1963 | McMurray et al. | |
| 3,261,243 A | 7/1966 | Ellison | |
| 3,596,541 A | 8/1971 | Bieganski | |
| 3,812,859 A | 5/1974 | Murphy et al. | |
| 3,884,100 A | 5/1975 | Fideldy | |
| 3,981,209 A | 9/1976 | Caroff | |
| 4,120,303 A | 10/1978 | Villa-Massone et al. | |
| 4,121,591 A | 10/1978 | Hayes | |
| 4,281,657 A | 8/1981 | Ritchey | |
| 4,323,183 A | 4/1982 | Duchin | |
| 4,497,321 A | 2/1985 | Fearing et al. | |
| 4,516,577 A | 5/1985 | Scott et al. | |
| 4,531,520 A | 7/1985 | Reggers et al. | |
| 4,552,147 A | 11/1985 | Gardner | |
| 4,612,877 A * | 9/1986 | Hayes | A01K 11/006 |
| | | | 119/655 |
| 4,666,436 A | 5/1987 | McDonald et al. | |
| 4,672,966 A | 6/1987 | Haas, Jr. | |
| 4,696,119 A | 9/1987 | Howe et al. | |
| 4,716,899 A | 1/1988 | Huenefeld et al. | |
| 4,819,639 A | 4/1989 | Gardner | |
| 4,821,683 A | 4/1989 | Veldman | |
| 4,878,302 A | 11/1989 | Jowsey | |
| 4,943,294 A | 7/1990 | Knapp | |
| 5,022,253 A | 6/1991 | Parlatore | |
| 5,056,385 A | 10/1991 | Petersen | |
| 5,141,514 A | 8/1992 | van Amelsfort | |
| 5,154,721 A | 10/1992 | Perez | |
| 5,267,464 A | 12/1993 | Cleland | |
| 5,509,291 A | 4/1996 | Nilsson et al. | |
| 5,651,791 A | 7/1997 | Zavlodaver et al. | |
| 5,778,820 A | 7/1998 | van der Lely et al. | |
| 6,007,548 A | 12/1999 | Ritchey | |
| 6,016,769 A | 1/2000 | Forster | |
| 6,043,748 A | 3/2000 | Touchton et al. | |
| 6,053,926 A | 4/2000 | Luehrs | |
| 6,095,915 A | 8/2000 | Battista et al. | |
| 6,099,482 A | 8/2000 | Brune et al. | |
| 6,100,804 A | 8/2000 | Brady et al. | |
| 6,113,539 A * | 9/2000 | Ridenour | A61B 5/0002 |
| | | | 128/903 |
| 6,114,957 A | 9/2000 | Westrick et al. | |
| 6,145,225 A | 11/2000 | Ritchey | |
| 6,166,643 A | 12/2000 | Janning et al. | |
| 6,172,640 B1 | 1/2001 | Durst et al. | |
| 6,232,880 B1 | 5/2001 | Anderson et al. | |
| 6,235,036 B1 | 5/2001 | Gardner et al. | |
| 6,271,757 B1 | 8/2001 | Touchton et al. | |
| 6,297,739 B1 | 10/2001 | Small | |
| 6,310,553 B1 | 10/2001 | Dance | |
| 6,402,692 B1 | 6/2002 | Morford | |
| 6,497,197 B1 | 12/2002 | Huisma | |
| 6,502,060 B1 | 12/2002 | Christian | |
| 6,510,630 B1 | 1/2003 | Gardner | |
| 6,535,131 B1 | 3/2003 | Bar-Shalom et al. | |
| 6,569,092 B1 | 5/2003 | Guichon et al. | |
| 6,659,039 B1 | 12/2003 | Larsen | |
| 6,868,804 B1 | 3/2005 | Huisma et al. | |
| 7,016,730 B2 | 3/2006 | Ternes | |
| 7,046,152 B1 | 5/2006 | Peinetti et al. | |
| 7,137,359 B1 | 11/2006 | Braden | |
| 7,296,539 B2 | 11/2007 | Iljas | |
| 7,380,518 B2 | 6/2008 | Kates | |
| 7,690,141 B2 | 4/2010 | Steinfort et al. | |
| 7,705,736 B1 | 4/2010 | Kedziora | |
| 7,843,350 B2 | 11/2010 | Geissler et al. | |
| 7,937,861 B1 | 5/2011 | Zacher | |
| 8,005,624 B1 | 8/2011 | Starr | |
| 8,266,990 B1 | 9/2012 | Janson | |
| 8,305,220 B2 | 11/2012 | Gibson | |
| 8,478,389 B1 | 7/2013 | Brockway et al. | |
| 8,622,929 B2 | 1/2014 | Wilson et al. | |
| 8,763,557 B2 | 7/2014 | Lipscomb et al. | |
| 8,955,462 B1 | 2/2015 | Golden et al. | |
| 9,215,862 B2 | 12/2015 | Bladen et al. | |
| 9,370,170 B2 | 6/2016 | Downing et al. | |
| 9,392,767 B2 | 7/2016 | Talt et al. | |
| 9,392,946 B1 | 7/2016 | Sarantos et al. | |
| 9,449,487 B1 | 9/2016 | Spitalny | |
| 9,648,849 B1 | 5/2017 | Vivathana | |
| 9,654,925 B1 | 5/2017 | Solinsky et al. | |
| 9,693,536 B1 | 7/2017 | Dana | |
| 9,717,216 B1 | 8/2017 | Schlachta et al. | |
| 9,743,643 B1 | 8/2017 | Kaplan et al. | |
| 9,848,577 B1 | 12/2017 | Brandao et al. | |
| 9,861,080 B1 | 1/2018 | Hathway et al. | |
| 10,021,857 B2 | 7/2018 | Bailey et al. | |
| 10,039,263 B2 | 8/2018 | Teychene et al. | |
| 10,045,511 B1 | 8/2018 | Yarden et al. | |
| 10,064,391 B1 | 9/2018 | Riley | |
| 10,091,972 B1 | 10/2018 | Jensen et al. | |
| 10,231,442 B1 | 3/2019 | Chang et al. | |
| 10,242,547 B1 | 3/2019 | Struhsaker et al. | |
| 10,264,762 B1 | 4/2019 | Lamb | |
| 10,352,759 B1 | 7/2019 | Jensen | |
| 10,446,006 B1 | 10/2019 | Johnson, Jr. et al. | |
| 10,512,430 B1 | 12/2019 | Hladio | |
| 10,588,295 B1 | 3/2020 | Riley | |
| 10,628,756 B1 | 4/2020 | Kuper et al. | |
| 10,638,726 B1 | 5/2020 | Makarychev et al. | |
| 10,691,674 B2 | 6/2020 | Leong et al. | |
| 2001/0027751 A1 | 10/2001 | van den Berg | |
| 2002/0010390 A1 | 1/2002 | Guice et al. | |
| 2002/0021219 A1 | 2/2002 | Edwards | |
| 2002/0091326 A1 | 7/2002 | Hashimoto et al. | |
| 2002/0095828 A1 | 7/2002 | Koopman et al. | |
| 2002/0154015 A1 | 10/2002 | Hixson | |
| 2002/0158765 A1 | 10/2002 | Pape et al. | |
| 2003/0004652 A1 | 1/2003 | Brunner et al. | |
| 2003/0023517 A1 | 1/2003 | Marsh et al. | |
| 2003/0028327 A1 | 2/2003 | Brunner et al. | |

(56) References Cited

U.S. PATENT DOCUMENTS

| | | |
|---|---|---|
| 2003/0034887 A1 | 2/2003 | Crabtree et al. |
| 2003/0062001 A1 | 4/2003 | Andersson |
| 2003/0066491 A1 | 4/2003 | Stampe |
| 2003/0144926 A1 | 7/2003 | Bodin et al. |
| 2003/0146284 A1 | 8/2003 | Schmit et al. |
| 2003/0149526 A1 | 8/2003 | Zhou et al. |
| 2003/0177025 A1 | 9/2003 | Curkendall et al. |
| 2003/0201931 A1 | 10/2003 | Durst et al. |
| 2003/0208157 A1 | 11/2003 | Eidson et al. |
| 2003/0221343 A1 | 12/2003 | Volk et al. |
| 2003/0229452 A1 | 12/2003 | Lewis |
| 2004/0066298 A1 | 4/2004 | Schmitt et al. |
| 2004/0078390 A1 | 4/2004 | Saunders |
| 2004/0118920 A1 | 6/2004 | He |
| 2004/0123810 A1 | 7/2004 | Lorton et al. |
| 2004/0155782 A1 | 8/2004 | Letkomiller et al. |
| 2004/0177011 A1 | 9/2004 | Ramsay et al. |
| 2004/0201454 A1 | 10/2004 | Waterhouse et al. |
| 2005/0010333 A1 | 1/2005 | Lorton et al. |
| 2005/0026181 A1 | 2/2005 | Davis et al. |
| 2005/0043630 A1 | 2/2005 | Buchert |
| 2005/0097997 A1 | 5/2005 | Hile |
| 2005/0108912 A1 | 5/2005 | Bekker |
| 2005/0115508 A1 | 6/2005 | Little |
| 2005/0128086 A1 | 6/2005 | Brown et al. |
| 2005/0139168 A1 | 6/2005 | Light et al. |
| 2005/0145187 A1 | 7/2005 | Gray |
| 2005/0273117 A1 | 12/2005 | Teychene |
| 2005/0279287 A1 | 12/2005 | Kroeker |
| 2005/0284381 A1 | 12/2005 | Bell et al. |
| 2006/0011145 A1 | 1/2006 | Kates |
| 2006/0052986 A1 | 3/2006 | Rogers et al. |
| 2006/0064325 A1 | 3/2006 | Matsumoto et al. |
| 2006/0087440 A1 | 4/2006 | Klein |
| 2006/0106289 A1 | 5/2006 | Elser |
| 2006/0117619 A1 | 6/2006 | Costantini |
| 2006/0155172 A1 | 7/2006 | Rugg |
| 2006/0170561 A1 | 8/2006 | Eyal |
| 2006/0170565 A1* | 8/2006 | Husak ............... G06K 7/10356 340/8.1 |
| 2006/0171421 A1 | 8/2006 | Matsunaga et al. |
| 2006/0173367 A1 | 8/2006 | Stuart et al. |
| 2006/0185605 A1 | 8/2006 | Renz et al. |
| 2006/0201436 A1 | 9/2006 | Kates |
| 2006/0207515 A1 | 9/2006 | Palett |
| 2006/0241521 A1 | 10/2006 | Cohen |
| 2006/0282274 A1 | 12/2006 | Bennett |
| 2006/0290514 A1 | 12/2006 | Sakama et al. |
| 2007/0006494 A1 | 1/2007 | Hayes et al. |
| 2007/0008155 A1 | 1/2007 | Trost et al. |
| 2007/0021660 A1 | 1/2007 | DeLonzor et al. |
| 2007/0027375 A1 | 2/2007 | Melker et al. |
| 2007/0027377 A1 | 2/2007 | DeLonzor et al. |
| 2007/0027379 A1 | 2/2007 | Delonzor et al. |
| 2007/0029381 A1 | 2/2007 | Braiman |
| 2007/0044317 A1 | 3/2007 | Critelli |
| 2007/0044732 A1 | 3/2007 | Araki et al. |
| 2007/0062457 A1 | 3/2007 | Bates et al. |
| 2007/0069899 A1 | 3/2007 | Shih et al. |
| 2007/0103296 A1 | 5/2007 | Paessel et al. |
| 2007/0149871 A1 | 6/2007 | Sarussi et al. |
| 2007/0152825 A1 | 7/2007 | August et al. |
| 2007/0222624 A1 | 9/2007 | Eicken et al. |
| 2007/0255124 A1 | 11/2007 | Pologe et al. |
| 2007/0258625 A1 | 11/2007 | Mirtsching |
| 2007/0283791 A1 | 12/2007 | Engvall et al. |
| 2007/0298421 A1 | 12/2007 | Jiang et al. |
| 2008/0001815 A1 | 1/2008 | Wang et al. |
| 2008/0004798 A1 | 1/2008 | Troxler et al. |
| 2008/0017126 A1 | 1/2008 | Adams et al. |
| 2008/0018481 A1 | 1/2008 | Zehavi |
| 2008/0021352 A1 | 1/2008 | Keegan et al. |
| 2008/0036610 A1 | 2/2008 | Hokuf et al. |
| 2008/0047177 A1 | 2/2008 | Hilpert |
| 2008/0055155 A1 | 3/2008 | Hensley et al. |
| 2008/0059263 A1 | 3/2008 | Stroman et al. |
| 2008/0061990 A1 | 3/2008 | Milnes et al. |
| 2008/0076988 A1 | 3/2008 | Sarussi et al. |
| 2008/0076992 A1 | 3/2008 | Hete et al. |
| 2008/0085522 A1 | 4/2008 | Meghen et al. |
| 2008/0097726 A1 | 4/2008 | Lorton et al. |
| 2008/0110406 A1 | 5/2008 | Anderson et al. |
| 2008/0146890 A1 | 6/2008 | Leboeuf et al. |
| 2008/0173255 A1 | 7/2008 | Mainini et al. |
| 2008/0190202 A1 | 8/2008 | Kulach et al. |
| 2008/0190379 A1 | 8/2008 | Mainini et al. |
| 2008/0215484 A1 | 9/2008 | Oldham |
| 2008/0227662 A1 | 9/2008 | Stromberg et al. |
| 2008/0228105 A1 | 9/2008 | Howell et al. |
| 2008/0262326 A1 | 10/2008 | Hete et al. |
| 2008/0272908 A1 | 11/2008 | Boyd |
| 2008/0312511 A1 | 12/2008 | Osler et al. |
| 2009/0009388 A1 | 1/2009 | Wangrud |
| 2009/0020613 A1 | 1/2009 | Chang et al. |
| 2009/0025651 A1 | 1/2009 | Lalor |
| 2009/0058730 A1 | 3/2009 | Geissler et al. |
| 2009/0094869 A1 | 4/2009 | Geissler et al. |
| 2009/0102668 A1 | 4/2009 | Thompson et al. |
| 2009/0115580 A1 | 5/2009 | Koerner et al. |
| 2009/0139462 A1 | 6/2009 | So |
| 2009/0149727 A1 | 6/2009 | Truitt et al. |
| 2009/0187392 A1 | 7/2009 | Riskey et al. |
| 2009/0255484 A1 | 10/2009 | Muelken |
| 2009/0312667 A1 | 12/2009 | Utsunomiya et al. |
| 2010/0018363 A1 | 1/2010 | Chervenak et al. |
| 2010/0030036 A1 | 2/2010 | Mottram et al. |
| 2010/0045468 A1 | 2/2010 | Geissler |
| 2010/0113902 A1 | 5/2010 | Hete et al. |
| 2010/0139575 A1 | 6/2010 | Duncan et al. |
| 2010/0160809 A1 | 6/2010 | Laurence et al. |
| 2010/0175625 A1 | 7/2010 | Klenotiz |
| 2010/0217102 A1 | 8/2010 | LeBoeuf et al. |
| 2010/0250198 A1 | 9/2010 | Lorton et al. |
| 2010/0289639 A1 | 11/2010 | Gibson et al. |
| 2010/0302004 A1* | 12/2010 | Winstead ............ A01K 29/005 340/7.32 |
| 2010/0315241 A1 | 12/2010 | Jow |
| 2010/0321182 A1 | 12/2010 | Wangrud |
| 2010/0321189 A1 | 12/2010 | Gibson et al. |
| 2010/0331739 A1 | 12/2010 | Maltz et al. |
| 2011/0018717 A1 | 1/2011 | Takahashi et al. |
| 2011/0061605 A1 | 3/2011 | Hardi et al. |
| 2011/0095089 A1 | 4/2011 | Kolton et al. |
| 2011/0121356 A1 | 5/2011 | Krawinkel et al. |
| 2011/0137185 A1 | 6/2011 | Hete et al. |
| 2011/0152876 A1 | 6/2011 | Vandeputte |
| 2011/0178423 A1 | 7/2011 | Hatch |
| 2011/0203144 A1 | 8/2011 | Junek et al. |
| 2011/0258130 A1 | 10/2011 | Grabiner et al. |
| 2011/0272470 A1 | 11/2011 | Baba et al. |
| 2011/0313264 A1 | 12/2011 | Hete |
| 2012/0009943 A1 | 1/2012 | Greenberg et al. |
| 2012/0068848 A1 | 3/2012 | Campbell et al. |
| 2012/0089152 A1 | 4/2012 | Lynd et al. |
| 2012/0092132 A1 | 4/2012 | Holme et al. |
| 2012/0111286 A1 | 5/2012 | Lee et al. |
| 2012/0112917 A1 | 5/2012 | Menachem et al. |
| 2012/0160181 A1 | 6/2012 | So et al. |
| 2012/0175412 A1 | 7/2012 | Grabiner et al. |
| 2012/0204811 A1 | 8/2012 | Ryan |
| 2012/0236690 A1 | 9/2012 | Rader et al. |
| 2012/0291715 A1 | 11/2012 | Jiang et al. |
| 2012/0299731 A1 | 11/2012 | Triener |
| 2012/0326862 A1 | 12/2012 | Kwak et al. |
| 2012/0326874 A1 | 12/2012 | Kwak et al. |
| 2013/0006065 A1 | 1/2013 | Yanai et al. |
| 2013/0014706 A1 | 1/2013 | Menkes |
| 2013/0046170 A1 | 2/2013 | Haynes |
| 2013/0113622 A1 | 5/2013 | Pratt et al. |
| 2013/0119142 A1 | 5/2013 | Mccoy et al. |
| 2013/0175347 A1 | 7/2013 | Decaluwe et al. |
| 2013/0192526 A1 | 8/2013 | Mainini |
| 2013/0211773 A1 | 8/2013 | Loeschinger et al. |
| 2013/0222141 A1 | 8/2013 | Rhee et al. |

(56) References Cited

U.S. PATENT DOCUMENTS

| | | |
|---|---|---|
| 2013/0237778 A1 | 9/2013 | Rouquette et al. |
| 2013/0239904 A1 | 9/2013 | Kim et al. |
| 2013/0239907 A1 | 9/2013 | Laurence et al. |
| 2013/0265165 A1 | 10/2013 | So et al. |
| 2013/0282295 A1* | 10/2013 | White .................... G16H 15/00 702/19 |
| 2013/0285815 A1 | 10/2013 | Jones, II |
| 2014/0073486 A1 | 3/2014 | Ahmed et al. |
| 2014/0107434 A1 | 4/2014 | Mottram et al. |
| 2014/0122488 A1 | 5/2014 | Jung et al. |
| 2014/0123912 A1 | 5/2014 | Menkes et al. |
| 2014/0135596 A1 | 5/2014 | LeBoeuf et al. |
| 2014/0135631 A1 | 5/2014 | Brumback et al. |
| 2014/0171762 A1 | 6/2014 | LeBoeuf et al. |
| 2014/0174376 A1 | 6/2014 | Touchton et al. |
| 2014/0196673 A1 | 7/2014 | Menkes et al. |
| 2014/0230755 A1 | 8/2014 | Trenkle et al. |
| 2014/0232541 A1 | 8/2014 | Trenkle et al. |
| 2014/0253709 A1 | 9/2014 | Bresch et al. |
| 2014/0261235 A1 | 9/2014 | Rich et al. |
| 2014/0267299 A1 | 9/2014 | Couse |
| 2014/0275824 A1 | 9/2014 | Couse |
| 2014/0276089 A1 | 9/2014 | Kirenko et al. |
| 2014/0290013 A1 | 10/2014 | Eidelman et al. |
| 2014/0302783 A1 | 10/2014 | Aiuto et al. |
| 2014/0331942 A1 | 11/2014 | Sarazyn |
| 2014/0333439 A1 | 11/2014 | Downing et al. |
| 2014/0338447 A1 | 11/2014 | Sharpe et al. |
| 2014/0347184 A1 | 11/2014 | Triener |
| 2014/0352632 A1 | 12/2014 | McLaughlin |
| 2014/0361875 A1* | 12/2014 | O'Hagan ............ G06K 7/10297 340/8.1 |
| 2014/0368338 A1 | 12/2014 | Rettedal et al. |
| 2015/0025394 A1 | 1/2015 | Hong et al. |
| 2015/0039239 A1 | 2/2015 | Shuler et al. |
| 2015/0043402 A1 | 2/2015 | Park et al. |
| 2015/0057963 A1 | 2/2015 | Zakharov et al. |
| 2015/0097668 A1 | 4/2015 | Toth |
| 2015/0099472 A1 | 4/2015 | Ickovic |
| 2015/0100245 A1 | 4/2015 | Huang et al. |
| 2015/0107519 A1 | 4/2015 | Rajkondawar et al. |
| 2015/0107522 A1 | 4/2015 | Lamb |
| 2015/0122893 A1 | 5/2015 | Warther |
| 2015/0128873 A1 | 5/2015 | Prescott et al. |
| 2015/0130617 A1 | 5/2015 | Triener |
| 2015/0148811 A1 | 5/2015 | Swope et al. |
| 2015/0157435 A1 | 6/2015 | Chasins et al. |
| 2015/0182322 A1 | 7/2015 | Couse et al. |
| 2015/0245592 A1 | 9/2015 | Sibbald et al. |
| 2015/0282457 A1 | 10/2015 | Yarden |
| 2015/0334994 A1 | 11/2015 | Prasad |
| 2015/0342143 A1 | 12/2015 | Stewart |
| 2015/0351885 A1 | 12/2015 | Kool et al. |
| 2015/0366166 A1 | 12/2015 | Mueller |
| 2016/0000045 A1 | 1/2016 | Funaya et al. |
| 2016/0021506 A1 | 1/2016 | Bonge, Jr. |
| 2016/0021612 A1 | 1/2016 | Matsunaga et al. |
| 2016/0058379 A1 | 3/2016 | Menkes et al. |
| 2016/0066546 A1 | 3/2016 | Borchersen et al. |
| 2016/0100802 A1 | 4/2016 | Newman |
| 2016/0106064 A1 | 4/2016 | Bladen et al. |
| 2016/0113524 A1 | 4/2016 | Gross et al. |
| 2016/0120154 A1 | 5/2016 | Hill et al. |
| 2016/0128637 A1 | 5/2016 | LeBoeuf et al. |
| 2016/0135431 A1 | 5/2016 | Siegel |
| 2016/0148086 A1 | 5/2016 | Clarke et al. |
| 2016/0150362 A1 | 5/2016 | Shaprio et al. |
| 2016/0151013 A1 | 6/2016 | Atallah et al. |
| 2016/0165851 A1 | 6/2016 | Harty et al. |
| 2016/0165852 A1 | 6/2016 | Goldfain |
| 2016/0166761 A1 | 6/2016 | Piehl et al. |
| 2016/0198957 A1 | 7/2016 | Arditi et al. |
| 2016/0210841 A1 | 7/2016 | Huang et al. |
| 2016/0212704 A1 | 7/2016 | Matsunaga |
| 2016/0213317 A1 | 7/2016 | Richardson et al. |
| 2016/0278712 A1 | 9/2016 | Sagara et al. |
| 2016/0286757 A1 | 10/2016 | Armstrong |
| 2016/0287108 A1 | 10/2016 | Wei et al. |
| 2016/0317049 A1 | 11/2016 | LeBoeuf et al. |
| 2016/0345881 A1 | 12/2016 | Sarantos et al. |
| 2016/0360733 A1 | 12/2016 | Triener |
| 2016/0367495 A1 | 12/2016 | Miller et al. |
| 2017/0000090 A1 | 1/2017 | Hall |
| 2017/0006836 A1 | 1/2017 | Torres |
| 2017/0042119 A1 | 2/2017 | Garrity |
| 2017/0067770 A1 | 3/2017 | Sun |
| 2017/0079247 A1 | 3/2017 | Womble et al. |
| 2017/0095206 A1 | 4/2017 | Leib et al. |
| 2017/0156288 A1 | 6/2017 | Singh |
| 2017/0164905 A1 | 6/2017 | Gumiero |
| 2017/0193208 A1 | 7/2017 | Ashley et al. |
| 2017/0196203 A1 | 7/2017 | Huisma et al. |
| 2017/0202185 A1 | 7/2017 | Trumbull et al. |
| 2017/0245797 A1 | 8/2017 | Quinn |
| 2017/0258039 A1 | 9/2017 | Lauterbach |
| 2017/0272842 A1 | 9/2017 | Touma |
| 2017/0280675 A1 | 10/2017 | MacNeil et al. |
| 2017/0280687 A1* | 10/2017 | Vrabete .................. G16H 40/63 |
| 2017/0280688 A1 | 10/2017 | Deliou et al. |
| 2017/0310358 A1 | 10/2017 | Vijayasankar et al. |
| 2017/0318781 A1 | 11/2017 | Rollins et al. |
| 2017/0360004 A1 | 12/2017 | Carver |
| 2017/0372583 A1 | 12/2017 | Lamkin et al. |
| 2018/0000045 A1 | 1/2018 | Bianchi et al. |
| 2018/0007863 A1 | 1/2018 | Bailey et al. |
| 2018/0014512 A1 | 1/2018 | Arabani et al. |
| 2018/0055016 A1 | 3/2018 | Hsieh et al. |
| 2018/0064068 A1 | 3/2018 | McKee et al. |
| 2018/0070559 A1 | 3/2018 | So |
| 2018/0098522 A1 | 4/2018 | Steinfort |
| 2018/0110205 A1 | 4/2018 | Czarnecky et al. |
| 2018/0131074 A1 | 5/2018 | Wilkinson et al. |
| 2018/0132455 A1 | 5/2018 | Pradeep et al. |
| 2018/0206455 A1 | 7/2018 | Thiex et al. |
| 2018/0242860 A1 | 8/2018 | LeBoeuf et al. |
| 2018/0249683 A1 | 9/2018 | Borchersen et al. |
| 2018/0260976 A1 | 9/2018 | Watanabe et al. |
| 2018/0271058 A1 | 9/2018 | Valdez |
| 2018/0279582 A1 | 10/2018 | Yajima et al. |
| 2018/0288968 A1 | 10/2018 | Cisco |
| 2018/0295809 A1 | 10/2018 | Yajima et al. |
| 2018/0303425 A1 | 10/2018 | Wordham et al. |
| 2018/0310526 A1 | 11/2018 | Birch et al. |
| 2018/0325382 A1 | 11/2018 | Brandao et al. |
| 2018/0332989 A1 | 11/2018 | Chiu et al. |
| 2018/0333244 A1 | 11/2018 | Hanks et al. |
| 2019/0008118 A1 | 1/2019 | Keegan |
| 2019/0008124 A1 | 1/2019 | Komatsu et al. |
| 2019/0029226 A1 | 1/2019 | Triener |
| 2019/0053469 A1 | 2/2019 | Mardirossian |
| 2019/0053470 A1 | 2/2019 | Singh et al. |
| 2019/0059335 A1 | 2/2019 | Crider, Jr. et al. |
| 2019/0059337 A1 | 2/2019 | Robbins |
| 2019/0059741 A1 | 2/2019 | Crider, Jr. et al. |
| 2019/0069512 A1 | 3/2019 | Eriksson et al. |
| 2019/0075945 A1 | 3/2019 | Strassburger et al. |
| 2019/0082654 A1 | 3/2019 | Robbins |
| 2019/0090754 A1 | 3/2019 | Brandao et al. |
| 2019/0110433 A1 | 4/2019 | Myers |
| 2019/0110436 A1 | 4/2019 | Gardner et al. |
| 2019/0125509 A1 | 5/2019 | Hotchkin |
| 2019/0130728 A1 | 5/2019 | Struhsaker et al. |
| 2019/0133086 A1 | 5/2019 | Katz et al. |
| 2019/0159428 A1 | 5/2019 | Bolen |
| 2019/0166802 A1 | 6/2019 | Seltzer et al. |
| 2019/0183091 A1 | 6/2019 | Betts-Lacroix et al. |
| 2019/0183092 A1 | 6/2019 | Couse et al. |
| 2019/0208358 A1 | 7/2019 | de Barros Chapiewski et al. |
| 2019/0213860 A1 | 7/2019 | Shaprio et al. |
| 2019/0254599 A1 | 8/2019 | Young et al. |
| 2019/0287429 A1 | 9/2019 | Dawson et al. |
| 2019/0290133 A1 | 9/2019 | Crider et al. |
| 2019/0290847 A1 | 9/2019 | Veyrent et al. |
| 2019/0298226 A1 | 10/2019 | Filipowicz |

(56) References Cited

U.S. PATENT DOCUMENTS

| | | |
|---|---|---|
| 2019/0298924 A1 | 10/2019 | Gibson et al. |
| 2019/0327939 A1 | 10/2019 | Sharpe et al. |
| 2019/0335715 A1 | 11/2019 | Hicks et al. |
| 2019/0350168 A1 | 11/2019 | Shi |
| 2019/0365324 A1 | 12/2019 | Chang |
| 2019/0373857 A1 | 12/2019 | Leigh-Lancaster et al. |
| 2019/0380311 A1 | 12/2019 | Crouthamel et al. |
| 2019/0385037 A1 | 12/2019 | Robadey et al. |
| 2019/0385332 A1 | 12/2019 | Yajima et al. |
| 2020/0015740 A1 | 1/2020 | Alnofeli et al. |
| 2020/0037886 A1 | 2/2020 | Greer et al. |
| 2020/0068853 A1 | 3/2020 | Radovcic |
| 2020/0085019 A1 | 3/2020 | Gilbert et al. |
| 2020/0100463 A1 | 4/2020 | Rooda et al. |
| 2020/0107522 A1 | 4/2020 | Kersey et al. |
| 2020/0110946 A1 | 4/2020 | Kline et al. |
| 2020/0113728 A1 | 4/2020 | Spector et al. |
| 2020/0170222 A1 | 6/2020 | Gotts |
| 2020/0178505 A1 | 6/2020 | Womble et al. |
| 2020/0178800 A1 | 6/2020 | Geissler |
| 2020/0205381 A1 | 7/2020 | Wernimont et al. |
| 2020/0229391 A1 | 7/2020 | De Groot |
| 2020/0229707 A1 | 7/2020 | Donnelly |
| 2020/0242551 A1 | 7/2020 | Lau et al. |
| 2020/0302004 A1 | 9/2020 | Spencer et al. |

FOREIGN PATENT DOCUMENTS

| | | |
|---|---|---|
| AU | 2003238759 | 1/2004 |
| AU | 2004263067 | 2/2005 |
| AU | 2004305403 | 7/2005 |
| AU | 2011210083 | 8/2011 |
| AU | 2016266101 | 12/2016 |
| AU | 2017100469 | 5/2017 |
| AU | 2018220079 | 9/2018 |
| BR | 8701673 | 3/2009 |
| BR | 112012018909 | 1/2011 |
| CA | 2267812 | 10/2000 |
| CA | 2493331 | 1/2005 |
| CA | 2788153 | 8/2011 |
| CA | 2880138 | 2/2013 |
| CA | 2858905 | 10/2013 |
| CA | 2875637 | 1/2014 |
| CA | 2875578 | 12/2014 |
| CA | 2915843 | 12/2014 |
| CA | 2990620 | 12/2016 |
| CA | 2916286 | 6/2017 |
| CA | 3007296 | 6/2017 |
| CN | 1989895 | 7/2007 |
| CN | 201171316 | 12/2008 |
| CN | 101578516 | 11/2009 |
| CN | 101816290 | 9/2010 |
| CN | 101875975 | 11/2010 |
| CN | 101875976 | 11/2010 |
| CN | 102781225 | 1/2011 |
| CN | 102142116 | 8/2011 |
| CN | 102485892 | 6/2012 |
| CN | 102682322 | 9/2012 |
| CN | 203313865 | 12/2013 |
| CN | 203689049 | 2/2014 |
| CN | 203523519 | 4/2014 |
| CN | 204047531 | 8/2014 |
| CN | 204305813 | 5/2015 |
| CN | 204331349 | 5/2015 |
| CN | 105191817 | 12/2015 |
| CN | 106125648 | 11/2016 |
| CN | 106172068 | 12/2016 |
| CN | 106197675 | 12/2016 |
| CN | 106719037 | 2/2017 |
| CN | 205919898 | 2/2017 |
| CN | 106472347 | 3/2017 |
| CN | 106845598 | 6/2017 |
| CN | 206431665 | 8/2017 |
| CN | 107201409 | 9/2017 |
| CN | 207201674 | 9/2017 |
| CN | 107251851 | 10/2017 |
| CN | 107667898 | 2/2018 |
| CN | 108353810 | 2/2018 |
| CN | 207100094 | 3/2018 |
| CN | 207249710 | 4/2018 |
| CN | 108651301 | 5/2018 |
| CN | 108656996 | 5/2018 |
| CN | 108684549 | 5/2018 |
| CN | 108118096 | 6/2018 |
| CN | 108308055 | 7/2018 |
| CN | 109006541 | 8/2018 |
| CN | 109008529 | 8/2018 |
| CN | 108617533 | 10/2018 |
| CN | 108717668 | 10/2018 |
| CN | 108766586 | 11/2018 |
| CN | 109006550 | 12/2018 |
| CN | 208273869 | 12/2018 |
| CN | 109355402 | 2/2019 |
| CN | 109937904 | 3/2019 |
| CN | 109937905 | 3/2019 |
| CN | 109823691 | 5/2019 |
| CN | 110073995 | 5/2019 |
| CN | 110059781 | 7/2019 |
| CN | 110106261 | 8/2019 |
| CN | 110106262 | 8/2019 |
| CN | 110506656 | 11/2019 |
| CN | 210076292 | 2/2020 |
| DE | 633742 | 8/1936 |
| DE | 2850438 | 5/1980 |
| DE | 19629166 | 2/1997 |
| DE | 19826348 | 6/1998 |
| DE | 29906146 | 6/1999 |
| DE | 19911766 | 9/2000 |
| DE | 20018364 | 1/2001 |
| DE | 10001176 | 5/2001 |
| DE | 102004027978 | 12/2005 |
| DE | 202010008325 | 2/2012 |
| DE | 20201301107 5 | 1/2014 |
| DE | 202016101289 | 4/2016 |
| DK | 140001 | 11/1979 |
| EP | 55127 | 6/1982 |
| EP | 125915 | 11/1984 |
| EP | 0499428 | 8/1992 |
| EP | 513525 | 11/1992 |
| EP | 743043 | 11/1996 |
| EP | 938841 | 2/1998 |
| EP | 898449 | 3/1999 |
| EP | 1076485 | 2/2001 |
| EP | 1445723 | 8/2004 |
| EP | 1479338 | 11/2004 |
| EP | 1521208 | 4/2005 |
| EP | 1907816 | 4/2008 |
| EP | 1961294 | 8/2008 |
| EP | 2028931 | 3/2009 |
| EP | 2172878 | 4/2010 |
| EP | 2528431 | 1/2011 |
| EP | 2453733 | 5/2012 |
| EP | 2465344 | 6/2012 |
| EP | 2488237 | 8/2012 |
| EP | 2528431 | 12/2012 |
| EP | 2534945 | 12/2012 |
| EP | 2657889 | 10/2013 |
| EP | 2664234 | 11/2013 |
| EP | 2728995 | 5/2014 |
| EP | 2879615 | 6/2015 |
| EP | 2955998 | 12/2015 |
| EP | 3153098 | 4/2017 |
| EP | 3164855 | 5/2017 |
| EP | 3210531 | 8/2017 |
| EP | 3217566 | 9/2017 |
| EP | 3218865 | 9/2017 |
| EP | 3225106 | 10/2017 |
| EP | 3316680 | 5/2018 |
| EP | 3346422 | 7/2018 |
| EP | 3385886 | 10/2018 |
| EP | 3593634 | 1/2020 |
| EP | 3627856 | 3/2020 |
| EP | 3660855 | 6/2020 |
| ES | 2046912 | 2/1994 |

(56) References Cited

FOREIGN PATENT DOCUMENTS

| | | |
|---|---|---|
| ES | 2206009 | 5/2004 |
| ES | 2215152 | 10/2004 |
| ES | 1072416 | 7/2010 |
| ES | 2391341 | 11/2012 |
| ES | 1194609 | 10/2017 |
| FI | 20165318 | 6/2017 |
| FR | 2106705 | 5/1972 |
| FR | 2297565 | 8/1976 |
| FR | 2342024 | 1/1983 |
| FR | 2601848 | 1/1988 |
| FR | 2779153 | 12/1999 |
| FR | 2834521 | 7/2003 |
| FR | 2964777 | 3/2012 |
| FR | 3046332 | 1/2016 |
| FR | 3024653 | 2/2016 |
| FR | 3085249 | 9/2018 |
| GB | 588870 | 6/1947 |
| GB | 641394 | 8/1950 |
| GB | 865164 | 4/1961 |
| GB | 1072971 | 6/1967 |
| GB | 1267830 | 3/1972 |
| GB | 1415650 | 11/1975 |
| GB | 2067121 | 7/1981 |
| GB | 2055670 | 7/1983 |
| GB | 2114045 | 8/1983 |
| GB | 2125343 | 3/1984 |
| GB | 2142812 | 1/1985 |
| GB | 2392138 | 2/2004 |
| GB | 2469326 | 10/2010 |
| GB | 2554636 | 9/2016 |
| GB | 2554636 | 4/2018 |
| GB | 2570340 | 7/2019 |
| GB | 2571404 | 8/2019 |
| IN | 201103443 | 12/2011 |
| IN | 200802272 | 6/2016 |
| JP | 57173562 | 11/1982 |
| JP | 7177832 | 7/1995 |
| JP | 2001178692 | 7/2001 |
| JP | 2004292151 | 10/2004 |
| JP | 2005102959 | 4/2005 |
| JP | 5659243 | 1/2011 |
| JP | 2011067178 | 4/2011 |
| JP | 2011087657 | 5/2011 |
| JP | 2013247941 | 6/2012 |
| JP | 2017112857 | 6/2017 |
| JP | 2017002170 | 4/2018 |
| KR | 2003061157 | 7/2003 |
| KR | 2005046330 | 5/2005 |
| KR | 780449 | 11/2007 |
| KR | 20130019970 | 2/2013 |
| KR | 20130057683 | 6/2013 |
| KR | 2013138899 | 12/2013 |
| KR | 2019061805 | 11/2017 |
| KR | 101827311 | 2/2018 |
| KR | 20180035537 | 4/2018 |
| KR | 2018109451 | 10/2018 |
| KR | 20190081598 | 7/2019 |
| KR | 2019091708 | 8/2019 |
| MX | 9600754 | 2/1997 |
| MX | 356331 | 1/2011 |
| NL | 2017104 | 1/2018 |
| NL | 2019186 | 1/2019 |
| NL | 2020275 | 7/2019 |
| NZ | 198486 | 5/1986 |
| NZ | 199494 | 7/1986 |
| NZ | 203924 | 10/1986 |
| NZ | 335702 | 3/2001 |
| NZ | 507129 | 8/2002 |
| NZ | 582984 | 1/2011 |
| NZ | 101747418 | 1/2011 |
| RU | 2178711 | 1/2002 |
| RU | 2265324 | 12/2005 |
| SE | 4567 | 3/1893 |
| SE | 5549 | 4/1894 |
| SE | 123213 | 11/1948 |
| SE | 188102 | 3/1964 |
| SU | 1766336 | 10/1992 |
| WO | 1984000468 | 2/1984 |
| WO | 1991011956 | 8/1991 |
| WO | 199302549 | 2/1993 |
| WO | 199822028 | 5/1998 |
| WO | 1998039475 | 9/1998 |
| WO | 1999017658 | 4/1999 |
| WO | 2000062263 | 4/1999 |
| WO | 9945761 | 9/1999 |
| WO | 2000013393 | 3/2000 |
| WO | 2000061802 | 10/2000 |
| WO | 2001033950 | 5/2001 |
| WO | 2001087054 | 11/2001 |
| WO | 2002031629 | 4/2002 |
| WO | 2002085106 | 10/2002 |
| WO | 2003001180 | 1/2003 |
| WO | 2004092920 | 3/2003 |
| WO | 2003087765 | 10/2003 |
| WO | 2003094605 | 11/2003 |
| WO | 2004015655 | 2/2004 |
| WO | 2005104775 | 4/2004 |
| WO | 2006078943 | 1/2005 |
| WO | 2005104930 | 4/2005 |
| WO | 2005073408 | 8/2005 |
| WO | 2006021855 | 3/2006 |
| WO | 2006055737 A2 | 5/2006 |
| WO | 2006134197 | 12/2006 |
| WO | 2006135265 | 12/2006 |
| WO | 2007034211 | 3/2007 |
| WO | 2007095684 | 8/2007 |
| WO | 2007122375 | 11/2007 |
| WO | 2007145450 A1 | 12/2007 |
| WO | 2008033042 | 3/2008 |
| WO | 2008052298 | 5/2008 |
| WO | 2008075974 | 6/2008 |
| WO | 2010091686 | 12/2008 |
| WO | 2009034497 | 3/2009 |
| WO | 2009062249 | 5/2009 |
| WO | 2009076325 | 6/2009 |
| WO | 2009089215 | 7/2009 |
| WO | 2009117764 | 10/2009 |
| WO | 2009153779 | 12/2009 |
| WO | 2010008620 | 1/2010 |
| WO | 2010048753 | 5/2010 |
| WO | 2010053811 | 5/2010 |
| WO | 2010068713 | 6/2010 |
| WO | 2010140900 | 12/2010 |
| WO | 2012075480 | 12/2010 |
| WO | 2011039112 | 4/2011 |
| WO | 2011076886 | 6/2011 |
| WO | 2011154949 | 12/2011 |
| WO | 2012071670 | 6/2012 |
| WO | 2013008115 | 1/2013 |
| WO | 2013038326 | 3/2013 |
| WO | 2013082227 | 6/2013 |
| WO | 2013082227 A1 | 6/2013 |
| WO | 2015001537 | 7/2013 |
| WO | 2013118121 | 8/2013 |
| WO | 2015024050 | 8/2013 |
| WO | 2013179020 | 12/2013 |
| WO | 2013190423 | 12/2013 |
| WO | 2014020463 | 2/2014 |
| WO | 2014095759 | 6/2014 |
| WO | 2014107766 | 7/2014 |
| WO | 2014118788 | 8/2014 |
| WO | 2014125250 | 8/2014 |
| WO | 2016027271 | 8/2014 |
| WO | 2014140148 | 9/2014 |
| WO | 2014141084 | 9/2014 |
| WO | 2014194383 | 12/2014 |
| WO | 2014197631 | 12/2014 |
| WO | 2014199363 | 12/2014 |
| WO | 2015009167 | 1/2015 |
| WO | 2015030832 | 3/2015 |
| WO | 2015055709 | 4/2015 |
| WO | 2015086338 | 6/2015 |
| WO | 2016207844 | 6/2015 |
| WO | 2015107354 | 7/2015 |

(56) References Cited

FOREIGN PATENT DOCUMENTS

| | | |
|---|---|---|
| WO | 2017001717 | 7/2015 |
| WO | 2017031532 | 8/2015 |
| WO | 2015140486 | 9/2015 |
| WO | 2015158787 | 10/2015 |
| WO | 2015175686 | 11/2015 |
| WO | 2015176027 | 11/2015 |
| WO | 2015197385 | 12/2015 |
| WO | 2016037190 | 3/2016 |
| WO | 2017149049 | 3/2016 |
| WO | 2016053104 | 4/2016 |
| WO | 2016108187 | 7/2016 |
| WO | 2016166748 | 10/2016 |
| WO | 2017001538 | 1/2017 |
| WO | 2017027551 | 2/2017 |
| WO | 2017037479 | 3/2017 |
| WO | 2017066813 | 4/2017 |
| WO | 2017089289 | 6/2017 |
| WO | 2017096256 | 6/2017 |
| WO | 2017121834 | 7/2017 |
| WO | 2018006965 | 1/2018 |
| WO | 2018011736 | 1/2018 |
| WO | 2018019742 | 2/2018 |
| WO | 2020022543 | 7/2018 |
| WO | 2018172976 | 9/2018 |
| WO | 2020060248 | 9/2018 |
| WO | 2018203203 | 11/2018 |
| WO | 2019009717 | 1/2019 |
| WO | 2019025138 | 2/2019 |
| WO | 2019046216 | 3/2019 |
| WO | 2019058752 | 3/2019 |
| WO | 2019071222 | 4/2019 |
| WO | 2019132803 | 7/2019 |
| WO | 2019207561 | 10/2019 |
| WO | 2019235942 | 12/2019 |
| WO | 2019245978 | 12/2019 |
| WO | 2020003310 | 1/2020 |
| WO | 2020096528 | 5/2020 |
| WO | 2020140013 | 7/2020 |

OTHER PUBLICATIONS

International Search Report and Written Opinion dated Feb. 3, 2017 for PCT/US2016/064761.
International Search Report and Written Opinion dated Dec. 21, 2018 for PCT/US2018/047707.
Examination Report dated Mar. 5, 2020 for Australian Application No. 2018220079.
Office Action dated Mar. 6, 2020 for AU Application No. 2018260961.
Christian Pahl, Eberhard Hartung, Anne Grothmann, Katrin Mahlkow-Nerge, Angelika Haeussermann, Rumination activity of dairy cows in the 24 hours before and after calving, Journal of Dairy Science, vol. 97, Issue 11, 2014, pp. 6935-6941.
Steensels, Machteld; Maltz, Ephraim; Bahr, Claudia; Berckmans, Daniel; Antler, Aharon; et al., Towards practical application of sensors for monitoring animal health: The effect of post-calving health problems on rumination duration, activity and milk yield, The Journal of Dairy Research; Cambridge vol. 84, Iss. 2, (May 2017): 132-138.
Clark, C., Lyons, N., Millapan, L., Talukder, S., Cronin, G., Kerrisk, K., & Garcia, S. (2015), Rumination and activity levels as predictors of calving for dairy cows, Animal, 9(4), 691-695.
K. Koyama, T. Koyama, M. Sugimoto, N. Kusakari, R. Miura, K. Yoshioka, M. HiRako, Prediction of calving time in Holstein dairy cows by monitoring the ventral tail base surface temperature, The Veterinary Journal, vol. 240, 2018, pp. 1-5, ISSN 1090-0233.
L. Calamari, N. Soriani, G. Panella, F. Petrera, A. Minuti, E. Trevisi, Rumination time around calving: An early signal to detect cows at greater risk of disease, Journal of Dairy Science, vol. 97, Issue 6, 2014, pp. 3635-3647, ISSN 0022-0302.
S. Benaissa, F.A.M. Tuyttens, D. Plets, J. Trogh, L. Martens, L. Vandaele, W. Joseph, B. Sonck, Calving and estrus detection in dairy cattle using a combination of indoor localization and accelerometer sensors, Computers and Electronics in Agriculture, vol. 168, 2020, 105153, ISSN 0168-1699.
N. Soriani, E. Trevisi, L. Calamari, Relationships between rumination time, metabolic conditions, and health status in dairy cows during the transition period, Journal of Animal Science, vol. 90, Issue 12, Dec. 2012, pp. 4544-4554.
The role of sensors, big data and machine learning in modern animal farming; Suresh Neethirajan; Received in revised form Jun. 30, 2020; Accepted Jul. 3, 2020 Sensing and Bio-Sensing Research 29 (2020) 100367 2214-1804/ © 2020 The Author. Published by Elsevier B.V.
A Review on Determination of Computer Aid Diagnosis and/or Risk Factors Using Data Mining Methods in Veterinary Field Pinar Cihan, Erhan Gökçe, Oya Kalipsiz; Tekirdağ Namik Kemal University, Çorlu Faculty of Engineering, Department of Computer Engineering, Tekirdağ, Turkey. 2019.
Big Data Analytics and Precision Animal Agriculture Symposium: Data to decisions B. J. White, D. E. Amrine, and R. L. Larson Beef Cattle Institute, Kansas State University, Manhattan, KS; © The Author(s) 2018. Published by Oxford University Press on behalf of American Society of Animal Science.
Gasteiner, J.; Boswerger, B.; Guggenberger, T., Practical use of a novel ruminal sensor on dairy farms, Praktische Tierarzt 2012 vol. 93 No. 8 pp. 730 . . . 739 ref.45.

* cited by examiner

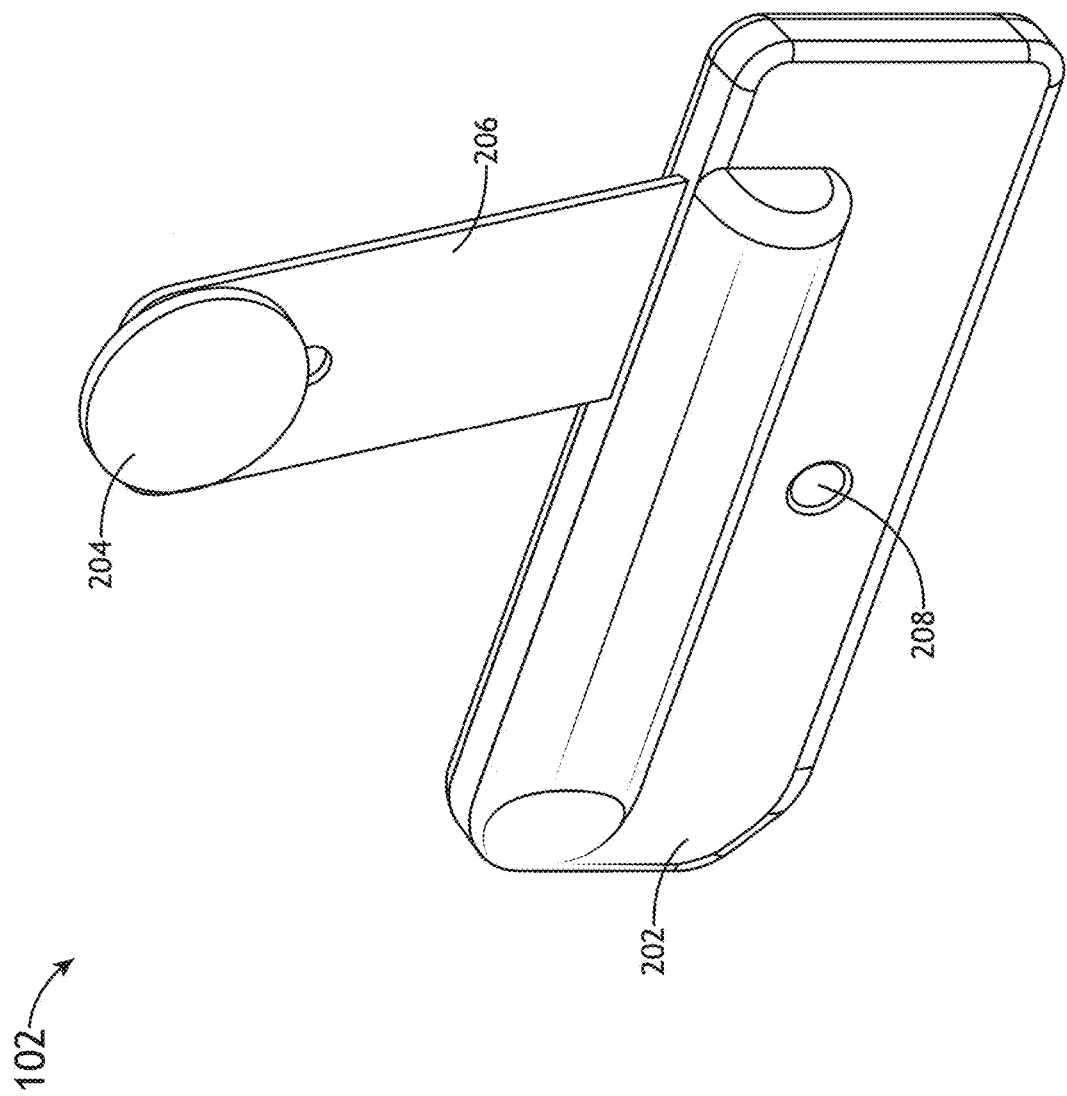

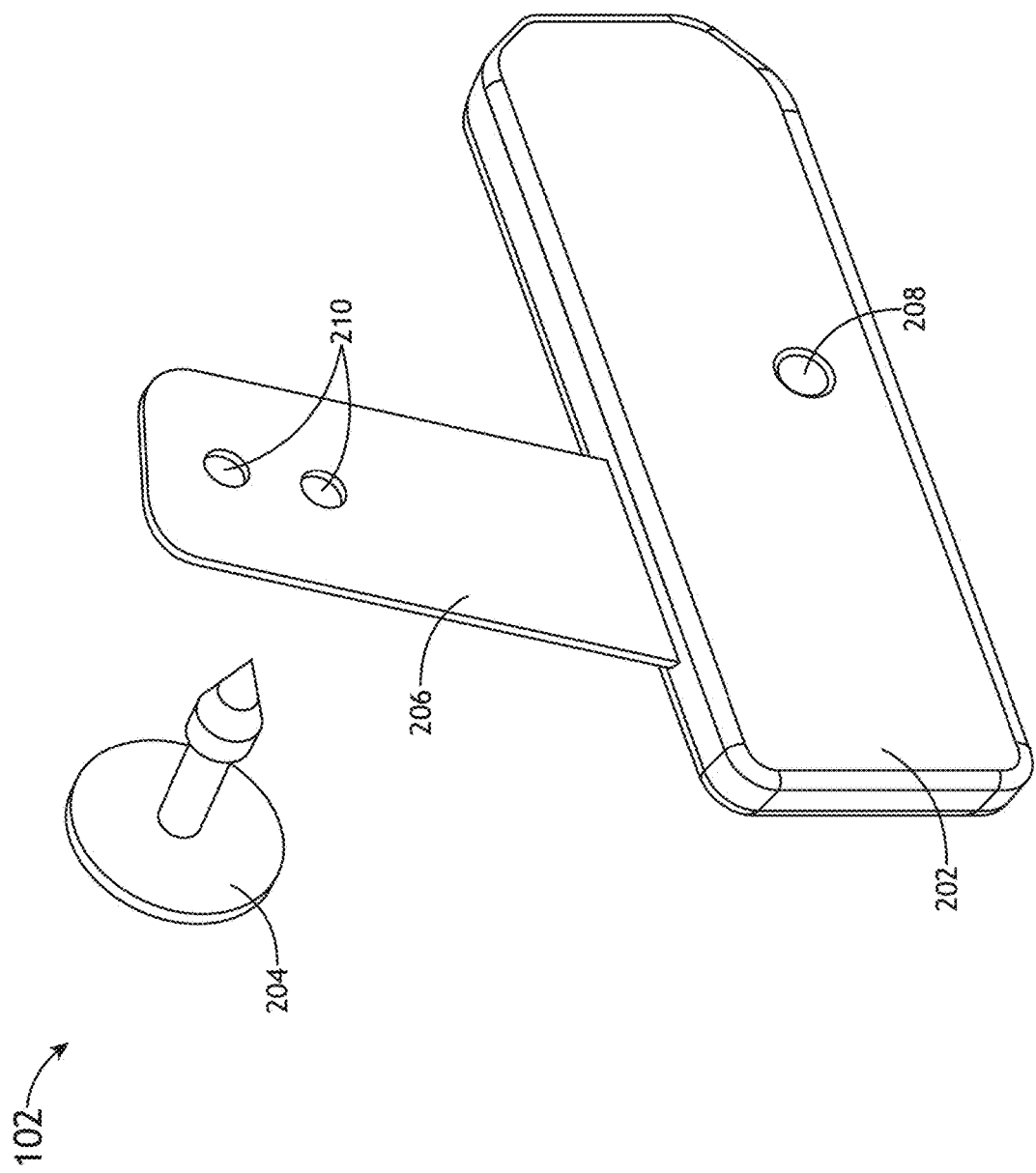

METHOD AND SYSTEM FOR TRACKING HEALTH IN ANIMAL POPULATIONS

CROSS-REFERENCE TO RELATED APPLICATION

Noon The present application is related to and claims the benefit of the earliest available effective filing date(s) from the following listed application(s) (the "Related Applications") (e.g., claims earliest available priority dates for other than provisional patent applications or claims benefits under 35 USC § 119(e) for provisional patent applications, for any and all parent, grandparent, great-grandparent, etc. applications of the Related Application(s)).

RELATED APPLICATIONS

The present application constitutes a non-provisional application of United States Provisional Patent Application entitled SYSTEM AND METHOD FOR IDENTIFYING SICK ANIMALS, naming Aaron Mathankeri, Adam Sonty, Alex Heine, Colton Franco, Vishal Singh, Brian Schupbach, and Andrew Uden as inventors, filed Aug. 23, 2017, Application Ser. No. 62/549,358.

The present application also constitutes a continuation-in-part application of United States Non-Provisional Patent Application entitled METHOD AND SYSTEM FOR TRACKING HEALTH IN ANIMAL POPULATIONS, naming Vishal Singh as inventor, filed Dec. 1, 2016, application Ser. No. 15/366,920, which constitutes a continuation-in-part application of United States Non-Provisional Patent Application entitled METHOD AND SYSTEM FOR TRACKING HEALTH IN ANIMAL POPULATIONS, naming Vishal Singh as inventor, filed Jul. 15, 2016, application Ser. No. 15/212,091, which constitutes a continuation-in-part application of United States Non-Provisional Patent Application entitled METHOD AND SYSTEM FOR TRACKING HEALTH IN ANIMAL POPULATIONS, naming Vishal Singh as inventor, filed Dec. 3, 2015, application Ser. No. 14/958,829, which constitutes a continuation-in-part application of United States Non-Provisional Patent Application entitled METHOD AND SYSTEM FOR TRACKING HEALTH IN ANIMAL POPULATIONS, naming Vishal Singh as inventor, filed Sep. 8, 2015, application Ser. No. 14/847,930, which constitutes a non-provisional patent application of the following United States Provisional Patent Applications: METHOD AND SYSTEM FOR TRACKING BIOMETRIC AND ANIMAL BEHAVIOR IN ANIMAL POPULATIONS, naming Vishal Singh as inventor, filed Sep. 5, 2014, Application Ser. No. 62/046,702; METHOD AND SYSTEM FOR TRACKING HEALTH IN ANIMAL POPULATIONS, naming Vishal Singh as inventor, filed Jan. 30, 2015, Application Ser. No. 62/110,230; METHOD AND SYSTEM FOR TRACKING HEALTH IN ANIMAL POPULATIONS, naming Vishal Singh as inventor, filed Jun. 24, 2015, Application Ser. No. 62/184,158; and METHOD AND SYSTEM FOR DATA TRANSFER IN A TAGGED ANIMAL POPULATION, naming Vishal Singh, Paul Hoffmeyer and Spencer Keller as inventors, filed Sep. 4, 2015, Application Ser. No. 62/214,568.

U.S. Non-Provisional application Ser. No. 15/366,920 also constitutes a continuation-in-part application of PCT/US15/49006 entitled METHOD AND SYSTEM FOR TRACKING HEALTH IN ANIMAL POPULATIONS, naming Vishal Singh as inventor, filed Sep. 8, 2015.

Each of the above-listed applications is incorporated herein by reference in the entirety.

TECHNICAL FIELD

The present invention generally relates to animal health tracking, and, in particular, to the tracking of physiological and/or behavioral parameters of multiple animals in an animal population.

BACKGROUND

Identifying and treating illness in early stages of livestock development can aid in reducing herd disease outbreak, reduce herd loss, and reduce the need for culling. There are a variety of illnesses from which confined cattle commonly suffer. Respiratory system diseases are a major cause of illness and death in cattle. One such illness includes Bovine Respiratory Disease Complex (BRD), which often turns into severe and/or fatal bacterial pneumonia. It is further noted that major viruses such as Infectious Bovine Rhinotracheitis (IBR), parainfluenza virus, syncytial virus, and bovine virus are often a precursor to BRD. Antibiotics are often not effective, especially when treated in later stages of the illness. As such, early detection of the disease is critical in minimizing herd loss. Currently, the most common identification of sickness is via rectal temperature and visual cues, which often occur well beyond early onset of symptoms, such as fever, of the given illness. As such, it would be advantageous to provide a system and method that provides illness identification and/or diagnosis that cures the deficiencies of prior approaches identified above.

SUMMARY

Embodiments of the present disclosure are directed to system for monitoring one or more characteristics in an animal population is disclosed. In one embodiment, the system includes a concentrator communicatively couplable to a plurality of animal tag assemblies. In another embodiment, each animal tag assembly configured for being disposed on an animal of the animal population, each of the animal tag assemblies including one or more sensors configured to measure one or more animal characteristics of the animal of the animal population. In another embodiment, the concentrator is configured to acquire the one or more animal characteristics from the plurality of animal tag assemblies. In another embodiment, the concentrator is configured to execute a communication protocol to acquire data from the plurality of animal tag assemblies by transmitting a beacon signal. In another embodiment, a particular animal tag assembly is configured to enter a search mode when the particular animal tag assembly fails to detect the beacon signal during a selected global data period. In another embodiment, the particular animal tag assembly is configured to periodically switch communication circuitry of the particular tag assembly between an on-state and an off-state while in the search mode. In another embodiment, the system includes a remote server communicatively coupled to the concentrator. In another embodiment, the remote server includes one or more processors configured to execute a set of program instructions stored in memory and configured to cause the remote server to: receive raw data from the plurality of animal tag assemblies, the raw data indicative of one or more animal characteristics of one or more animals of the animal population; analyze the raw data received from the plurality of animal tag assemblies; determine a health state of one or more animals of the animal population based on at least the raw data received from the plurality of animal tag assemblies; and report the determined health state to one or more user devices.

Additional embodiments of the present disclosure are directed to a system for monitoring one or more characteristics in an animal population. In one embodiment, the system includes a first concentrator located at a first location. In another embodiment, the system includes an additional concentrator located at an additional location. In another embodiment, the first concentrator and the additional concentrator are communicatively couplable to a plurality of animal tag assemblies. In another embodiment, each animal tag assembly is configured for being disposed on an animal of the animal population. In another embodiment, each of the animal tag assemblies includes one or more sensors configured to measure one or more animal characteristics of the animal of the animal population. In another embodiment, the first concentrator and the second concentrator are communicatively couplable to the plurality of animal tag assemblies and configured to acquire the one or more animal characteristics from the plurality of animal tag assemblies. In another embodiment, the system includes a remote server communicatively coupled to the first concentrator and the additional concentrator. In another embodiment, the remote server includes one or more processors configured to execute a set of program instructions stored in memory and configured to cause the remote server to: identify a first location associated with the first concentrator; identify an additional location associated with the additional concentrator; receive, at a first time, a first location indicator for the particular tag assembly from the first concentrator when the particular tag assembly is communicatively coupled to the first concentrator; receive, at an additional time, an additional location indicator for the particular tag assembly from the additional concentrator when the particular tag assembly is communicatively coupled to the additional concentrator; and generate an animal history based on at least the first location indicator, the first time, the additional location indicator, and the additional time.

Additional embodiments of the present disclosure are directed to an animal tag assembly for monitoring one or more characteristics in an animal population. In one embodiment, the animal tag assembly includes one or more temperature sensors disposed on the animal tag body. In another embodiment, the animal tag body is configured for placement on an ear of an animal of the animal population. In another embodiment, the animal tag body is further configured to acquire a temperature measurement of the member of the animal population. In another embodiment, the animal tag assembly includes one or more processors. In another embodiment, the animal tag assembly includes communication circuitry. In another embodiment, the communication circuitry is configured to transmit data to one or more concentrators via a communication protocol executed by the concentrator. In another embodiment, the communication circuitry is configured to receive a beacon signal from the concentrator, wherein the one or more processors are configured to enter a search mode when the communication circuitry fails to detect the beacon signal during a selected global data period. In another embodiment, the one or more processors periodically switch the communication circuitry between an on-state and an off-state while in the search mode.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which:

FIGS. 2A-2G illustrate a series of schematic views of a tag assembly, in accordance with one or more embodiments of the present disclosure;

DETAILED DESCRIPTION OF THE INVENTION

Figure 1A:
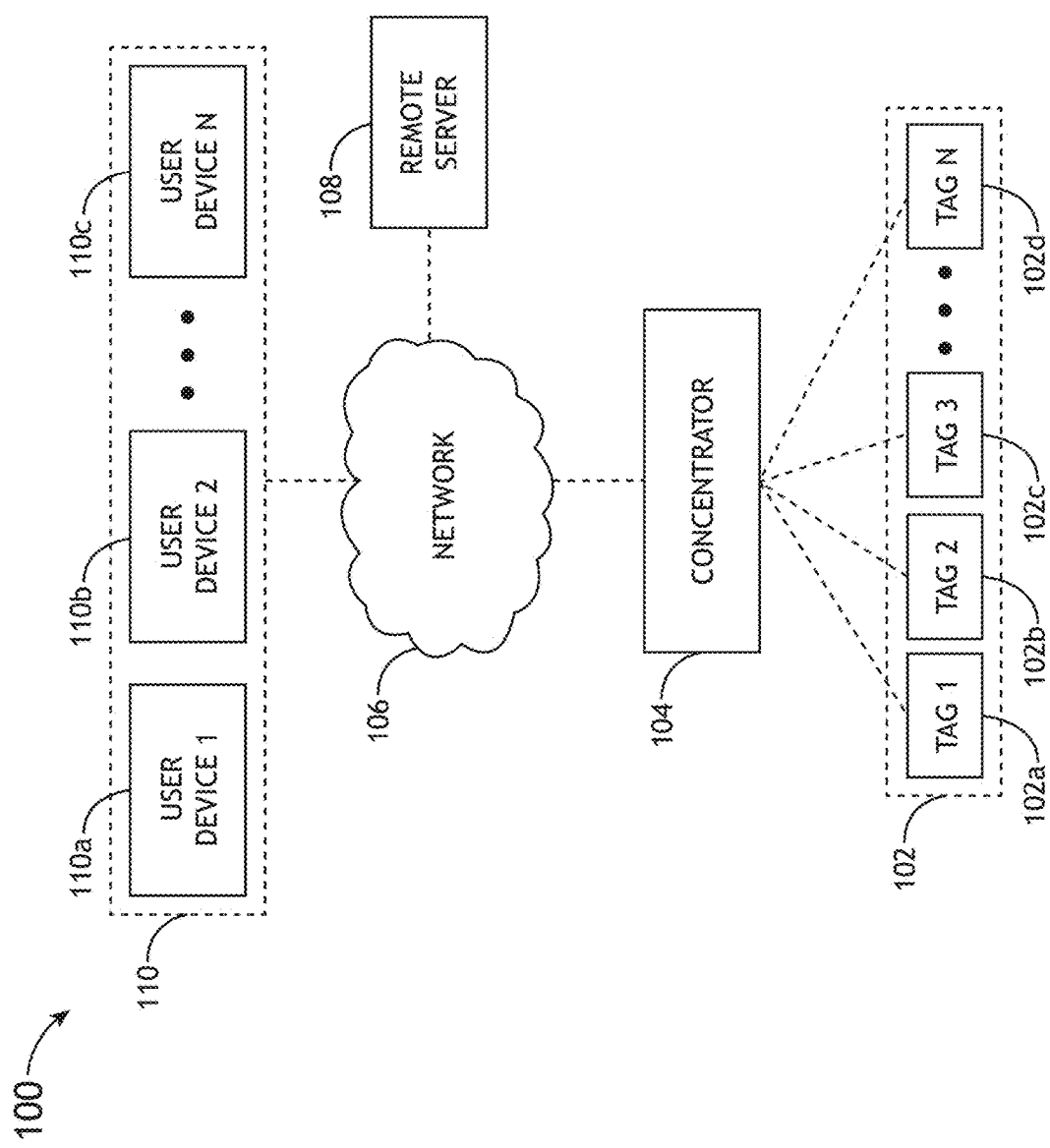
FIGS. 1A-1E illustrate a system for monitoring one or more characteristics of one or more members of an animal population, in accordance with one or more embodiments of the present disclosure.

Reference will now be made in detail to the subject matter disclosed, which is illustrated in the accompanying drawings.

Referring generally to FIGS. 1A through 5, a method and system for tracking physiological or behavioral parameters of animals in an animal population are described in accordance with the present disclosure.

Embodiments of the present disclosure are directed to one or more systems and methods for tracking, analyzing, and diagnosing the health of an individual animal or an animal population. Embodiments of the present disclosure may acquire a variety of metrics from an animal (or from animals) to assist in early diagnosis and analysis of the health of an animal population (e.g., cattle herd). For example, the present disclosure may be utilized to monitor and diagnose the health of an animal herd (e.g., cattle, swine, and the like) in a commercial feedlot setting. The on-animal devices of the present disclosure may communicate wirelessly with users (e.g., feedlot managers, pen riders and the like) regarding the likelihood of illness of one or more members of the given animal population, which provides for early treatment and reduced herd loss. The on-animal sensors and analysis routines of the present disclosure will allow for monitoring of a variety of animal characteristics (e.g., physiological and behavior), patterns, weather data, and the like, alerting pen riders and feedlot managers of early signs of illness. The early detection of illness in an animal population may also assist in optimizing weight gain rates, reducing the use of antibiotics, allowing for biosecurity and proactive outbreak procedures, and reducing labor and manpower usage.

Embodiments of the present disclosure may include animal characteristics measurement and/or tracking, such as, but not limited to, head tilt tracking, activity tracking, nutrient uptake tracking (e.g., position and/or proximity sensing), and the like. In addition, embodiments of the present disclosure may include physiological metric measurement and/or tracking, such as, but not limited to, temperature measurement and/or tracking. Embodiments of the present disclosure may provide for individual and herd trend analysis with predictive modeling. Additional embodiments of the present disclosure may allow producers to monitor animal and herd trends through historical and predictive data, allowing for proactive measures to increase production.

FIGS. 1A-1D illustrate a system 100 for monitoring one or more characteristics of one or more members of an animal population, in accordance with one or more embodiments of the present disclosure. The system 100 may monitor the health of one or more animals via the tracking of physiological and/or behavioral characteristics of one or more animals in a given animal population.

In one embodiment, the system 100 includes one or more tag assemblies 102. For example, the system 100 may include, but is not limited to, a set of animal tag assemblies 102a-102d disposed on members of at least a portion of an animal population. For instance, the system 100 may include, but is not limited to, tag assembly 102a for monitoring one or more characteristics of a first animal, tag assembly 102b for monitoring one or more characteristics of a second animal, tag assembly 102c for monitoring one or more characteristics of a third animal, and a tag assembly 102d for monitoring one or more characteristics of an Nth animal.

In another embodiment, the system 100 includes a concentrator 104 (or network of concentrators) that is communicatively couplable to the set of tag assemblies 102a-102d. For example, the concentrator 104 may be, but is not required to be, communicatively coupled (e.g., wirelessly coupled using a selected communication protocol) to the one or more tag assemblies 102 such that the data acquired via the one or more tag assemblies 102a-102d is collected from the one or more tag assemblies 102a-102d. It is noted herein that the terms "concentrator" is used interchangeably with "receiver" and/or "base station" throughout the present disclosure.

In another embodiment, the concentrator 104 is also communicatively coupled to a controller 108 (e.g., remote server 108) via a network 106. For example, the remote server 108 may include, but is not limited to, one or more servers. For instance, the remote server 108 may include, but is not limited to, a remote server coupled to the concentrator 104 via network 106. It is noted herein that the terms "controller 108" and "remote server 108," as used throughout the present disclosure, may be considered to be interchangeable.

In another embodiment, one or more user devices 110 are communicatively coupled to the remote server 108. In one embodiment, the one or more user devices 110 are indirectly coupled to the remote server 108 via the network 106. It is noted herein that the system 100 may allow for any number of user devices to communicate with the remote server 108. For example, the system 100 may provide for communication between a first user device 110a, a second user device 110b, and up to an including an Nth user device 110n and remote server 108 via network 106. It is further noted that the one or more user devices 110a-110n may include any user device known in the art. For example, the one or more user devices 110a-110n may include, but are not limited to, a desktop computer, a tablet computer, a mobile phone (e.g., smartphone), or a wearable device (e.g., smartwatch and the like). In another embodiment, the one or more user interfaces 110 are directly coupled (not shown) to the remote server 108.

In another embodiment, one or more user devices 110 are communicatively coupled to the concentrator 104. In one embodiment, the one or more user devices 110 are indirectly coupled to the concentrator 104 via the network 106. In another embodiment, the one or more user devices 110 are directly coupled (not shown) to the concentrator 104.

The network 106 may include any wireless and/or wireline network protocol known in the art. For example, the network 106 may include, but is not limited to, an internet or an intranet (e.g., LAN, WLAN and the like). By way of another example, network 106 may include a cloud based architecture.

Figure 1B:
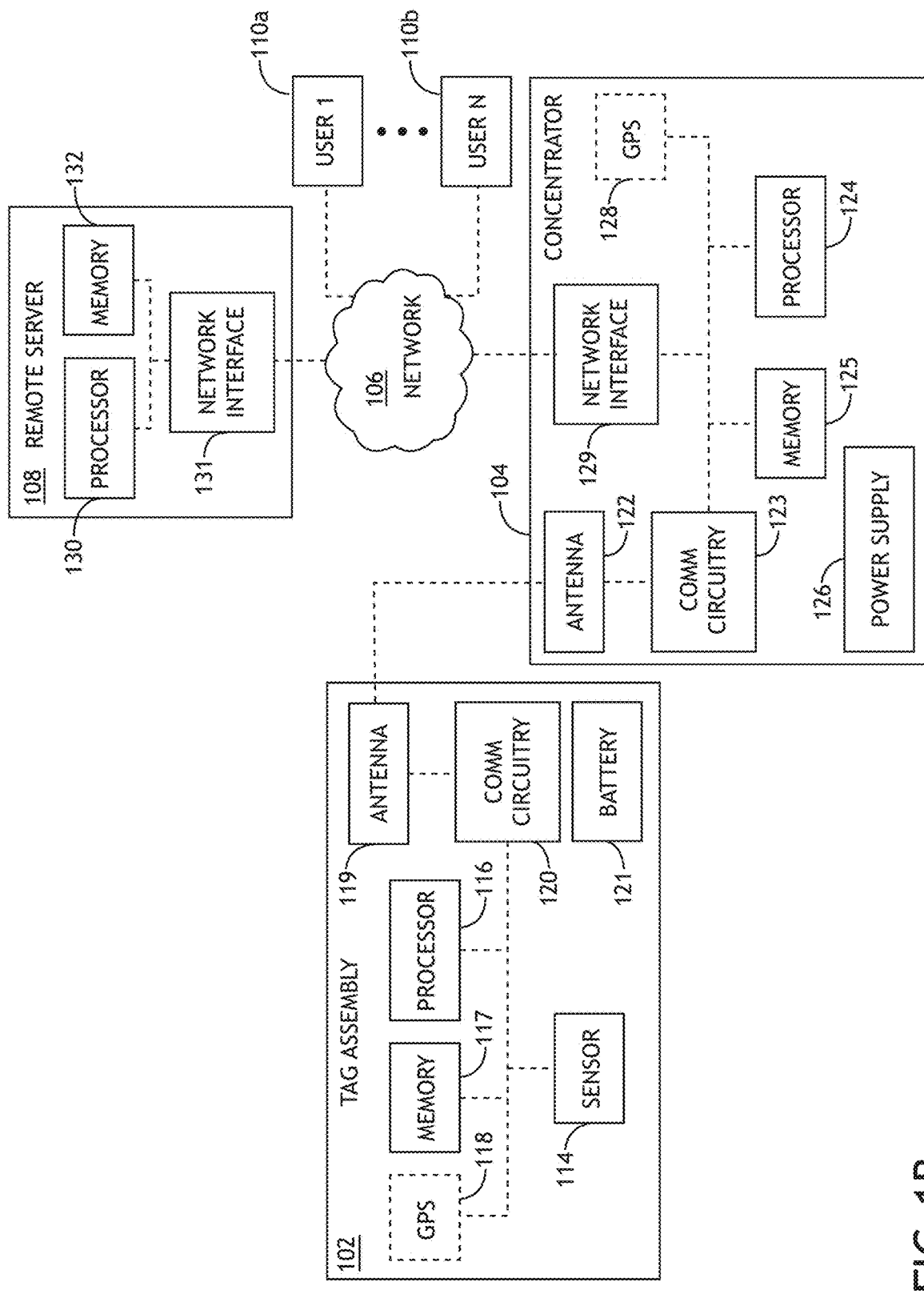

FIG. 1B illustrates a system 100 for monitoring one or more characteristics of one or more members of an animal population, in accordance with one or more embodiments of the present disclosure. As noted previously herein, system 100 may include one or more tag assemblies 102, a concentrator 104, a network 106, and a remote server 108.

In one embodiment, the one or more tag assemblies 102 (hereinafter "tag assembly 102") include one or more sensors 114. The one or more sensors 114 may include any sensor known in the art capable of measuring one or more physiological and/or behavioral characteristics of an animal. For example, the one or more sensors 114 may include, but are not limited to, one or more temperature probes (e.g., IR temperature sensors, thermocouples, thermistors, and the like), one or more heart rate monitors (e.g., optical heart monitors), one or more accelerometers, one or more magnetometers, one or more gyroscopes, one or more inertial measurement units, one or more location sensors, and the like.

In one embodiment, the one or more sensors 114 of the tag assembly 102 may measure one or more physiological characteristics. For example, one or more sensors 114 may include a thermal probe (e.g., thermocouple) for measuring the temperature of an animal with which the given tag assembly 102 is disposed. In this regard, temperature data of given animal may be measured and tracked as a function of time. By way of another example, one or more sensors 114 may include a heart monitor for measuring the heart rate of an animal with which the given tag assembly 102 is disposed. In this regard, heart rate data of given animal may be measured and tracked as a function of time.

In another embodiment, the system may measure one or more behavioral characteristics. In one embodiment, the one or more behavioral characteristics may include activity and/or movement characteristics. The one or more sensors 114 of tag assembly 102 may include an accelerometer, such as a three-axis accelerometer, configured to measure motion data associated with the given animal. Additionally and/or alternatively, the one or more sensors 114 may be configured as a motion sensor (e.g., nine-axis motion sensor) equipped with an accelerometer, gyroscope and/or magnetometer (or consolidated IMU). Activity and/or movement characteristics tracked by the one or more sensors 114 may include, but are not limited to, the number of steps an animal takes over a selected time period. By way of another example, activity/movement characteristics may include frequency and/or duration of chewing, range of motion (e.g., range of head motion), body movements, the frequency and duration of trips to a feed and/or water source, and the like.

It is noted that the system 100 may be configured to measure additional characteristics. For example, the one or more sensors 114 of the tag assemblies 102 may also measure, but are not limited to measuring, one or more animal posture characteristics. In one embodiment, animal posture characteristics may include, but are not limited to, head tilt, body lean, gait, or the like. For example, head tilt may be determined for a given animal by measuring the relative position (e.g., height of head relative to an initial head position) associated with a given tag assembly 102 in order to deduce the height of the animal's head, and, thus, the tilt of the animals head and/or neck. The head tilt measurement may consist of a relative head tilt measurement. For example, the relative head tilt measurement may include comparing a measured head tilt value to one or more head tilt values or statistically aggregated head title values (e.g., averages) of a portion of the animal population. By way of another example, a relative head tilt measurement may include comparing a measured head tilt value to an initial head tilt value (or a time-averaged value) of the same animal. By way of another example, the one or more sensors 114 of a given tag assembly 102 may include an accelerometer, magnetometer and/or gyroscope (or a consolidated IMU) suitable for measuring the head tilt of a given animal.

It is further noted herein that the absolute value as well as the relative value of any measurement may be monitored. For example, a change in any one or more physiological and/or behavioral characteristics may indicate a change in health of the given animal. By way of another example, a deviation in any one or more physiological and/or behavioral characteristics of a given animal from a group of other animals of the animal population may indicate a deviation in health of the given animal from the rest of the animal population. In this regard, the one or more sensors 114 of tag assembly 102 may be used to identify an outlier of the animal population.

While the foregoing and following detailed description relates system 100 to use on animals, this is not to be understood as a limitation of the present disclosure. Those skilled in the art will recognize that the systems and methods disclosed herein may also be configured to identify diseases and infections in humans. For example, one or more tag assemblies 102 of system 100 equipped with one or more sensors 114 may be disposed on and/or within a human subject. In this regard, the present disclosure may be configured to track one or more physiological and/or behavioral characteristics in order to identify diseases and infections. For example, the one or more tag assemblies 102 may be configured to track the human subject's temperature and activity. By further way of example, the one or more tag assemblies 102 may be configured to track any other physiological and/or behavioral characteristic including, but not limited to, heart rate, posture, and the like.

In another embodiment, the tag assembly 102 includes a memory 117 and a processor 116. In this regard, any of the one or more physiological and/or behavioral characteristics measured by the one or more sensors 114 may be permanently or temporarily stored in memory 117. In another embodiment, when the given tag assembly 102 is interrogated by the concentrator 104, the processor 116 may direct the communication circuitry 120 and antenna 119 of the tag assembly 102 to transmit all or a portion of the stored one or more physiological and/or behavioral characteristics to the concentrator 104.

In another embodiment, the tag assembly 102 includes a power supply for powering any one of the various components of the tag assembly 102. For example, the tag assembly 102 may include one or more batteries 121, one or more power generating devices (e.g., piezoelectric device, photovoltaic cell and the like), a combination of one or more batteries and power generating devices, and the like. It is noted herein that the tag assembly 102 may utilize any battery technology known in the art.

In another embodiment, the tag assembly 102 includes one or more GPS chips 118 suitable for measuring the location of the given tag assembly 102. In some embodiments, the GPS chip 118 is configured to generate a timestamp corresponding to a time of data acquisition. It is noted herein that the GPS chip 118 may be used to measure one or more characteristics of a given animal through the tracking of position of the given animal. It is recognized herein that relative position of the tag assembly 102 may be deduced in a variety of ways without the need of a GPS chip, which will be discussed further herein.

In another embodiment, the tag assembly 102 includes communication circuitry 120. It is noted herein that the communication circuitry 120 may alternately be referred to as a "data radio." The memory 117 may include any memory type known in the art. For example, the memory 117 may include, but is not limited to, an Electrically Erasable Programmable Read Only Memory (EEPROM) device. The processor 124 may include, but is not limited to, a microcontroller unit (MCU). It is noted herein that the communication circuitry 120 and the antenna 119 may be configured to operate in any frequency band known in the art. In one embodiment, the communication circuitry 120 and the antenna 119 are configured to operate in a Radio Frequency (RF) band. In one embodiment, the communication circuitry 120 and the antenna 119 are configured to operate in a selected band (e.g., band between 902 MHz and 928 MHz). It is noted herein that the antenna 119 may be of any type known in the art, including, but not limited to, an embedded antenna or an external antenna.

In one embodiment, the one or more tag assemblies 102 are communicatively coupled to the concentrator 104 via a local communication link. For example, the one or more tag assemblies 102 may be coupled to the concentrator 104 via a local wireless communication link. For instance, the concentrator 104 may include, but is not limited to, communication circuitry 123 coupled to an antenna 122. Further, the communication circuitry 123 and the antenna 122 may be configured to wirelessly communicate with the communication circuitry 120 and antenna 119 of one or more tag assemblies 102. In one embodiment, the communication circuitry 120 may include a radio frequency (RF) module suitable for transmitting one or more signals to the communication circuitry 123 of the concentrator 104. The communication circuitry 120 and 123 may be compatible with any wireless protocol known in the art, such as, but not limited to, Bluetooth, Low Energy Bluetooth, WiFi, RFID, and the like. In this regard, any of the one or more physiological and/or behavioral characteristics measured by the one or more tag assemblies 102 may be transmitted from the one or more tag assemblies 102 to the concentrator 104, and then stored, permanently or temporarily, in memory 125 of the concentrator 104.

It is noted herein that the power supply 126 of concentrator 104 may include any power supply known in the art including, but not limited to, a battery or a transformer configured to convert AC power to DC power. In one embodiment, the concentrator 104 includes one or more processors 116 and memory 125. The memory 125 may include, but is not limited to, EEPROM memory. The processor 124 may include, but is not limited to, an MCU.

In another embodiment, the concentrator 104 includes one or more GPS chips 128 configured to determine the location of the concentrator 104. In some embodiments, the GPS chip 128 is configured to generate a timestamp corresponding to a data acquisition time. In this regard, the location of the concentrator 104 may be tracked as a function of time.

In one embodiment, the concentrator 104 includes network interface circuitry 129 communicatively coupled to the remote server 108 via network 106. It is noted herein that network interface circuitry 129 may be configured to communicate with the remote server 108 using any network protocol known in the art including, but not limited to, Ethernet, WiFi, 3G, 4G, 4G LTE, 5G, and the like. Furthermore, the concentrator 104 and remote server 108 may be communicatively coupled via any wireless or wireline mechanism known in the art. It is further noted that multiple network protocols may be utilized. In some embodiments, the concentrator 104 includes multiple network interfaces.

It is noted herein that one or more of the data analysis routines of the present disclosure may be performed using the one or more processors 116 of tag assembly 102. In additional and/or alternative embodiments, the one or more data analysis routines of the present disclosure may be performed using the one or more processors 124 of concentrator 104.

In another embodiment, the one or more processors 116 may direct network interface circuitry 129 to transmit the one or more physiological and/or behavioral characteristics to the remote server 108. In one embodiment, the remote server 108 may include one or more processors 130 and memory 132. In this regard, the remote server 108 may receive the one or more physiological and/or behavioral characteristics from the concentrator 104 (via signal from network 106) and apply one or more of the various analysis routines of the present disclosure. For example, the remote server 108 may include network interface circuitry 131 for interfacing with network 106. In this regard, memory 132 may maintain any set of program instructions required to implement data analysis routines for determining a state of health of one or more animals based on the received one or more physiological and/or behavioral characteristics.

It is noted herein that the remote server 108 may be configured to perform one or more tasks associated with data collected by the one or more tag assemblies 102. For example, the remote server 108 may be configured to store data and/or to generate one or more statistics relevant to the interpretation of the data. It is noted herein that one or more of the data analysis routines of the present disclosure may be performed using one or more processors 130 (and program instructions) on-board the remote server 108 configured to perform data analysis. In one embodiment, the remote server 108 is configured to store health monitoring data collected by the one or more tag assemblies 102. In another embodiment, the remote server 108 is configured to generate a relative risk level for each of the animals in the animal population according to one or more statistical metrics calculated using data collected by the one or more tag assemblies 102. In some embodiments, the remote server 108 includes multiple redundant devices. For example, the remote server 108 may include a third party server.

In one embodiment, the remote server 108 may receive all or some of the received physiological and/or behavioral data via network 106. For example, the remote server 108 may receive time-stamped data regarding temperature and activity. By further way of example, the remote server 108 may receive additional physiological and/or behavioral data including, but not limited to, heart rate, posture characteristics (e.g., head tilt, body lean, gait, or the like), and the like. In another embodiment, the one or more processors 130 of remote server 108 may be configured to execute a set of program instructions stored in memory 132, the program instructions configured to cause the one or more processors 130 to determine a health state of the one or more animals based on the received physiological data and/or behavioral data.

In one embodiment, the one or more processors 130 of remote server 108 may be configured to execute a set of program instructions stored in memory 132, the set of program instructions configured to cause the processors 130 to carry out the various functions of the present disclosure. In one embodiment, the set of program instructions may be configured to cause the remote server 108 to receive raw data from one or more tag assemblies 102. In another embodiment, the set of program instructions may be configured to cause the one or more processors 130 to pre-process the raw data. In another embodiment, the set of program instructions may be configured to cause the one or more processors 130 to filter the data. In another embodiment, the set of program instructions may be configured to cause the one or more processors 130 to extract one or more features from the data and format the data for machine learning. In another embodiment, the set of program instructions may be configured to cause the one or more processors 130 to use the formatted data to train a machine learning classifier. In another embodiment, the set of program instructions may be configured to cause the one or more processors 130 to make one or more assessments and/or one or more predictions regarding one or more animals using the machine learning classifier.

In one embodiment, the set of program instructions may cause the remote server 108 to receive raw data from one or more tag assemblies 102. It is noted that one or more tag assemblies 102 may collect and/or transmit raw data to the remote server 108 for any timeframe. For example, tag assembly 102 may only collect and transmit physiological and/or behavioral data for a specified time period (e.g., 4:00 PM-6:30 PM, 5:00 AM-7:00 AM, and the like). It is noted herein that various physiological and behavioral characteristics may provide the most valuable insight into the health of an animal during specific time periods. For instance, elevated temperatures between 12:00 AM and 6:00 AM may be indicative of a viral infection. In this regard, tag assembly 102 may be configured to collect and transmit data during this specific time period. In an alternative embodiment, the one or more tag assemblies 102 may be configured to collect and transmit data throughout the entire day.

It is further noted that data may be transmitted by tag assembly 102 and received by the remote server 108 at any interval known in the art. For example, data may be transmitted and/or collected at specified intervals (e.g., every ten seconds, thirty seconds, one minute, and the like). Alternatively, it is noted that the frequency at which data may be transmitted and/or collected may be dependent upon the ability of the tag assembly 102 to transmit data. For example, if a tag assembly 102 is out of range or otherwise prevented from transmitting data to the concentrator 104, thereby preventing data from reaching the remote server 108, the tag assembly 102 may store the collected data in memory 117 of the tag assembly 102. In this regard, the data may be stored until the tag assembly 102 is back in range or otherwise able to transmit data. When the tag assembly 102 is able to transmit data, the data may then be transmitted to the concentrator 104, then to the remote server 108 via network 106. It is noted that data may be transmitted and/or collected using any interval other known in the art including, but not limited to, random intervals.

In another embodiment, the set of program instructions may be configured to cause the one or more processors 130 to pre-process the raw data. Pre-processing may include any statistical and/or ad hoc mathematical techniques known in the art in order to convert the raw data readings (e.g., temperature readings, activity readings, and the like) into a format which may be used for downstream data processing. For example, pre-processing may include converting hexadecimal numbers into integers. It is noted that pre-processing may be dependent on the desired characteristics of the processors 130. For example, if precise predictions are desired, a temperature reading of 37.97541° C. may be left unaffected such that the resulting predictions will be more precise. By way of another example, if faster computation is desired, the reading in the previous example may be rounded to 38° C.

It is further noted that pre-processing may alter the raw data to be used for downstream statistical analysis, or may leave the raw data in substantially the same form in which it was collected. In this regard, it is noted that pre-processing may be omitted from the present disclosure without departing from the spirit or scope of the present disclosure.

In another embodiment, the set of program instructions may be configured to cause the one or more processors 130 to filter the data. In one embodiment, the data may be filtered such that it may only include the data corresponding to particular animals. It is noted that the processors 130 may filter the data using any filtering techniques known in the art. For example, filtering the data may include filtering the data such that it only includes data for one animal, a group of animals, multiple groups of animals, and the like. In another embodiment, filtering the data may include filtering the data to include data only from a particular time period. For example, one or more tag assemblies 102 may have collected and transmitted data at minute intervals throughout the entire day. In this example, the one or more processors 130 may filter the data to include only data points collected between 12:00 AM and 6:00 AM. By way of another example, filtering the data may include filtering the data to include only data points collected in a particular location. For instance, the one or more processors 130 may filter the data to include only the data collected in a particular field.

In another embodiment, the set of program instructions may be configured to cause the one or more processors 130 to extract one or more features from the filtered data, and format the data for machine learning. It is noted that the one or more processors 130 may extract features and format the data using any mathematical manipulation or transformation known in the art which will convert the data into a form which may be used by a machine learning classifier.

For example, extracting features and formatting the dataset may include grouping the dataset into one or more groups. Similarly, one or more groups may be divided into one or more subsets. It is noted that the readings in the dataset may be broken into groups and subsets according to, but not limited to, timeframe, animal, group of animals, location, and the like.

In another embodiment, the set of program instructions may be configured to cause the one or more processors 130 to transpose the dataset into a format appropriate for downstream data processing. For example, the one or more processors 130 may transpose the dataset into a format that allows for "time-series" consistent objects. In this regard, the dataset may be transposed such that the data is arranged and sorted according to time/space relationships.

In another embodiment, the set of program instructions may be configured to cause the one or more processors 130 to scale and/or normalize the dataset. It is noted that scaling and/or normalizing the dataset may facilitate machine learning, and allow for more accurate assessments and predictions. For example, the dataset may be scaled such that each set of data points relating to a physiological and/or behavioral characteristic has a mean of zero and a standard deviation one. By further way of example, the dataset may be normalized such that all values of the dataset are between zero and one. It is noted that scaling and normalizing may be necessary for accurate machine learning assessments and predictions.

In another embodiment, the set of program instructions may be configured to cause the one or more processors 130 to format the dataset into a format that is compatible with machine learning. In one embodiment, formatting done by the one or more processors 130 may be dependent on the algorithms to be performed in the downstream data analysis (e.g., machine learning predictions). In this regard, each algorithm used in the machine learning step downstream may require a specific format in order to function correctly. Thus, the formatting done by the one or more processors 130 may be algorithm-specific, and may serve as a final tuning step in order to ensure compatibility with the algorithms to be used in the downstream machine learning.

In another embodiment, the set of program instructions may be configured to cause the one or more processors 130 to train a machine learning classifier. In one embodiment, datasets taken from animals with known physiological and behavioral characteristics (e.g., known healthy physiological state, known bacterial infection, known viral infection, known normal behavior, and the like) may be used to train a machine learning classifier. For example, datasets obtained from animals with known physiological and behavioral characteristics may be used to train a supervised machine learning classifier. For instance, temperature readings, activity readings, and the like, obtained from animals with healthy physiological states may be used to train the machine learning classifier. By way of another example, temperature readings, activity readings, and the like, obtained from animals with known bacterial infections may be used to train the machine learning classifier. By way of another example, temperature readings, activity readings, and the like, obtained from animals with known viral infections may be used to train the machine learning classifier. For instance, the remote server 108 of system 100 may be used to determine the standard deviation, median, average, minimum, and maximum readings (e.g., temperature readings, activity readings, heart rate readings, and the like) of a group of animals with known demographic information (e.g., known to be healthy, known to have a viral infection, known to have a bacterial infection). This information may then be used to generate a classifier. For instance, temperature readings above a certain temperature and movement readings below a certain level may be associated with an infected animal. In this regard, the classifier may be configured to generate a multi-variable correlation regarding the physiological state of a group of animals. The classifier, in turn, may then be used to classify the health status of additional animals.

In another embodiment, the set of program instructions may be configured to cause the one or more processors 130 to make one or more assessments and/or one or more predictions regarding the health state of one or more animals using a machine learning classifier.

In one embodiment, the machine learning classifier may be configured to correlate multiple dataset characteristics to a particular health state. For example, the machine learning classifier may be able to correlate multiple physiological and/or behavior characteristics to a particular health state of an animal. In this regard, a multi-variable relationship between the health state of an animal and two or more physiological and/or behavior characteristics may be determined. For example, the classifier may be configured to determine a relationship between the health state of an animal and the animal's temperature and activity readings. For instance, a first temperature reading and a first activity reading may be associated with a "healthy" animal, while a second temperature reading and a second activity reading may be associated with an "unhealthy" animal. It is recognized that any of the measured characteristics described previously herein may be utilized in a multi-variable context to determine the health state of an animal.

In one embodiment, machine learning may be able to make several inferences regarding the data including, but not limited to, classification assignments, regression coefficients, behavioral predictions, health assessments, and the like. For example, if a machine learning classified received information regarding an animal's activity over the previous ten days, the machine learning classifier may be used to predict the animal's activity over the next ten days.

It is noted that the accuracy of the machine learning classifier may be dependent on the accuracy of the datasets obtained from animals with "known" physiological and behavioral characteristics. In this regard, if animals are incorrectly classified as "healthy" when in fact the animals are suffering from some disease or infection, the incorrectly labeled datasets may inhibit the ability of the classifier to make accurate assessments and predictions.

In another embodiment, the machine learning classifier may be configured to analyze one or more physiological and/or behavioral characteristics of an animal over a period of time in order to make inferences regarding the animal's health and/or behavioral state. In this regard, the present disclosure may be used to determine if an animal is healthy, sick, diseased, showing early warning signs of sickness, and the like. It is noted herein that the present disclosure may allow a user to more effectively and efficiently provide medical attention to those animals in need, and to detect the early warning signs of sickness such that diseases and infections can be minimized.

A detailed field study of this and physiological and behavioral correlations may be found with reference to the QuantifiedAg trial study MCL 17053, conducted in June 2017, which is attached hereto and incorporated by reference in the entirety.

For example, as noted in the trial study, cattle suffering from a bacterial infection may exhibit higher temperatures. Furthermore, as noted in the trial study, cattle suffering from a bacterial infection may exhibit depressed activity readings (e.g., lower movement). In this regard, the classifier may be configured to receive datasets from an animal with an unknown physiological state and make an assessment regarding the animal's health (e.g., healthy, bacterial infection, viral infection, and the like).

It is noted that the remote server 108 may receive physiological and/or behavioral measurements over a selected time period such that the classifier may be trained with a larger dataset. In this regard, the classifier may be configured to infer an animal is unhealthy or potentially unhealthy based on measured deviations in one or more datasets received from the animal over time.

In another embodiment, the classifier may make one or more assessments and/or one or more predictions regarding one or more animals by monitoring the one or more measured characteristics of the animal as a function of time and/or location. For example, one or more measured physiological and/or behavior characteristics for an animal may be monitored as a function of time. In this regard, physiological and/or behavior characteristics measured at a first time instance (or across a first time interval) may compared to one or more measured physiological and/or behavior characteristics at a second time instance (or across a second time interval) (and a third time instance, a fourth time instance and so on). In this regard, the classifier may identify an unhealthy animal, or a potentially unhealthy animal, by observing deviations in the animal's behavior as a function of time.

In another embodiment, the remote server 108 may serve one or more results of the health state determination to the one or more user devices 110a, 110b via network 106. For example, upon identifying an animal displaying characteristics indicative of an illness (or injury), the one or more processors 130 may cause the remote server 108 to transmit an alert to the one or more user devices 110a, 110b. In addition, one or more users, via the one or more user devices 110a, 110b, may request the particular type(s) of physiological and/or behavioral characteristics that the remote server 108 should use for determining a health state in one or more animals of the population, as described further herein.

It is further noted herein that the one or more user devices 110a, 110b may be configured to display one or more statistical metrics (e.g., an information set) calculated using data collected by the one or more tag assemblies 102 and/or raw data collected by the one or more tag assemblies 102. The one or more statistical metrics may be calculated using one or more processors 130 on-board the remote server 108 or using one or more processors 116 on-board the concentrator 104. In some embodiments, the one or more user devices 110a, 110b are configured to display the same information (e.g. to provide access to data from multiple locations).

While much of the description of the present disclosure is directed to making one or health determinations of a given animal using machine learning techniques, this is not to be interpreted as a limitation of the present disclosure. In this regard, it is noted that system 100 may additionally and/or alternatively utilize non-machine learning techniques to determine the health or make health predictions of an animal.

For example, a tag assembly 102 affixed to an animal may collect and process temperature and accelerometer readings (e.g., raw data) over the course of a selected time period (e.g., ten minutes, one hour, and the like). In collecting temperature readings, the tag assembly 102 may collect multiple temperature readings (e.g., raw data) over a selected time period, and determine a temperature metric for the animal based on the collected temperature readings, where the temperature metric is indicative of the animal's temperature throughout the selected time period. It is contemplated that the temperature metric may be determined using any mathematical formula or algorithm known in the art including, but not limited to, averages, sums, and the like. By way of example, the temperature metric may be determined by determining the average temperature reading over a selected time period. It is noted that a temperature metric which is wholly and/or partially based on an average may mitigate variance.

For instance, tag assembly 102 may collect three temperature readings every fifteen minutes, and average the three readings in order to obtain a temperature metric (average temperature in this example) of the animal over that selected fifteen-minute period. This process may be repeated four times such that temperature readings are collected over the course of an hour. As noted previously herein, temperature readings obtained by the tag assembly 102 may include infrared temperature sensor readings, surface mount temperature readings, and the like. Similarly, temperature readings obtained by tag assembly 102 may take into account ambient, local temperatures in order to obtain more accurate animal temperature readings. In this regard, final temperature readings generated by tag assembly 102, and therefore the temperature metrics, may be based on a combination of animal temperature readings and local weather temperatures in order to obtain a complete picture of the animal's temperature throughout the selected time period.

In a similar manner, one or more sensors 114 of tag assembly 102 may collect activity data of the animal over a selected time period (e.g., an hour, two hours, and the like). It is noted herein that accelerometer readings (e.g., raw activity data) may be used to determine specific activities of the animal including, but not limited to, step count, feeding count, coughing, animal posture (e.g., standing, laying), and the like. In one embodiment, accelerometer readings collected over the selected time period may be processed to determine an acceleration metric of the animal, where the acceleration metric is a value which is indicative of the animal's movement over the selected time period. It is contemplated that the acceleration metric may be determined using any mathematical formula or algorithm known in the art including, but not limited to, averages, sums, and the like.

For example, an accelerometer (e.g., sensor 114) on/within tag assembly may be positioned such that acceleration along the X-axis (e.g., $\alpha_x$) indicates movements of the animal's head left and right, from the animals perspective. Similarly, acceleration along the Y-axis (e.g., $\alpha_y$) may indicate movements of the animal's head forward and backward, and acceleration along the Z-axis (e.g., $\alpha_z$) may indicate movements of the animals head up and down, from the animal's perspective. Over the course of an hour (a selected time period), acceleration along each axis (e.g., $\alpha_x$, $\alpha_y$, $\alpha_z$) may be measured and collected at specified intervals (e.g., every second, every fifteen seconds, every minute, and the like). The absolute value of each $\alpha_x$, $\alpha_y$, and $\alpha_z$ acceleration component readings may then be taken and added up to determine total acceleration component values (e.g., $\Sigma\alpha_x$, $\Sigma\alpha_y$, $\Sigma\alpha_z$) for the selected time period. Thus, in this example, with readings taken every second for an hour, the total acceleration components would have 3600 readings each (1 reading/sec*60 sec/min*60 min/hr=3600 readings/hr). Therefore, in this example, $\Sigma\alpha_x=|\alpha_{x1}|+|\alpha_{x2}|+|\alpha_{x3}|+ \ldots +|\alpha_{x36000}|$, $\Sigma\alpha_y=|\alpha_{y1}|+|\alpha_{y2}|+|\alpha_{y3}|+ \ldots +|\alpha_{y36000}|$, and $\Sigma\alpha_z=|\alpha_{z1}|+|\alpha_{z2}|+|\alpha_{z3}|+ \ldots +|\alpha_{z36000}|$. At the end of the selected time period (one hour in this example), all the accelerometer readings may be compiled and turned into a single acceleration metric representing the total acceleration of the animal over the course of the hour. The acceleration metric may be determined using any algorithm or formula known in the art. For instance, the acceleration metric may be determined by taking the square root of the sum of the total acceleration component readings, such that Acceleration Metric=$\sqrt{(\Sigma\alpha_x)^2+(\Sigma\alpha_y)^2+(\Sigma\alpha_z)^2}$.

As noted previously herein, the acceleration metric may be determined using any mathematical formula or algorithm known in the art including, but not limited to, averages, sums, and the like. Thus, the example above is provided solely for illustrative purposes, and the acceleration metric may be determined using any other formula or algorithm known in the art. It is further noted herein that, although acceleration in the given example is defined from the animal's perspective, acceleration may be defined according to any other perspective without departing from the scope of the present disclosure. Additionally, while acceleration in the present disclosure may be defined as acceleration components in the Cartesian coordinate system (e.g., $\alpha_x$, $\alpha_y$, $\alpha_z$), this is not a limitation of the present disclosure. Acceleration may be defined in any coordinate system, including, but not limited to, Cartesian coordinates ($\alpha_x$, $\alpha_y$, $\alpha_z$), spherical coordinates ($\alpha_r$, $\alpha_\theta$, $\alpha_\varphi$), or the like. In this regard, it is contemplated that acceleration may be defined in terms of acceleration components within any coordinate system.

By way of another example, an acceleration metric may be calculated using standard deviations. For instance, accelerometer readings may be taken at smaller intervals (e.g., 10 readings per second, 25 readings per second, and the like) over a selected time period to gather additional activity data. In this example, accelerometer readings for the X-axis, Y-axis, and/or Z-axis (e.g., $\alpha_x$, $\alpha_y$, $\alpha_z$) may be normalized, which may then form a time series array that shows peaks and valleys of acceleration. During specific time periods, the standard deviation may be calculated and used to determine if subsequent values (e.g., readings collected in the subsequent one second, readings collected in the subsequent three seconds, and the like) are either in-line or outside of normal activity and/or movement for the particular animal. If a value is above the standard deviation, it is considered a peak. If the value is below the standard deviation, it is considered a valley. It is noted herein that specific time sequences of peaks and valleys in Z-axis acceleration readings ($\alpha_z$), which indicates movements of the animal's head up and down, may indicate that the animal is feeding. Comparison of acceleration readings to the standard deviation of the animal may be used to determine an acceleration metric which is indicative of the movement and/or activity of the animal.

By way of another example, acceleration readings may be used to identify particular activities, such as step count, feeding, coughing, and the like. By way of example, as noted previously herein, specific time sequences of peaks and valleys in Z-axis acceleration readings ($\alpha_z$) may indicate that the animal is feeding. Similarly, specific time sequences of acceleration patterns may indicate that the animal is walking, coughing, standing, laying, or the like. In this regard, remote server 108 of system 100 may receive one or more acceleration readings from tag assembly 102 and identify one or more activities the animal conducted over the selected time period based on the one or more accelerometer readings. Similarly, remote server 108 may calculate an activity metric based on the one or more identified activities, where the activity metric is indicative of the activity of the animal over the selected time period. In one embodiment, system 100 may determine a health state of the animal based at least on the activity metric.

At the end of each selected time period, the one or more processors 116 may cause the tag assembly 102 to transmit the collected data (e.g., temperature data, acceleration data, acceleration metric, and the like) to the remote server 108 via the concentrator 104 and network 106. The one or more processors 130 of remote server 108 may then conduct additional and/or alternative data processing steps to determine the health state of the animal, make one or more health predictions of the animal, and the like. For example, the one or more processors 130 of the remote server 108 may compare an animal's temperature and activity readings for a selected time period to that animal's average historical temperature and average historical activity readings to determine any abnormalities which may indicate the animal has a sickness, disease, or other health defect.

In one embodiment, the animal's average historical temperature and average historical accelerometer readings may be determined as an average for the same selected time period for which the one or more temperature and accelerometer readings are being collected. For example, if the tag assembly 102 collects temperature readings for an hour between 4 PM and 5 PM, determining a health sate of the animal may include determining the animal's average historical temperature between the times of 4 PM and 5 PM, and comparing the average historical temperature for that time period to the collected average temperature. By way of another example, if the tag assembly 102 collects acceleration readings for an hour between 1 AM and 2 AM, determining a health sate of the animal may include determining the animal's average historical accelerometer metric between the times of 1 AM and 2 AM, and comparing the average historical accelerometer metric for that time period to the calculated accelerometer metric.

In additional and/or alternative embodiments, calculated temperature metrics and acceleration metrics may be compared to average historical temperature metrics and average historical acceleration metrics of other animals, other groups of animals, the animal population, other animal populations, standardized characteristics, and the like. Standardized characteristics may include average values for the type of animal at issue. By way of example, if a new animal were tagged with a tag assembly 102, there may be no historical data for that animal against which to compare calculated temperature metrics and calculated acceleration metrics. In this example, system 100 may instead compare the animal's calculated temperature and acceleration metrics to the average historical metrics of other animals, groups of animals, the animal population, standardized characteristics, and the like. In one embodiment, system 100 may compare the new animal's calculated temperature and acceleration metrics to other animals, groups of animals, etc. until sufficient data has been collected for the new animal to generate reliable average historical metrics for the new animal.

In order to reduce the amount of data collection and/or data processing conducted by system 100, data may be filtered (or selectively collected/processed) to include data only for time periods which have been identified as providing insightful data. For example, temperature readings for an animal at certain time periods of the day may be most valuable in determining the health state of the animal. Accordingly, temperature readings may be filtered (or collected) to include temperature readings only at times which fall within or immediately before/after these time periods.

Throughout the present disclosure, various data processing steps are described as being conducted on the tag assembly 102, the concentrator 104, the remote server 108, and the like. It is noted herein that these descriptions are not limiting on the scope of the present disclosure. In this regard, any data processing steps may be carried out on any of the sub-systems of the present disclosure (e.g., tag assembly 102, concentrator 104, remote server 108, user device 110, and the like). For example, referring to the examples above, any of the data processing steps (e.g., calculation of acceleration metrics, calculation of standard deviations, and the like) which are described as being carried out on the one or more processors 116 of the tag assembly 102 may additionally and/or alternatively be carried out by the one or more processors 130 of the remote server 108. By way of another example, some data processing steps may be carried out on the tag assembly 102, while other data processing steps may be carried out on the remote server 108. For instance, one or more data pre-processing steps may be carried out on the tag assembly 102, while the remaining data processing steps may be carried out on the remote server 108.

Figure 1C:
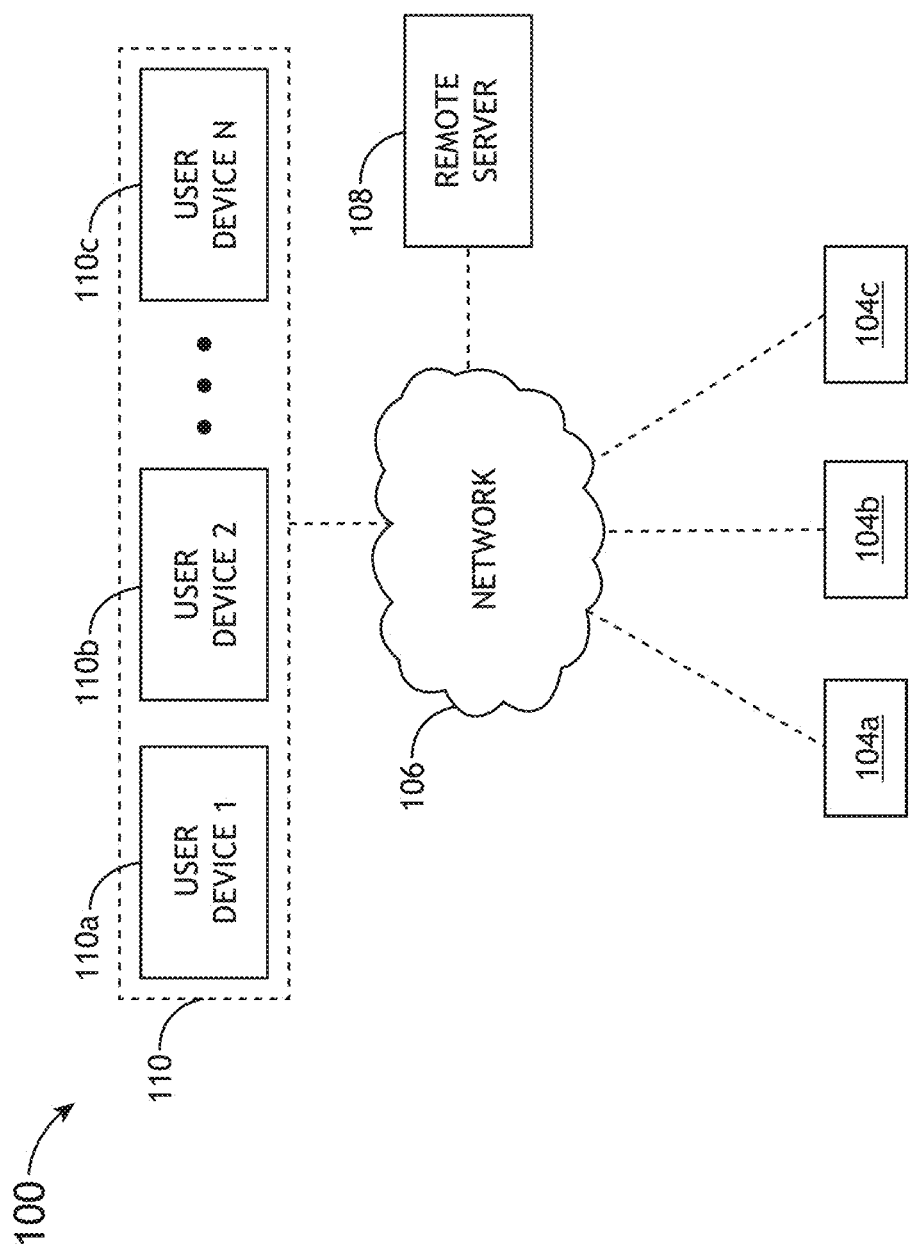

FIG. 1C illustrates a system 100 for monitoring one or more characteristics of one or more members of an animal population, in accordance with one or more embodiments of the present disclosure.

In one embodiment, system 100 may be used to "trace," or "track," animals not only within a particular area, but throughout the animal production process. By way of example, as shown in FIG. 1C, system 100 may include a first concentrator 104a, a second concentrator 104b, and a third concentrator 104c. In this example, the first concentrator 104a may be located at a first feed lot, the second concentrator 104 may be located at a second feed lot, and the third concentrator 104c may be located at a packing facility. System 100 may have any number of concentrators 104n. It is contemplated that every location and/or facility involved in the animal production process may be equipped with at least one concentrator 104 such that animals may be fully "traced" through the animal production process.

When an animal equipped with a tag assembly 102 is located at the first feed lot, it may be communicatively coupled with the first concentrator 104a. Upon communicatively coupling with the first concentrator 104a, system 100 may be configured to identify a spatial relationship between the tag assembly 102 and the first concentrator 104a. In this regard, system 100 may be configured to recognize that the animal is located at the first feed lot. For example, system 100 (via remote server 108) may be configured to identify the location of each concentrator 104 via GPS chips 128 of concentrators 104. When a tag assembly 102 communicatively couples to the first concentrator 104a, the first concentrator 104a may transmit a location indicator to remote server 108, indicating that the tag assembly 102 is communicatively coupled to the first concentrator 104a. Concentrators 104 may periodically and/or continuously transmit location indicators to remote server 108 indicating that the tag assembly 102 is communicatively coupled to the respective concentrator 104. In this regard, the remote server 108 may be able to determine, via the time-stamped location indicators, that the tag assembly is located at the first feed lot for a particular duration of time.

Continuing with the same example, the animal equipped with a tag assembly 102 may be transported to a second feed lot in the course of the food production process. The second feed lot may be equipped with a second concentrator 104a. When the animal equipped with the tag assembly 102 is located at the second feed lot, it may be communicatively coupled with the second concentrator 104b and transmit location indicators such that the remote server 108 identifies a spatial relationship between the tag assembly 102 and the second concentrator 104b, and recognizes that the animal is located at the second feed lot. Similarly, when the animal is transported to a packing facility equipped with the third concentrator 104c, the tag assembly may become communicatively coupled with the third concentrator 104c, and the third concentrator 104 may transmit a location indicator such that the remote server 108 identifies a spatial relationship between the tag assembly 102 and the third concentrator 104c, and recognizes that the animal is located at the packing facility.

Continuing with the same example, the remote server 108 may generate an animal history for the animal associated with the tag assembly 102. The animal history may include, but is not limited to, information regarding the location of the animal (tag assembly 102) at different times. For instance, the remote server 108 may generate an animal history for the tag assembly 102 which is based on the location indicators received from the first concentrator 104a, the location indicators received from the second concentrator 104b, and location indicators received from the third concentrator 104c. Due to the fact that each location indicator may be time-stamped, the animal history for the tag assembly 102 may represent a time-stamped location history for the animal (tag assembly 102) as the animal is moved throughout the animal production process.

It is contemplated herein that the "tracing" abilities of system 100 may be used by producers to track the location of their animals, assist in inventory reconciliation, and verify which animals have been bought and sold. It is further contemplated herein that system 100 may be configured to automatically update the location of an animal equipped with a tag assembly 102 in real time, near-real time, and the like (e.g., generate an animal history). Furthermore, system 100 may be configured to display the location and/or animal history of each animal (e.g., in a table format, a map format, or the like) via user devices 110.

Figure 1D:
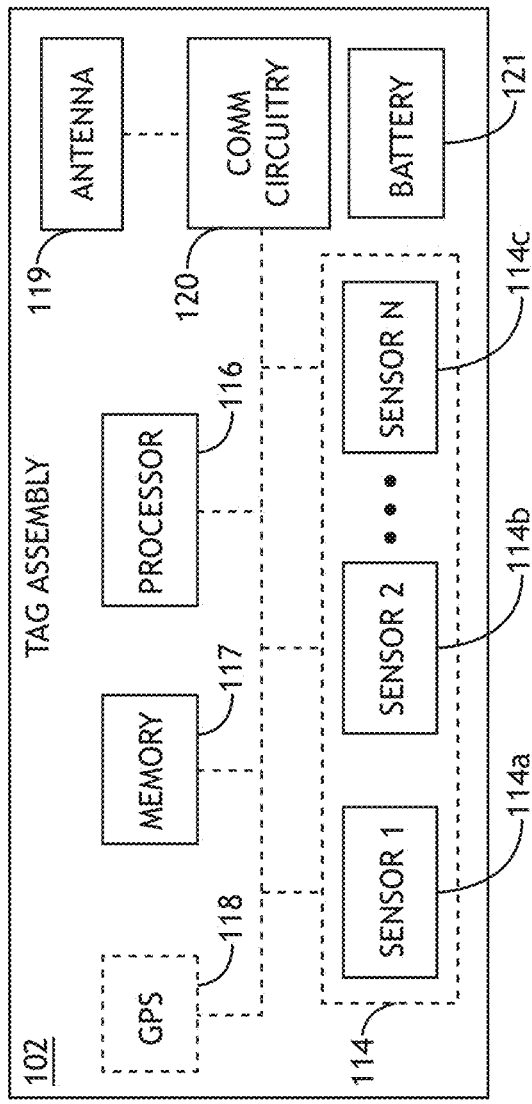

Referring now to FIG. 1D, in one embodiment, a tag assembly 102 includes multiple sensors 114. For example, the tag assembly 102 may include, but is not limited to, a first sensor 114a, a second sensor 114b and up to and including an Nth sensor 114c. In this regard, sensors 114a-114c may include any two or more sensors known in the art capable of measuring one or more physiological and/or behavioral characteristics of an animal. For example, the two or more sensors 114s1-114c may include, but are not limited to, two or more of the following: a temperature probe, a heart rate monitor, an accelerometer, a magnetometer, a gyroscope, an inertial measurement unit, a location sensor or the like.

In one embodiment, the one or more sensors 114 of the tag assembly 102 may measure one or more physiological characteristics. For example, one or more sensors 114 may include a thermal probe (e.g., thermocouple) for measuring the temperature of an animal with which the given tag assembly 102 is disposed. In this regard, temperature data of given animal may be measured and tracked as a function of time. By way of another example, one or more sensors 114 may include a heart monitor for measuring the heart rate of an animal with which the given tag assembly 102 is disposed. In this regard, heart rate data of given animal may be measured and tracked as a function of time.

In another embodiment, the system 100 may measure one or more behavioral characteristics. In one embodiment, the one or more behavioral characteristics measured by the one or more sensors 114 of the tag assemblies 102 may include, but are not limited, one or more animal posture characteristics. In one embodiment, an animal posture characteristic may include, but is not limited to, head tilt, body lean, gait or the like. For example, head tilt may be determined for a given animal by measuring the relative position (e.g., height of head relative to an initial head position) associated with a given tag assembly 102 in order to deduce the height of the animal's head, and, thus, the tilt of the animals head and/or neck. The head tilt measurement may consist of a relative head tilt measurement. For example, the relative head tilt measurement may include comparing a measured head tilt value to one or more head tilt values (or statistically aggregated head title values (e.g., average)) of a portion of the animal population. By way of another example, the relative head tilt measurement may include comparing a measured head tilt value to initial head tilt value (or a time-averaged value) of the same animal. By way of another example, the one or more sensors 114 of a given tag assembly 102 may include an accelerometer, magnetometer and/or gyroscope (or a consolidated IMU) suitable for measuring the head tilt of a given animal.

In another embodiment, the one or more behavioral characteristics measured by the one or more sensors 114 of the tag assemblies 102 may include, but are not limited, one or more position (or movement) characteristics of one or more animals. In one embodiment, the one or more position (or movement) characteristics may include, but are not limited to, the number of steps taken by the animal over a selected time period. For example, at least one of the sensors 114 on-board the tag assembly 102 associated with a given animal may include an accelerometer, such as a three-axis accelerometer, configured to measure motion data associated with the given animal. By way of another example, the sensors 114 may be configured as a motion sensor (e.g., nine-axis motion sensor) equipped with an accelerometer, gyroscope and/or magnetometer (or consolidated IMU).

In another embodiment, once the motion data is collected by the one or more tag assemblies 102, the processor and programming instructions of the concentrator 104 or the remote server 108 may convert this motion data to "animal steps" based on a pre-programmed algorithm, which relates motion data to steps. In another embodiment, the motion data captured by the one or more sensors 114 may be converted to the distance traveled by an animal over a selected time period or average speed of the animal over a selected time period. In another embodiment, as noted previously herein, one or more sensors 114 of the tag assembly 102 of a given animal may include a GPS chip 118. In this regard, a GSP-enabled tag assembly 102 may be used to directly measure the location and movement of a given animal of an animal heard.

In another embodiment, once the one or more tag assemblies 102 of the system 100 collect physiological data and/or behavioral data associated with the respective animals, the one or more tag assemblies 102 may transmit all or some of this data to the concentrators 104. In turn, the concentrator 104 may transmit all or some of the received physiological data and/or behavior data to remote server 108 (or another controller) for analysis, as described throughout the present disclosure.

Figure 1E:
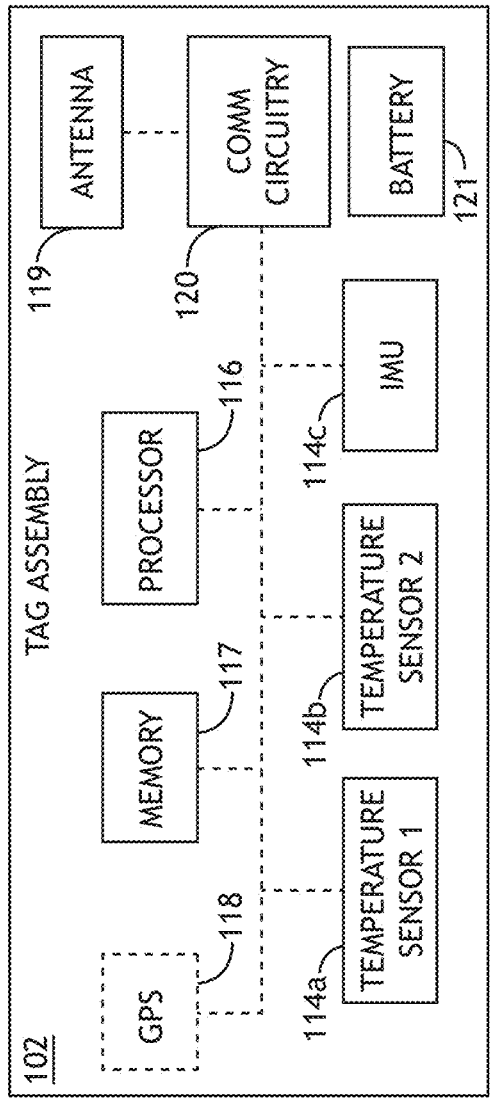

Referring now to FIG. 1E, in one embodiment, the tag assembly 102 includes one or more temperature sensors, such as, but not limited to, a first temperature sensor 114a and a second temperature sensor 114b. In another embodiment, the tag assembly 102 includes an inertial measurement unit (IMU) 122c for monitoring orientation, direction, tilt and/or movement of the tag assembly 102. For example, the IMU 122c may include, but is not limited to, an accelerometer, a magnetometer, and a gyroscope.

It is noted herein that a temperature sensor, such as the first temperature sensor 114a and/or the second temperature sensor 114a, may include any temperature sensor known in the art. For example, the first temperature sensor 114a and/or the second temperature sensor 114b may include, but are not limited to, a thermopile detector, an infrared sensor, or a resistive temperature device. It is further noted that a first temperature sensor 114a and/or a second temperature sensor 114b may detect multiple temperatures simultaneously, such as, but not limited to, the temperature of a proximate object (e.g., a portion of an ear) and the ambient temperature. In one embodiment, two temperature sensors 114a and 114b may measure a differential temperature between a proximate object (e.g., ear canal) and the ambient environment. In another embodiment, multiple temperature sensors are configured to measure multiple differential temperatures between multiple locations of an animal and the ambient environment.

In another embodiment, each of two temperature sensors 114a and 114b may simultaneously measure two temperatures such that the tag assembly 102, as a whole, simultaneously measures four temperatures.

It is noted herein that the one or more components of system 100 may be communicatively coupled to the various other components of system 100 in any manner known in the art. For example, the one or more processors 122, 116 may be communicatively coupled to each other and other components via a wireline (e.g., copper wire, fiber optic cable, and the like) or wireless connection (e.g., RF coupling, IR coupling, data network communication (e.g., 3G, 4G, 4G LTE, 5G, WiFi, WiMax, Bluetooth and the like)).

In one embodiment, the one or more processors 116, 124, 130 may include any one or more processing elements known in the art. In this sense, the one or more processors 116, 124, 130 may include any microprocessor-type device configured to execute software algorithms and/or instructions. In one embodiment, the one or more processors 116, 124, 130 may consist of a desktop computer, mainframe computer system, workstation, image computer, parallel processor, or other computer system (e.g., networked computer) configured to execute a program configured to operate the system 100, as described throughout the present disclosure. It should be recognized that the steps described throughout the present disclosure may be carried out by a single computer system or, alternatively, multiple computer systems. Furthermore, it should be recognized that the steps described throughout the present disclosure may be carried out on any one or more of the one or more processors 116, 124, 130. In general, the term "processor" may be broadly defined to encompass any device having one or more processing elements, which execute program instructions from memory 117, 125, 132. Moreover, different subsystems of the system 100 (e.g., tag assembly 102, concentrator 104, remote server 108, user devices 110) may include processor or logic elements suitable for carrying out at least a portion of the steps described throughout the present disclosure. Therefore, the above description should not be interpreted as a limitation on the present disclosure but merely an illustration.

The memory 117, 125, 132 may include any storage medium known in the art suitable for storing program instructions executable by the associated one or more processors 116, 124, 130 and the data received from one or more subsystems (e.g., tag assembly 102, concentrator 104, remote server 108, user devices 110). For example, the memory 117, 125, 132 may include a non-transitory memory medium. For instance, the memory 117, 125, 132 may include, but is not limited to, a read-only memory (ROM), a random access memory (RAM), a magnetic or optical memory device (e.g., disk), a magnetic tape, a solid state drive and the like. In another embodiment, the memory 117, 125, 132 is configured to store data including, but not limited to, entity data, association data (e.g., spatial relationship data), operations data, GPS data, time-stamped data, geo-fenced data, and the like received from one or more subsystems (e.g., tag assembly 102, concentrator 104, remote server 108, user devices 110). It is further noted that memory 117, 125, 132 may be housed in a common controller housing with the one or more processors 116, 124, 130. In an alternative embodiment, the memory 117, 125, 132 may be located remotely with respect to the physical location of the processors 116, 124, 130, tag assembly 102, concentrator 104, remote server 108, user device 110, and the like. In another embodiment, the memory 117, 125, 132 maintains program instructions for causing the one or more processors 116, 124, 130 to carry out the various steps described through the present disclosure.

In one embodiment, the user devices 110 may include any user interface known in the art. For example, the user devices 110 may include, but are not limited to, one or more desktops, tablets, smartphones, smart watches, or the like. In another embodiment, the user devices 110 include a display used to display data of the system 100 to a user. The display of the user devices 110 may include any display known in the art. For example, the display may include, but is not limited to, a liquid crystal display (LCD), an organic light-emitting diode (OLED) based display, or a CRT display. Those skilled in the art should recognize that any display device capable of integration with a user device 110 is suitable for implementation in the present disclosure. In another embodiment, a user may input selections and/or instructions responsive to data displayed to the user via the user interface 119.

It is noted that the network interface 129 of concentrator 104 may include any network interface circuitry or network interface device suitable for interfacing with network 106. Similarly, it is noted that communication circuitry 120, 123 may include any communication circuitry known in the art. For example, the network interface circuitry may include wireline-based interface devices (e.g., DSL-based interconnection, cable-based interconnection, T9-based interconnection, and the like). In another embodiment, the network interface circuitry may include a wireless-based interface device employing GSM, GPRS, CDMA, EV-DO, EDGE, WiMAX, 3G, 4G, 3G, LTE, 5G, WiFi protocols, RF, LoRa, and the like.

Figure 1F:
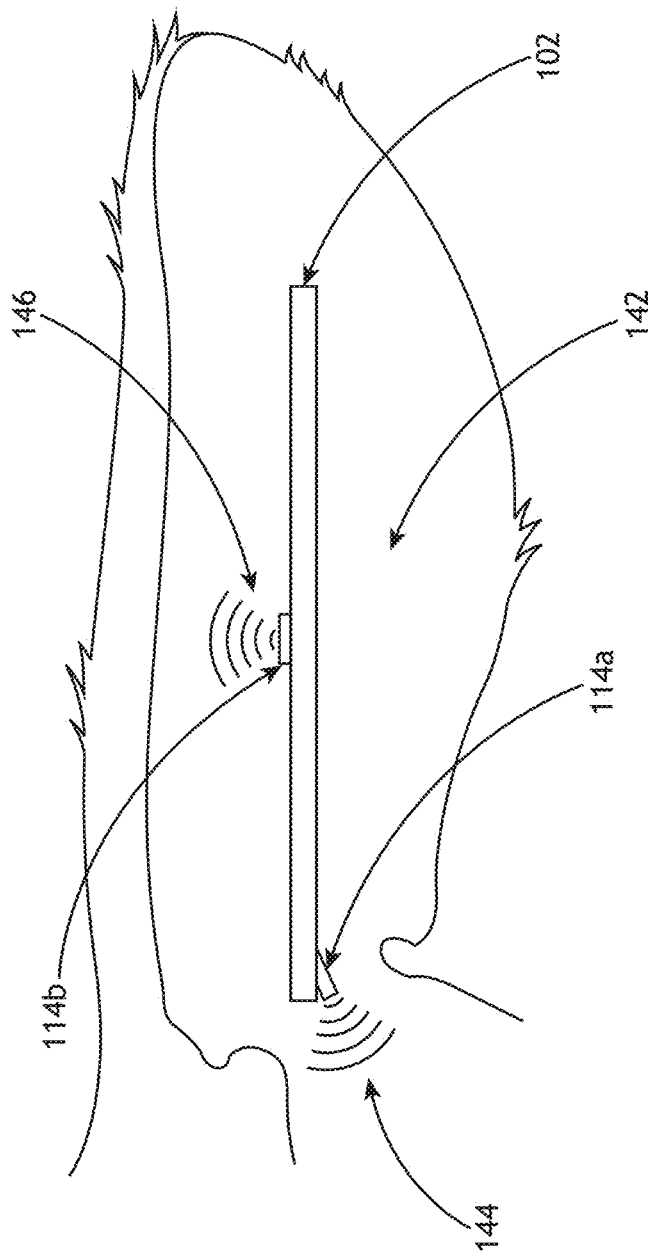
FIG. 1F illustrates a simplified schematic view of a tag assembly equipped with two temperature probes, in accordance with one or more embodiments of the present disclosure.

FIG. 1F illustrates a simplified schematic view of tag assembly 102 equipped with two temperature probes 114a, 114b and disposed within the ear of an animal. In one embodiment, a tag 102 is positioned in the ear 142 of an animal (e.g., a cow) such that first temperature sensor 114a simultaneously measures a first temperature and a second temperature, while a second temperature sensor 114b simultaneously measures a third temperature and a fourth temperature. In one embodiment, the first temperature includes a temperature of a portion of the inner ear 1444, which may be referred to as an inner ear temperature (IET). The second temperature includes an ambient temperature of the ear canal, which may be referred to as an Ambient Temperature Near Canal (ANC). The third temperature includes a temperature of a portion of the ear surface 146, which may be referred to as an Ear Surface Temperature (EST). The fourth temperature includes an ambient temperature near a printed circuit board (PCB) associated with the tag 102. The fourth temperature may be referred to as an Ambient Temperature near PCB Surface (APCB). It is noted herein that ambient temperatures (e.g. the second and fourth temperatures) may be used to calibrate the IET and EST temperature measurements. It is further noted that at extreme temperatures, such as high or low temperatures, the IET and EST temperatures may have offsets that may introduce errors when analyzed using a data analysis algorithm.

By way of example, an offset associated with the IET and/or the EST may cause a data analysis algorithm to issue a false warning. By way of another example, an offset associated with the IET and/or the EST may cause a data analysis algorithm to not issue a warning when a warning is appropriate. It is noted herein that ambient temperature measurements (e.g., the ANC and/or the APCB) may be used to adjust the IET and/or EST temperatures to generate an adjusted temperature, which serves to compensate for environmental circumstances and aids in reducing or eliminating the frequency of false positives or missed temperature deviations. By way of example, an adjusted temperature may be calculated using the equation:

$$\text{Adjusted Temp} = A \times IET + B \times EST + C \times (ANC + APCB)$$

where A, B, and C are weighting constants. In some embodiments, the value of weighting constant A is greater than the value of weighting constant B. In other embodiments, the values of one or more of the weighting constants A, B, or C may be acquired from a calibration table. For example, the IET may provide the basis function for the temperature estimate and may be weighted highest in the above equation. Further, the EST component may be weighted slightly below the IET. In addition, both ANC and APCB may be used to calibrate the IET and EST measurements.

It is noted herein that outside factors, including local temperatures, humidity, atmospheric pressure, and the like, may affect the temperature readings captured by the tag assembly 102. Accordingly, in one embodiment, one or more of the subsystems of system 100 (e.g., tag assembly 102, concentrator 104, remote server 108, and the like) may take into account local weather information in order to obtain more accurate temperature readings of the animal associated with tag assembly 102. By way of example, temperature readings of an animal obtained by tag assembly 102 at time t may be based on a number of factors including, but not limited to, the received temperature reading of tag assembly 102 at time t, the ambient local temperature at time t, and the like. By way of another example, remote server 108 may receive local weather data (e.g., temperature information) and use the received information to modify, adjust, or scale temperature readings received from tag assembly 102.

In one embodiment, a tag assembly 102 includes an indicator (not shown). It is noted herein that the indicator may be configured to generate audio or visual signals. By way example, an indicator may include an audio generation device (e.g., a buzzer) to facilitate the location of a tag assembly 102. By way of another example, an indicator may include one or more light emitting diodes (LEDs) configured to visually display the status of an animal via the state of the LED (e.g., on, off, or flashing).

Figure 1G:
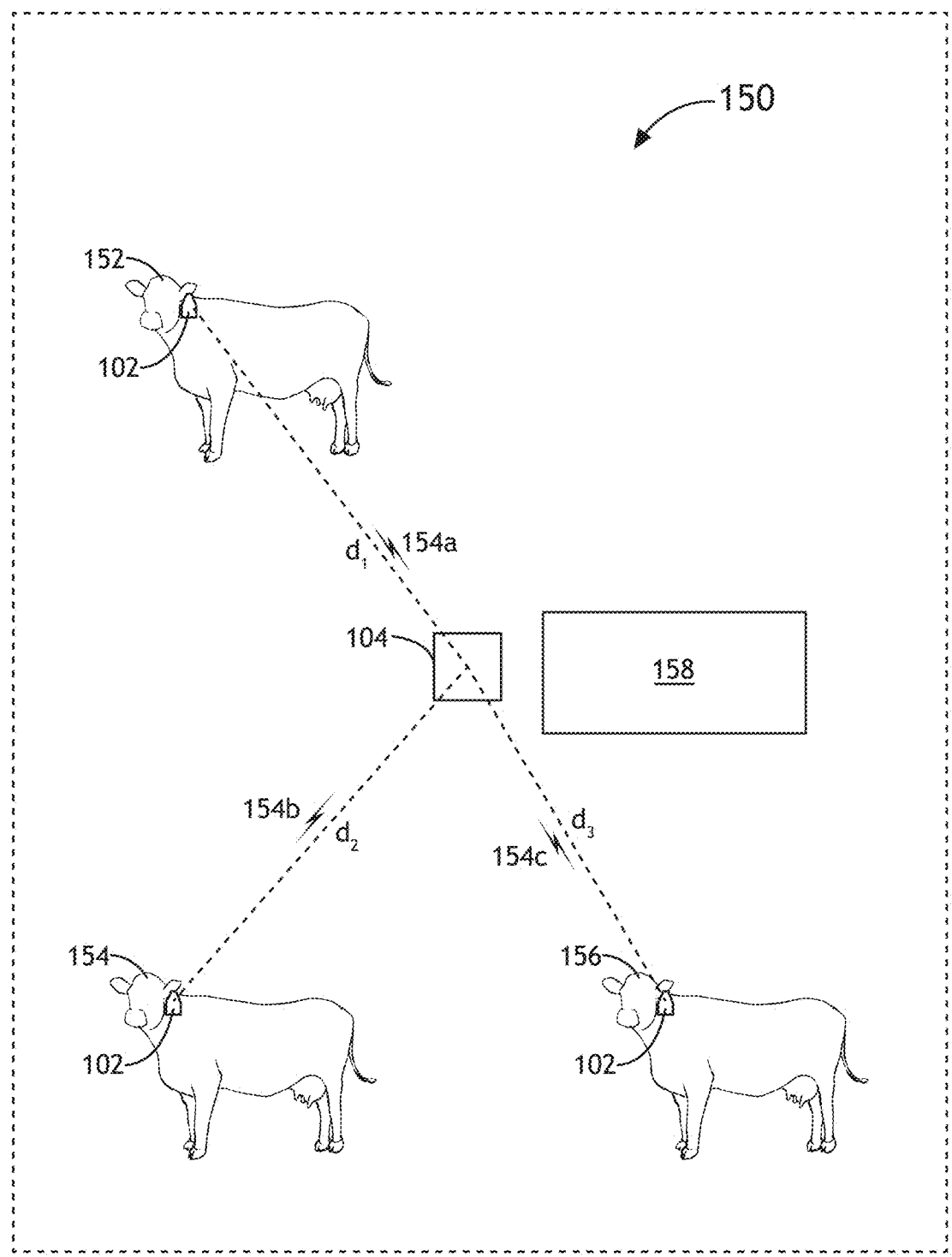
FIGS. 1G-1H illustrate the implementation of concentrator and a set of tag assemblies disposed on animals in a given animal population, in accordance with one or more embodiments of the present disclosure.
Figure 1H:
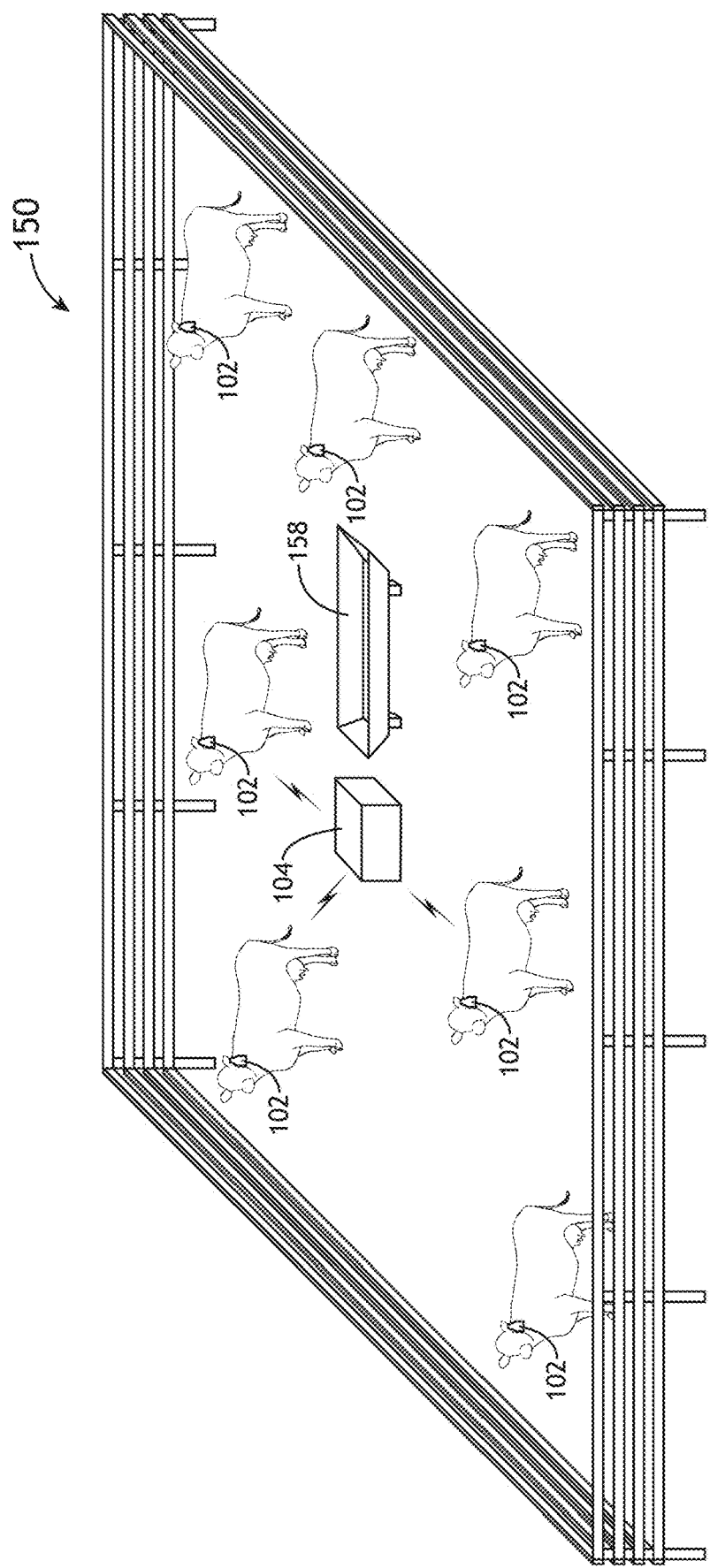

FIGS. 1G-1H illustrate the implementation of concentrator 104 and a set of tag assemblies 102 disposed on animals 152, 154, and 156 in a given animal population 150, in accordance with one embodiment of the present disclosure. In one embodiment, the system 100 may monitor a position characteristic between a nutrient source 158 and one or more animals 152, 154, 156 (and so on). The nutrient source 158 may include any nutrient source known in the art, such as, but not limited to, a feed source (e.g., grain), a water source, a mineral source (e.g., salt lick) and the like.

In one embodiment, one or more concentrators 104 may be placed proximate to the nutrient source 158. The system 100 may monitor one or more position characteristics (e.g., distance, position, direction, and the like) between the tag assemblies 102 attached to one or more animals 152-156 and the concentrator 104 (or concentrators). In this regard, the system 100 may measure and/or track a position characteristic between one or more animals 152-156 and the nutrient source 158 based on the known spatial relationship between the given concentrator 104 (or concentrators) and the nutrient source 158. In one embodiment, the system 100 may measure and/or track the position characteristic between the tag assembly 102 and the concentrator 104 using an RF signal, transmitted from the communication circuitry 120 of a given tag assembly 102 and the communication circuitry 123 of the concentrator 104. For example, one or more program instructions may be used to determine a given position characteristic, such as distance, proximity (e.g., proximity to nutrient source 158), position (e.g., position in feed lot), signal direction and the like, between the communication circuitry 120 of a given tag assembly 102 and the communication circuitry 123 of the concentrator 104 based on one or more characteristics of a signal (e.g., signal 154a, 154b or 154c) as measured by the concentrator 104.

In one embodiment, a distance of one or more animals 152-156 from the nutrient source 158 may be deduced by measuring signal strength of the RF signal (e.g., signal 154a, 154b, or 154c) emanating from one or more tag assemblies 102. For example, as shown in FIG. 1G, a distance $d_1$ of a first animal 152 from the nutrient source 158 may be deduced by measuring a signal strength of the RF signal 154a emanating from the tag assembly 102 associated with the first animal 152. Further, a distance $d_2$ of a second animal 154 from the nutrient source 158 may be deduced by measuring signal strength of the RF signal 154b emanating from the tag assembly 102 associated with the second animal 154. In addition, a distance $d_3$ of a third animal 156 from the nutrient source 158 may be deduced by measuring signal strength of the RF signal 154c emanating from the tag assembly 102 associated with the third animal 156. In this manner, the distance away from the nutrient source 158 may be deduced for N number of animals in the given animal population 150.

Further, the frequency with which the one or more animals 152-156 utilize the nutrient source 158 may be determined through monitoring the distance of the one or more animals 152-156 from the nutrient source 158 as a function of time. In addition, the use of multiple concentrators 104, each positioned at different nutrient sources 158, may allow the system 100 to monitor feeding frequency, watering frequency and the like for the one or more animals 152-156.

Figure 1I:
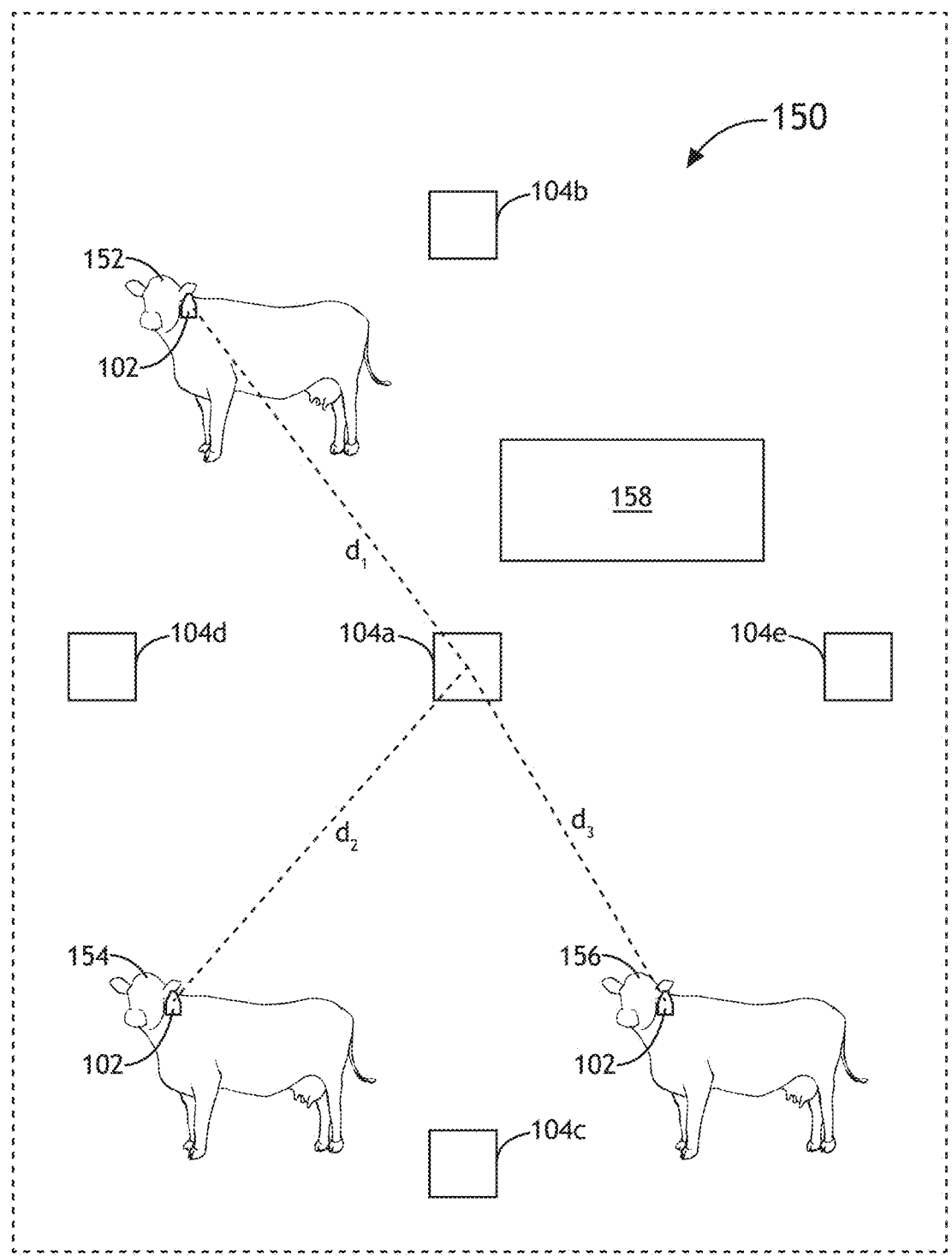
FIG. 1I illustrates the implementation of multiple concentrators and a set of tag assemblies disposed on animals in a given animal population, in accordance with one or more embodiments of the present disclosure.
Figure 1J:
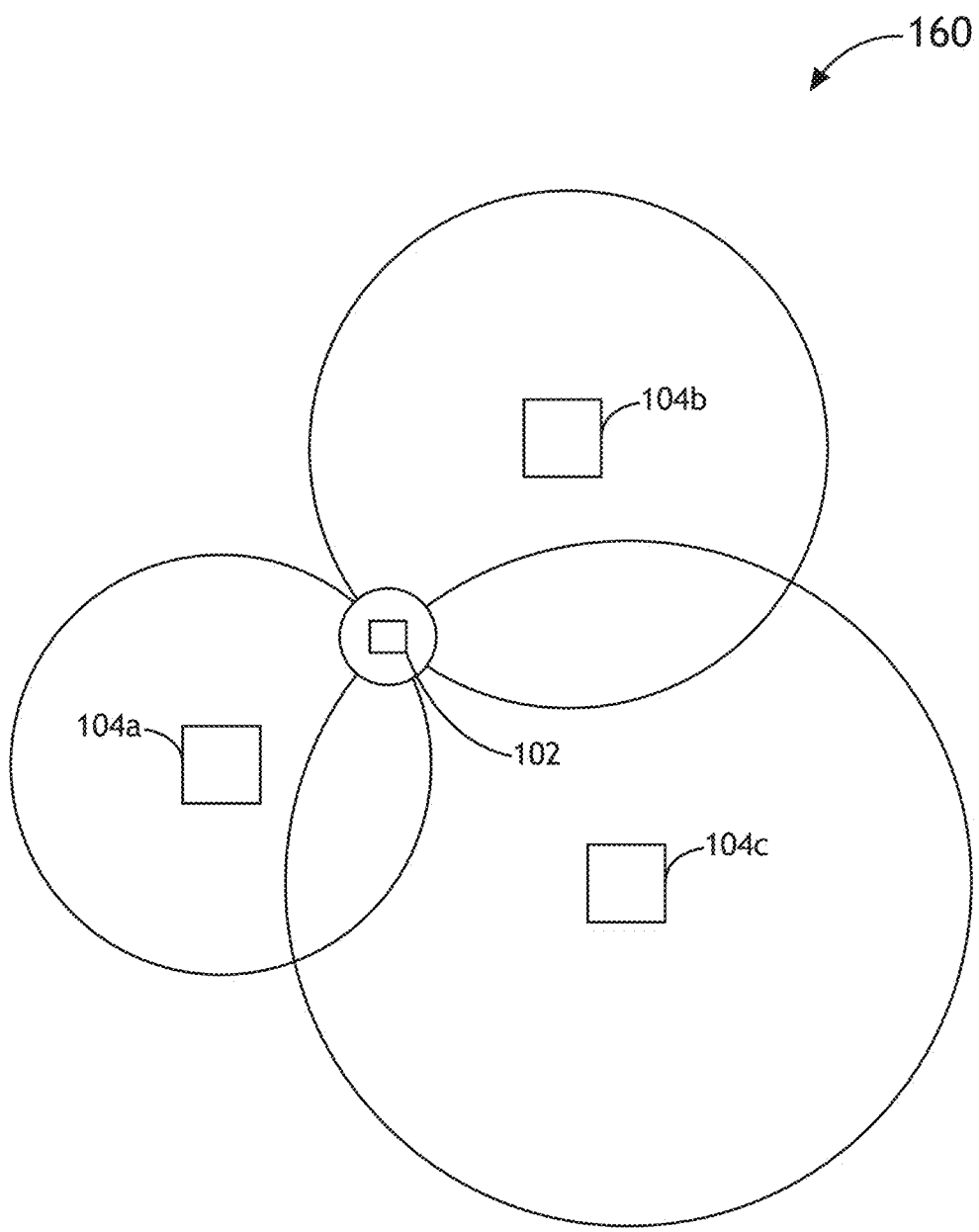
FIG. 1J illustrates a conceptual view of the determination of location of a given tag assembly, in accordance with one or more embodiments of the present disclosure.

FIG. 1I illustrates the implementation of multiple concentrators 104a-104d and a set of tag assemblies 102 disposed on animals 152, 154, 156 in a given animal population 150, in accordance with one embodiment of the present disclosure. In one embodiment, the concentrators 104a-104e may be positioned about a given feeding area or a region where the animals reside (e.g., feedlot). For example, multiple concentrators 104a-104e, each equipped with an antenna (e.g., omnidirectional or directional antenna), may be distributed about a given feedlot (in the case of cattle). In this regard, signal strength associated with a particular tag assembly 102 may be measured by multiple concentrators (e.g., concentrators 104a, 104b, 104c, 104d and/or 104e), each at different known locations. It is noted that the relative positions between the concentrator is known and can be easily measured. Such a configuration allows for a determination (or estimation) of position of a particular tag assembly 102 through a position algorithm, which estimates position based on the signal strength of the particular tag assembly at two or more of the concentrators 104a-104e and the known positions of the concentrators 104a-104e. For example, a radio triangulation procedure may be used to estimate the position of a tag assembly based on the interaction of the tag assembly 102 with three or more concentrators 104a-104e. FIG. 1J illustrates a conceptual view 160 of the determination of location of a given tag assembly 102 based on such a radio triangulation procedure.

Figure 1K:
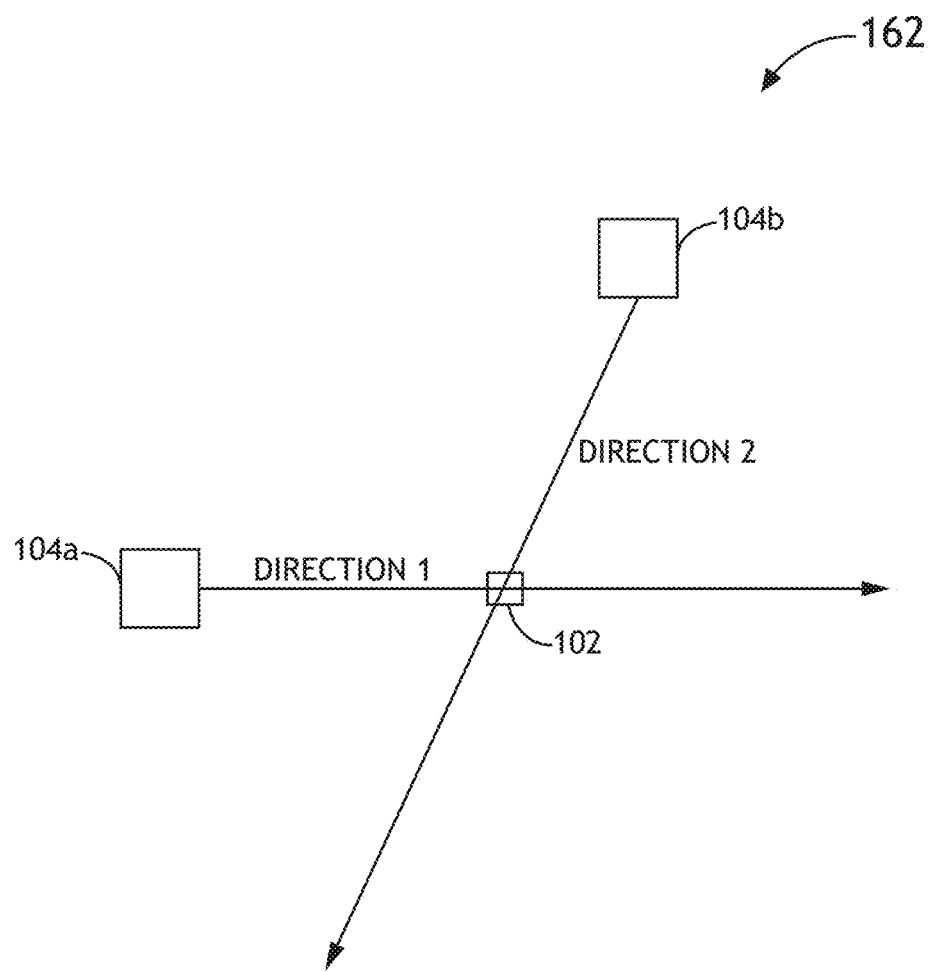
FIG. 1K illustrates a conceptual view of the determination of location of a given tag assembly, in accordance with one or more embodiments of the present disclosure.

FIG. 1K illustrates a conceptual view 170 of the determination of location of a given tag assembly 102 using two or more concentrators 104a, 104b equipped with a direction antenna. In another embodiment, one or more concentrators 104 may be equipped with a directional antenna. In this regard, the distance and direction of one or more animals 152-156 may be determined. Such a configuration may allow for a single concentrator 104 to monitor nutrient uptake frequency at multiple nutrient sources 158. For example, the use of a directional antenna may allow a single concentrator 104 to monitor feeding frequency, watering frequency and the like for the one or more animals 152-156. In another embodiment, multiple concentrators 104 may be equipped with a directional antenna. Based on the direction of signal detection of a given tag assembly 102 by two or more concentrators, the system 100 may determine an approximate position of the tag assembly 102 (e.g., location at which the directional vectors intersect). As shown in FIG. 1K, the approximate position of the particular tag assembly corresponds to the position where the direction vector between the first concentrator 104a and the tag assembly 102 intersects with the direction vector between the second concentrator 104b and the tag assembly 102.

It is further noted herein that the system 100 may include multiple concentrators 104, where each concentrator is coupled to a different set of tag assemblies 102. In one embodiment, a first concentrator 104 is coupled to a first set of tag assemblies 102. In another embodiment, a second concentrator 104 is coupled to a second set of tag assemblies 102. It is further noted herein that a concentrator 104 may be coupled to one or more tag assemblies 102 according to any network topology known in the art including, but not limited to, star and mesh topologies. In one embodiment, a concentrator 104 is configured as a hub of a star network topology, with one or more tag assemblies 104 communicatively coupled to the concentrator 104 via point-to-point connections. In another embodiment, one or more repeaters (not shown) are placed between a concentrator 104 and one or more tag assemblies 102 in order to increase the allowable range of the one or more tag assemblies 102.

In one embodiment, utilizing the signal information associated with a given tag assembly 102, a nutrient uptake frequency may be determined. In turn, the nutrient uptake frequency may be recorded in memory 125 of the concentrator 104 and/or transmitted to the remote server 108 for future use.

In another embodiment, in the context of the signal strength based techniques described above, the distance traveled and/or the average speed of a given animal may be measured by tracking the position data of a given tag assembly 102 as function of time.

In another embodiment, as previously noted, the concentrator 104 may transmit all or some of the received physiological and/or behavioral data to remote server 108 (or another controller). For example, the concentrator 104 may transmit all or some of the received physiological and/or behavioral data to remote server 108 (or another controller) via network 106. In one embodiment, once received by the remote server 108, the program instructions of the remote server 108 may determine a health state of the one or more animals based on the physiological data (e.g., temperature, heart rate and etc.) and/or behavioral data (e.g., head tilt, feeding frequency, amount of movement (e.g., steps) and etc.). For example, upon collecting one or more physiological and/or behavioral characteristics, the one or more concentrators 104 may transmit (e.g., wirelessly or wireline) the collected information to remote server 108 (or another controller) via a network (e.g., internet, intranet and the like). In another embodiment, the one or more processors 130 of the remote server 108, via a set of program instructions (e.g., maintained in memory 132), may carry out a number of data processing steps on the data to determine a health state of one or more animals of the animal population.

In one embodiment, the measured animal characteristics are compared to a known standard set of characteristics. For example, a database (not shown) may be maintained in memory 132 of the remote server 108 (or any other memory accessible by the remote server 108) and structured to relate one or more animal characteristics to a particular health state. For instance, any one or more of the physiological characteristics and/or behavioral characteristics may be correlated to known health states of studied animals. After a series of trial-and-error measurements are performed, the database may be constructed and stored in memory 132. In one embodiment, the database may correlate a single characteristic to a particular health state. For example, the remote server 108 may utilize the stored database to correlate head tilt to the health state of an animal. For instance, a head tilt above a certain angle may be associated with a "healthy" animal, while head tilt below a certain angle may be associated with an "unhealthy" animal. Further, the average time the head tilt is above/below a particular threshold may be used to determine the health state of the animal. It is recognized that any of the measured characteristics described previously herein may be utilized in a single variable context to determine the health state of an animal. In this regard, the remote server 108 may identify an unhealthy animal, or a potentially unhealthy animal. In the event of an unhealthy, or a potentially unhealthy, the animal is identified and the remote server 108 may notify a user via user devices 112a or 112b that the animal is unhealthy or potentially unhealthy.

In another embodiment, the database may correlate multiple characteristics to a particular health state. For example, the remote server 108 may utilize the stored database to correlate multiple physiological and/or behavior characteristics to a particular health state of an animal. In this regard, the database may reflect a multi-variable relationship between the health state of an animal and two or more physiological and/or behavior characteristics. For example, the multi-variable database may be constructed to relate the health state of one or more animals to two or more of temperature, heart rate, head tilt, feeding frequency, amount of movement (e.g., steps) and etc. For instance, a first head tilt value, a first temperature value and a first feeding frequency value may be associated with a "healthy" animal, while a second head tilt value, a second temperature value and a second feeding frequency value may be associated with an "unhealthy" animal. It is recognized that any of the measured characteristics described previously herein may be utilized in a multi-variable context to determine the health state of an animal. Again, in the event an unhealthy, or a potentially unhealthy, animal is identified, the remote server 108 may notify a user via user devices 112a or 112b that the animal is unhealthy or potentially unhealthy.

In another embodiment, an unhealthy animal is identified via a differential comparison of measured characteristics for a first animal to measured characteristics associated with one or more other members of the animal population. For example, one or more measured physiological and/or behavior characteristics for a first animal may be compared to one or more measured physiological and/or behavior characteristics for at least a second animal or an average of two or more animals. In this regard, outlier characteristics displayed by a given animal may be identified by directly comparing the measured characteristics of the given animal to the same type of measured characteristics for other members of the same population. This approach is particularly advantageous as it may serve to eliminate systematic errors and conditions, such as, but not limited to, weather, feeding conditions, watering conditions, events that may disrupt herd feeding patterns and the like. It is recognized herein that the animals may be statistically binned into like sub-sets for the purposes of comparison. For instance, animals may be limited to comparison with animals of the same or similar age or weight. In another instance, animals may be limited to comparison with animals of the same sex. In another instance, animals may be limited to comparison with animals located in the same spatial region of the general animal holding area at a particular time of the day (in order to eliminate systematic affects such as sunlight and etc.).

It is further recognized that the behavior may be averaged over a selected time period prior to comparison. In the event any one or more of the measured characteristics deviates (by a selected threshold) from that of the other animal(s), the remote server 108 may notify a user that the deviant animal is unhealthy or potentially unhealthy.

In another embodiment, an unhealthy animal is identified by monitoring the one or more measured characteristics of the animal as a function of time and/or location. For example, one or more measured physiological and/or behavior characteristics for an animal may be monitored as a function of time. In this regard, physiological and/or behavior characteristics measured at a first time instance (or across a first time interval) may compared to one or more measured physiological and/or behavior characteristics at a second time instance (or across a second time interval) (and a third time instance, a fourth time instance and so on). In this regard, the remote server 108 may identify an unhealthy animal, or a potentially unhealthy animal, by observing deviations in the animal's behavior as a function of time. In the event any one or more of the measured characteristics exceeds a selected threshold, the remote server 108 may notify a user that the animal is unhealthy or potentially unhealthy. This approach is particularly healthy in cases where a given animal, while in a healthy state, displays physiological and/or behavioral characteristics that deviates from other members of the herd.

It is further noted that the remote server 108 may identify an unhealthy animal using any combination of the analysis approaches set forth above. For example, an unhealthy animal may be identified through implementation of any of the following: a preloaded database, comparison to other members of the population and/or monitoring a single animal as a function of time or location.

In one embodiment, the remote server 108 (or controllers) may receive instructions from a user device (e.g., user device 112a or user device 112b). In this regard, a user may select what comparisons he/she wants the remote server 108 to perform. Then, the remote server 108 may transmit those results to the user. In another embodiment, the system 100 may include a mobile device separate from a first user device. In this regard, the results, or a sub-set of the results, may be delivered to another user remotely. For example, simplified data outputs may be transmitted to the additional user (e.g., smartphone or tablet user).

Figure 1L:
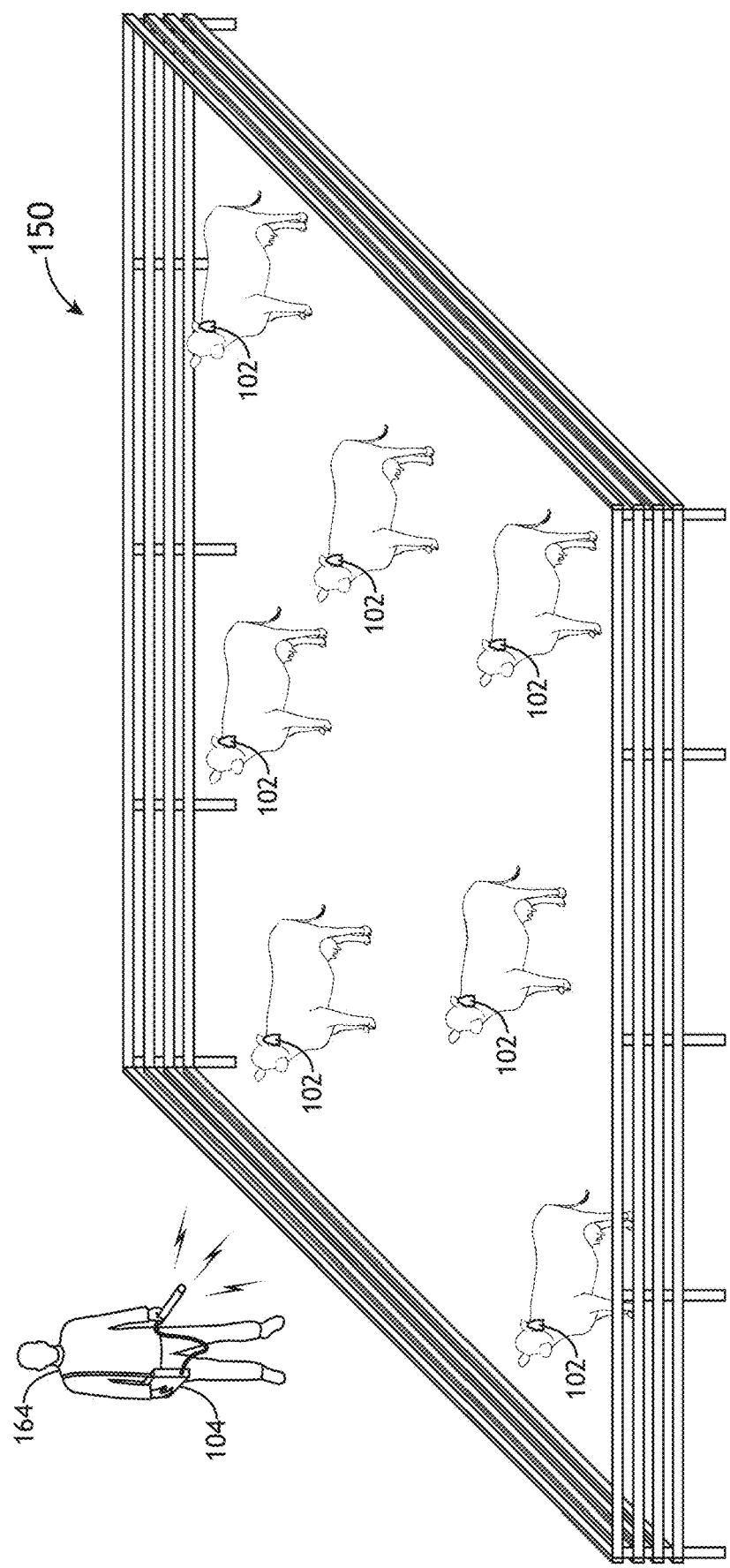
FIGS. 1L-1M illustrate a mobile concentrator, in accordance with one or more embodiments of the present disclosure.
Figure 1M:
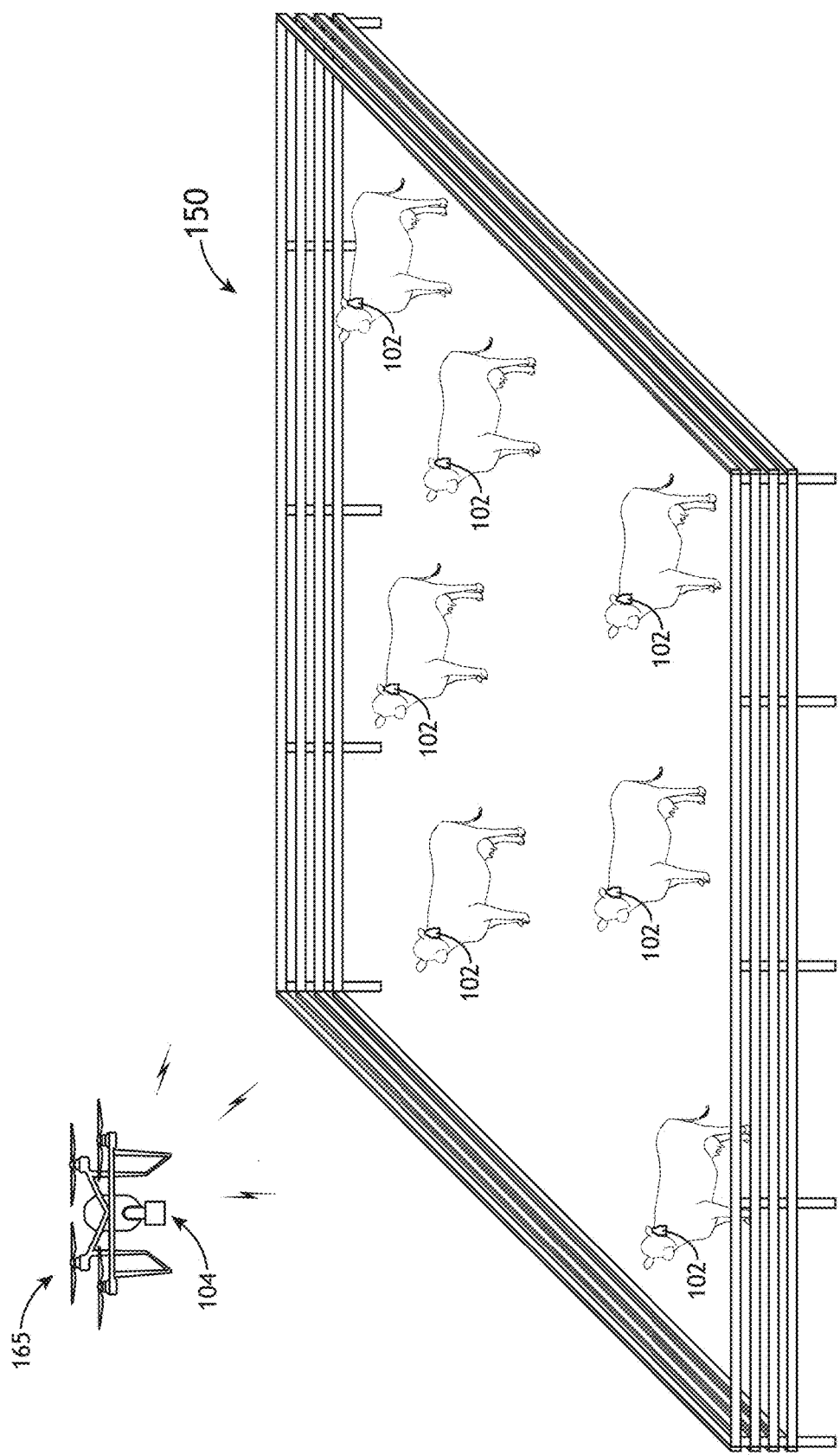

FIGS. 1L and 1M illustrate a mobile concentrator 104, in accordance with one or more embodiments of the present disclosure. In one embodiment, as shown in FIG. 1L, the concentrator 104 is user-carried. For example, a user 164 may carry the concentrator 104 and selectively interrogate the tag assemblies 102 of the various animals of an animal population 150. This embodiment may be particularly useful in the context where physiological and/or behavioral characteristic data are stored on board the tag assembly 102. In another embodiment, as shown in FIG. 1M, the concentrator is drone-mounted. For example, the concentrator 104 may be mounted to a drone 165. In this regard, the drone 165 may selectively interrogate the tag assemblies 102 of the various animals of the animal population. Such a configuration would allow for a single concentrator to service multiple feed lot pens.

It is further noted that the present disclosure is not limited to the above examples and is not limited to tracking physiological and/or behavioral characteristics of cattle. It is noted that the present disclosure may be extended to a wide variety of environments, such as, but not limited to tracking and predicting health states in pigs, horses, sheep, pets (e.g., dogs, cats and etc.), zoo animals and etc. Further, the present disclosure may further be used to track and/or predict health states in humans, such as children in a daycare, athletes on a sports team or patients in a hospital facility.

Referring again to FIGS. 1A-1D, it is noted that communication between a concentrator 104 and one or more tags 102 may include half-duplex and/or full-duplex communication systems. In one embodiment, a communication system between a tag 102 and a concentrator 104 includes a half-duplex communication system. In another embodiment, a communication system between a tag 102 and a concentrator 104 includes a Medium Access Control (MAC) layer. In another embodiment, the MAC is time slotted. In one embodiment, the communication data rate between a concentrator 104 and one or more tags 102 is between 1, 000 and 100, 0000 bits/sec. For example, the communication date rate may be, but it not limited to, 57,600 bits/sec, which provides a data period of approximately 6.6 milliseconds. It is noted herein that the data rate of 57,600 bits/sec is not intended as limiting and other data rates may be used within the scope of the present disclosure.

In one embodiment, the MAC includes a global data period of a selected length that defines the frequency of data collection. For example, the global data period may have a length of 3 seconds. It is noted herein that this data period is not limiting and that longer or shorter data periods may be used within the scope of the present disclosure. It is further noted that data need not be collected by a concentrator 104 during each data period; this configuration may be useful, for example, in order to manage power consumption and extend battery life. In one embodiment, the global data period is divided into a selected number slots. For example, the global data period may be divided into 120 time slots. In another embodiment, the width of each time slot within a data packet is a selected time period. For example, the time period may be 25 milliseconds. In another embodiment, the 120 time slots are further divided into 1 beacon time slot, 9 provisioning time slots, and 110 data collection time slots. In this way, data from tag assemblies 102 may be collected from a single concentrator 104. It is noted herein that the specific values of the width of the time slots and the number of time slots within a global data period is not limiting. It is further noted that choosing a time slot width larger than the data rate period (e.g. a 25 millisecond time slot width in relation to a data period of 6.6 milliseconds) enables time guard banding. In this regard, the local clocks of a concentrator 104 and one or more tags 102 may run fast or slow relative to each other with minimal synchronization error.

In another embodiment, a data packet transmitted during a global data period comprises 48 bytes and consists of the following components: a preamble of 8 bytes, a sync word of 4 bytes, a payload size of 1 byte, a payload of up to 33 bytes, and a cyclic redundancy check (CRC) of 2 bytes. It is noted herein that the contents and structure of the data packet are not limiting and other data packets with different contents and/or structure may be used within the scope of the present disclosure.

It is noted herein that the purpose of a beacon signal is to provide a mechanism for synchronizing the concentrator 104 with one or more tag assemblies 102 such that each tag assembly 102 may properly transmit data in a designated time slot. In one embodiment, the one or more processors 116 of a tag (e.g. 102*a*) direct the data radio (e.g. the communication circuitry 120) to turn on only when a beacon signal is expected in order to conserve power. If a beacon is received, the timing circuitry (not shown) of the tag 102 is synchronized to the beacon signal such that the timing of the remaining time slots are synchronized between the collector 104 and the tag assembly 102.

Figure 1N:
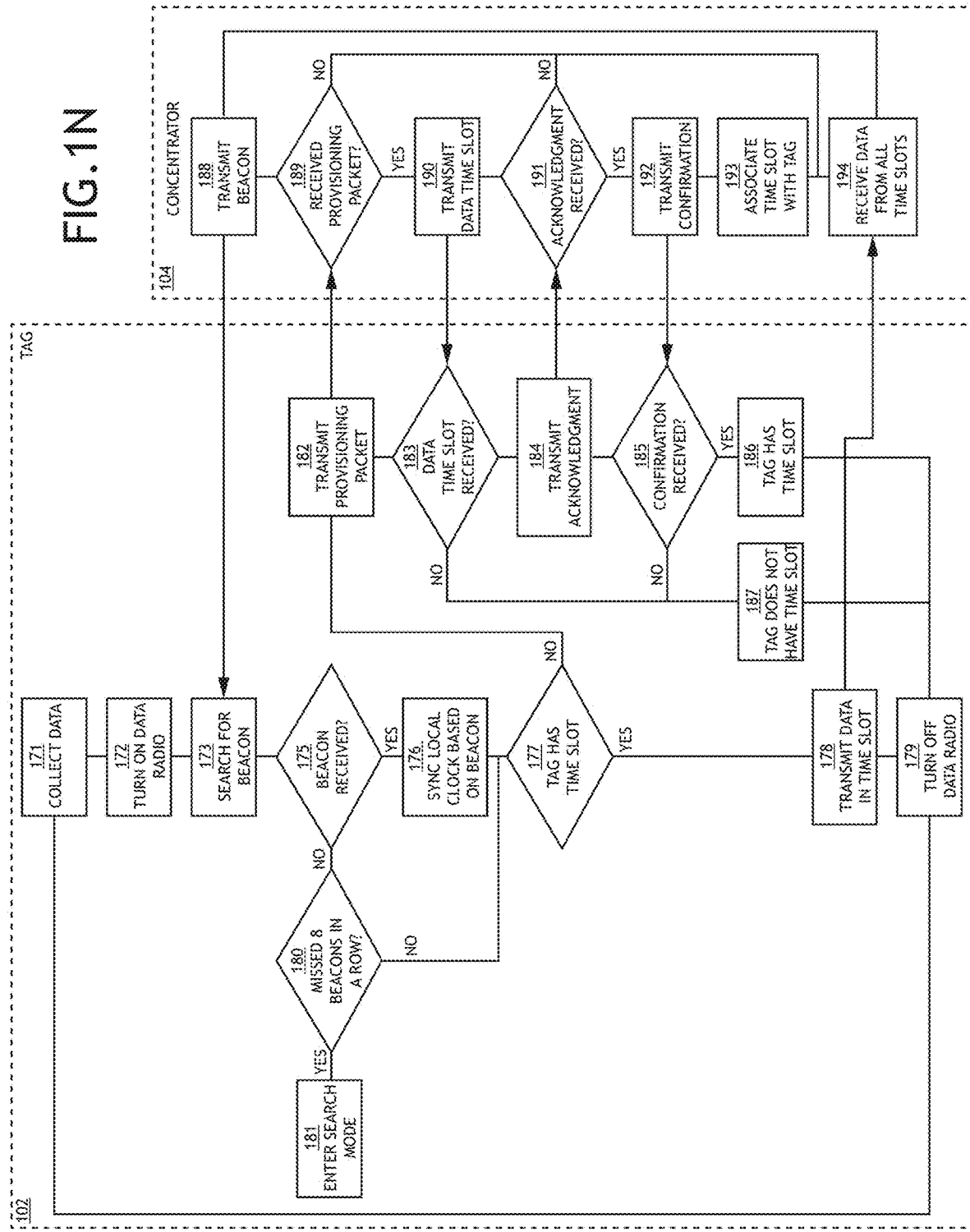
FIG. 1N illustrates a flow diagram depicting a communication protocol between a tag and a concentrator, in accordance with one or more embodiments of the present disclosure.

FIG. 1N illustrates a flow diagram depicting a communication protocol between a tag assembly 102 and a concentrator 104, in accordance with one or more embodiments of the present disclosure.

In one embodiment, the logical flow the tag assembly 102 and the logical flow of the concentrator 104 are independent, which is to say that each element contains separate timing circuitry (not shown).

In one embodiment, a tag assembly 102 collects data 171 from one or more sensors 114. In one embodiment, the one or more processors 116 of a tag assembly (e.g., 102*a*) direct the data radio (e.g. the communication circuitry 126) to turn on 172 only when a beacon signal is expected to be transmitted from the concentrator 104 in order to conserve power. The tag assembly 102 will then search 173 for a beacon signal. If a beacon signal is not found 175, the tag assembly 102 will continue to search 180 for a beacon signal for up to 8 global data periods (or any other selected number of global data periods). If no beacon signal is found 175 within 8 global data periods 180, the tag assembly 102 enters a search mode 181. In the search mode, the one or more processors 116 direct the data radio to toggle on and off every 4 seconds (or any other selected time period) such that the tag assembly 102 searches for a beacon signal when the data radio (e.g., communication circuitry) is on. It is noted herein that one purpose of the search mode is to conserve power while searching for a beacon signal. It is further noted herein that the specific values of 8 global data periods required to enter the search mode and a toggle time of 4 seconds are not intended to be limiting and are provided merely for illustrative purposes.

In another embodiment, if a beacon signal is received 175 by a tag assembly 102, the local clock will be synchronized 176 to the beacon signal. In one embodiment, if a tag assembly 102 does not have a beacon signal then a provisioning packet is transmitted 182 to the concentrator 104 in one of the provisioning timeslots. It is noted herein that the specific provisioning time slot may be chosen either at random or may be fixed for a given tag assembly 102. If the concentrator 104 receives a provisioning packet 189 in one of the provisioning time slots, the concentrator 104 transmits a data timeslot to the tag assembly 102. If the tag assembly 102 properly receives the transmitted data timeslot, the tag assembly 102 transmits an acknowledgement signal 184. If the acknowledgement signal is properly received 191 by the concentrator 104, a final confirmation signal is transmitted 192 to the tag assembly 102 in order to confirm 185 the timeslot for the tag assembly 102. The concentrator 104 then associates 19 the allotted time slot with the tag assembly 102. It is noted herein that the association of a timeslot with a tag 102 may be accomplished using any method known in the art including, but not limited to, storage of the serial number of the tag 102 or the use of another identification number. If any of the steps associated with the assignment of a timeslot to a tag assembly 102 fails (e.g., steps 182, 189, 190, 183, 184, 191, 192, or 185), the tag assembly 102 does not have an assigned timeslot 232 and the tag will transmit a provisioning packet 182 on the next global data period. It is noted herein that the steps associated with the assignment of a timeslot to a tag assembly 102 (e.g., steps 182, 189, 190, 183, 184, 191, 192, or 185) are not intended to be limiting. By way of non-limiting example, any of steps 182, 189, 190, 183, 184, 191, 192, or 185 may be omitted. Alternatively, by way of non-limiting example, additional communication signals (not shown) may be utilized to ensure proper assignment of a timeslot to a tag assembly 102.

In another embodiment, if a tag assembly 102 has an assigned timeslot 177, the tag assembly 102 transmits health data 178 to the concentrator 104 during the appropriate timeslot. The one or more processors 116 of the tag assembly 102 then direct the data radio (e.g., communication circuitry) to turn off 179 for the remainder of the global data period. During this time, the concentrator 104 receives data from all timeslots 194. At the start of the next data period, the concentrator repeats the process, beginning with the transmission of a beacon signal 188. It is noted herein that the tag may monitor health data using the one or more sensors 114 continuously throughout the communication cycle.

It is noted herein that if a concentrator 104 loses a listing of assigned time slots associated with one or more tag assemblies 102 (e.g., upon reboot), the one or more tag assemblies 102 may continue to send data during a previously assigned time slot. The concentrator 104 will then rebuild a listing of assigned time slots associated with the one or more tag assemblies 102 according to order of received data in the data time slots. It is further noted that this procedure may be carried out in order to prevent all of the one or more tag assemblies 102 from simultaneously transmitting provisioning packets 182, which may lead to assignment errors.

It is further noted herein that system 100 of the present disclosure may be used to promote transparency between producers and consumers in animal and food operations. Generally speaking, consumers have become more conscious of what goes into their food, where their food comes from, and how their food was grown/raised. The majority of consumers want to know that the beef they are consuming came from an animal that was generally healthy and well cared for. Additionally, many consumers want to know that their food was not exposed to particular hormones, vaccines, pesticides/herbicides, and the like.

Accordingly, in one embodiment, system 100 may utilize blockchain technology to enable physical asset verification, facilitate traceability of animal location, health records, and feeding records throughout their life cycles, and promote transparency between producers and consumers. blockchain technology has gained increasingly widespread acceptance as a system for decentralized data collection and data verification. Using blockchain technology, multiple parties are able to view and access the same data, as the data is stored on a "distributed database." Furthermore, due to the distributed, de-centralized nature of the blockchain, data on the blockchain is nearly impossible to forge and/or falsify, which may result in increased data integrity and transparency.

For example, system 100 may utilize the blockchain in order to track the origin, movement, and ownership of livestock across multiple owners and/or locations throughout the life cycle of the livestock. Additionally, the blockchain may be used to track feeding and medical records of each animal, including vaccination records, hormone records, and the like. Thus, consumers may be able to scan a food item at the store and retrieve a complete history of that food item, from the birth of the animal to the store putting the food item out for sale. For instance, a consumer may be able to scan a barcode or other identifying information on the packaging of beef. By scanning the beef, the consumer may be able to trace the ownership of the cow from which the beef originated from the time the cow was born to when the beef was packaged and held out for sale at the store. Additionally, the consumer may be able to see whether, and when, the cow was exposed to particular hormones, vaccinations, and the like. It is contemplated that the ability to track the complete history of a food item, from farm to table, will not only affect what and where consumers will purchase, but it will also allow producer's to sell the food item at higher prices. Such embodiments may serve to facilitate trust and transparency between producers and consumers. Conversely, any gaps in the ownership records on the Blockchain may cause consumers to doubt the authenticity and history of the particular food item, and therefore decline to purchase the item, resulting in lost profits.

In one embodiment of system 100, a tag assembly 102 associated with an animal may be added to the blockchain and issued a unique digital token via a user device 110, such that the digital token uniquely identifies the animal. The issuance of the digital token may also authenticate the starting "point of origin" of the animal. In some embodiments, an animal may be tagged with a tag assembly 102 and be issued a digital token shortly after birth so that the ownership and activity of the animal may be tracked from its birth until the moment it reaches the consumer. Each time the animal experiences an event (e.g., changes locations and/or ownership, is exposed to a particular hormone/chemical, is given a medical treatment, and the like), the event may be updated via a user device 110 and stored/updated on the animal's digital token via the remote server 108. As such, the animal's digital token may be "moved" and updated digitally such that the real-world journey of each animal is mirrored by a chain of transactions and events on the blockchain. It is contemplated herein that information updated and stored on the blockchain may include an animals "animal history" generated by remote server 108, as discussed previously herein. In this regard, an animal history generated by remote server 108 for a tag assembly 102 associated with an animal may include, but is not limited to including, a time-stamped location history, medical records, feeding records, ownership records, and the like. Furthermore, it is contemplated that the animal history may be transmitted and stored on the blockchain via remote server 108 such that it is accessible to users (e.g., producers, consumers, and the like) via one or more user devices 110.

For example, as an animal passes through the supply chain (e.g., from a rancher to a packer, distributor, store, etc.), each owner in the chain of title may verify and authenticate its ownership in the chain of title by updating the digital token. Accordingly, a consumer may track the life cycle of a food item from the time the item was held out for sale at a store all the way back to the point the animal was issued a digital token.

It is contemplated herein that different users attempting to view animal data stored on the blockchain may be granted varying levels of access depending on the identity of the user. By way of example, consumers may be given a level of limited access to the data stored on the blockchain which allows them to verify the animal product that they are purchasing. For instance, in order for a consumer to verify an animal product on the blockchain, the owner's legal names may not be necessary. Further, certain producers in the production process (e.g., ranchers, packers, etc.) may wish not to have their names and addresses publicly available. In this event, when a consumer looks up the chain of ownership on the blockchain for a particular food item, that producer's name may appear as a generic term (e.g., "Owner #2," "Packer Owner," etc.) rather than the owner's legal name. By way of another example, certain governmental or administrative groups (e.g., APHIS, USDA, CDC, and the like) may be given certain limited access to the animal data stored on the blockchain in the event of disease outbreaks, recalls, or audits in order to ascertain the origin of the potential issue within the industry and to correct the issue.

In one embodiment, all data of animals associated with system 100 may be documented and secured on a Precision Livestock Blockchain. Once animals have been added to the blockchain and their associated documentation is available on the Precision Livestock Blockchain, it is contemplated that producers may have the ability to buy and sell animal commodities via the web using an escrow like service for verification when the animals arrive at the purchaser. In other words, it is contemplated that a Precision Livestock Blockchain may serve as a virtual sale barn using blockchain technology which is verified and backed up by real world commodities (e.g., animals).

Traditionally, blockchain has been used as a mechanism to generate, store, and distribute records of digital assets and data. Thus, the blockchain has proven to be a powerful tool in establishing trust in the exchange of digital assets and data. However, as a purely digital concept, the blockchain is unable to track, verify, and authenticate the identity and data of physical goods, such as livestock. In this regard, embodiments of the present disclosure are directed at systems and methods which serve to link and authenticate physical assets (e.g., livestock) to digital records collected, stored, and authenticated on the blockchain. The systems and methods used to link physical assets (e.g., livestock) to data on the blockchain may be referred to throughout the present disclosure as "modular verification."

Modular verification may be thought of as the systems and methods of the present disclosure which may allow producers utilizing system 100 to verify, in real-life (in a physical capacity), that the animal tracked in system 100 is the same animal which is represented as a digital token on the blockchain. In other words, modular verification may be thought of as the linking and authenticating the physical animal with its digital data. The modular verification of the present disclosure may be carried out in any manner known in the art including, but not limited to, eID cards, animal DNA, animal traits (e.g., nose prints, retinal scans, fur patterns, brandings, facial recognition, and the like), RFIDs, edible beef ink, barcodes, nanotagging, and the like. In one embodiment, system 100 may be configured to utilize multiple modular verification techniques such that system 100 is compatible with users, producers, and consumers which may utilize varying authentication and verification systems.

By way of example, in an animal trait-based modular verification system, a producer may be required to verify the identity of each animal via a retinal scan in order to add and/or alter the data associated with the animal's digital token. Requiring a retinal scan to add/amend data may therefore ensure that data stored on the blockchain is authentic and non-fraudulent. By way of another example, in a DNA-based modular verification system, a producer may be required to verify the identity of each animal by authenticating a sample of the animal's DNA in order to add and/or alter the data associated with the animal's digital token.

As noted previously, system 100 may be configured to interface with any number of modular verification systems and methods. It is noted herein that various modular verification systems and methods may be chosen based on a number of factors including, but not limited to, cost, industry standards, ease of adoption, susceptibility to falsification, susceptibility to fraudulent tampering, error rate (e.g., fallout rate, incorrect identification rate), consumer preferences, and the like. For example, an eID-based modular verification system may be advantageous in that it is inexpensive and widely accepted in the industry, but suffer from a high level of tamperability and high fallout rates. Conversely, a DNA-based modular verification system may be highly accurate and resistant to tampering, but suffer from high operating costs and administrative impracticability.

FIGS. 2A-2G illustrate schematic views of a tag assembly 102, in accordance with one or more embodiments of the present disclosure. It is noted herein that the previous description of the present disclosure associated with system 100 and tag assembly 102 may be regarded as applying to tag assembly 102 depicted in FIGS. 2A-2M.

In one embodiment, as illustrated in FIG. 2A, tag assembly 102 includes a tag body 202, a tag pin 204, and a attachment assembly 206. Components of tag assembly 102, as illustrated in FIGS. 1B-1E, may be disposed on one or more surfaces of tag body 202 and/or disposed within tag body 202.

In one embodiment, tag body 202 may include one or more attachment pass-throughs 208, one or more sensors 114, and one or more indicators (not shown). The one or more indicators may include any indicator configured to transmit the state of the animal and/or tag assembly 102 including, but not limited to, LEDs. For example, one or more indicators may be activated based on the state of health of the animal. For instance, the tag assembly 102 may be programmed to activate an indicator (e.g., LED) when one or more parameters falls below a selected threshold. In this regard, the LED may be activated when the animal is in need of medical attention. By way of another example, the indicator (e.g., LED) may be activated when the animal is deemed in good health. Alternatively, different colors of LED may be used for different health states (e.g., green for satisfactory health condition, red for less-than-satisfactory health condition).

In another embodiment, feedback from the concentrator 104 and/or remote server 108 to the tag assembly 102 may update the sampling conditions of the given tag assembly 102. For example, in a situation where the given animal is in a poor or stressed health state, the concentrator 104 and/or remote server 108 may direct the tag assembly 102 to increase the sampling rate or change the parameters that are sampled.

In one embodiment, the one or more sensors 114 of tag assembly 102 may include one or more temperature probes (e.g., thermopile, IR sensor, RTD and the like). The one or more temperature probe may be positioned on the tag body 202 such that the one or more temperature probes reside in close proximity with a portion of the tagged animal so that temperature measurements are satisfactorily accurate. In another embodiment, the one or more sensors 114 include one or more accelerometers (e.g., three-axis accelerometer). In another embodiment, the one or more sensors 114 include one or more magnetometers. In another embodiment, the one or more sensors 114 include an IMU.

In another embodiment, the tag assembly 102 is equipped with one or more RFID devices. In this regard, a particular animal may be identified utilizing an RFID reader. For example, the RFID may include, but is not limited to, a low frequency passive RFID device. By way of another example, the RFID may include, but is not limited to, an active RFID device. In another embodiment, the tag 102 may be equipped with one or more communication lines (not shown) for communicatively connecting the various components of the tag assembly 102 to each other and/or to the communication circuitry 120.

In another embodiment, the tag assembly 102 includes one or more power supplies. The one or more power supplies may include one or more batteries 121. The one or more batteries 121 may include one or more rechargeable batteries. The one or more batteries may be contoured to the shape of tag body 202. In one embodiment, one or more rechargeable batteries may be sealed within the tag assembly 102 and recharged via recharging circuitry. In one embodiment, the recharging circuitry may include conductive charging circuitry. In this embodiment, the tag assembly 102 may include an electrical charging port, which may be electrically coupled to an external charger for power transfer. In another embodiment, the recharging circuitry may include inductive charging circuitry. In this embodiment, the tag 102 may include one or more inductive coils, which may be inductively coupled to one or more external inductive coils for power transfer. In another embodiment, the tag 102 may be equipped with one or more power lines (not shown) for electrically connecting the various components of the tag 102 to the power supply 121.

Figure 2B:
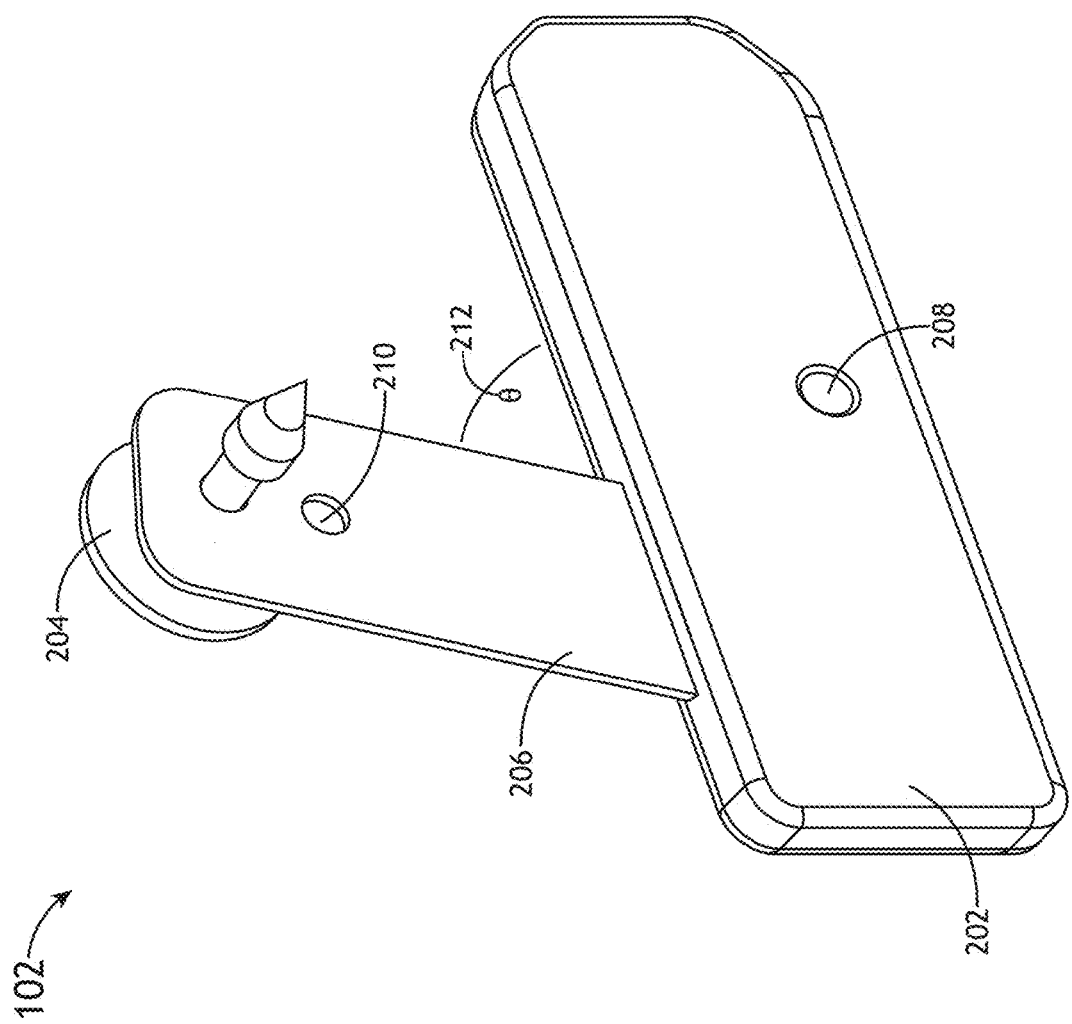

FIG. 2B illustrates a schematic view of a tag assembly 102, in accordance with one or more embodiments of the present disclosure. In one embodiment, tag assembly 102 includes a tag body 202, a tag pin 204, and an attachment assembly 206.

In one embodiment, tag body 202 includes one or more attachment pass-throughs 208 (e.g., holes) configured to couple with tag pin 204. Tag body 202 may be shaped and sized so as to fit within the ear of a particular animal, such as a cow.

In another embodiment, attachment assembly 206 may be configured to affix the tag body 202 to an animal. Attachment assembly 206 may include any mechanism known in the art configured to attach an object to an animal. For example, as depicted in FIGS. 2A-2G, attachment assembly 206 may include a strap. As shown in FIG. 2B, attachment assembly 206 may include one or more ports 210 configured to receive tag pin 204.

Figure 2D:
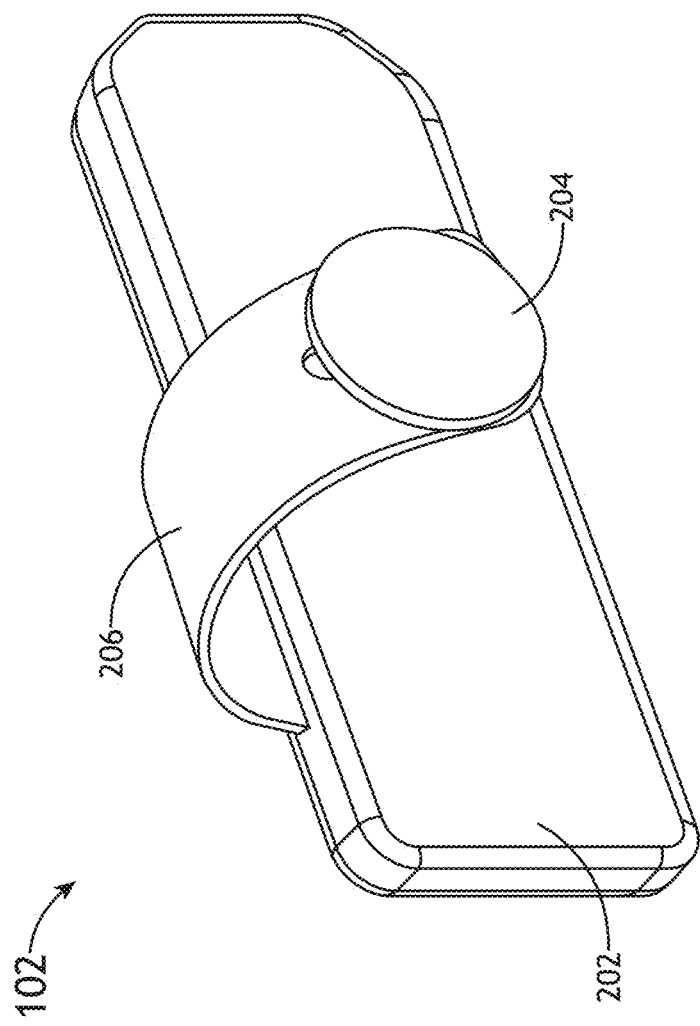
Figure 2E:
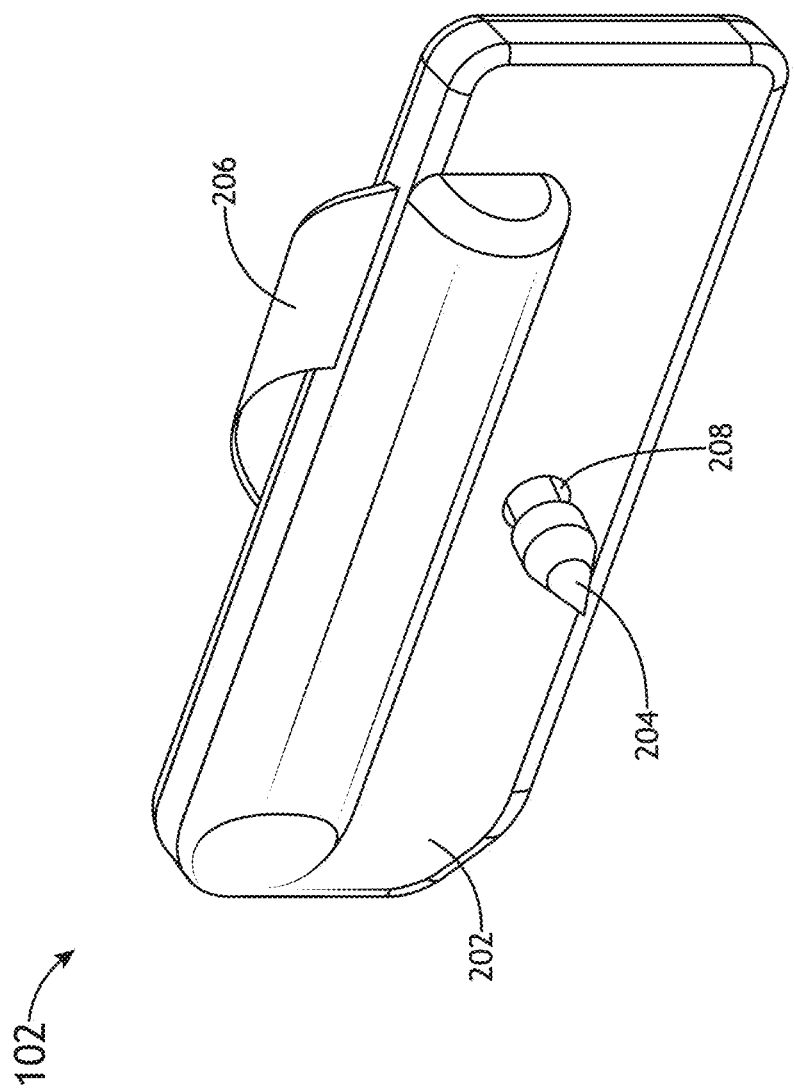

FIGS. 2D and 2E illustrates a schematic view of tag assembly 102, in accordance with one or more embodiments of the present disclosure. As illustrated in FIG. 2D, tag pin 204 may be configured to be disposed within a port 210 of attachment assembly 206. Tag pin 204 may be further configured to couple to the tag body 202 via the one or more attachment pass-throughs 208.

Figure 2F:
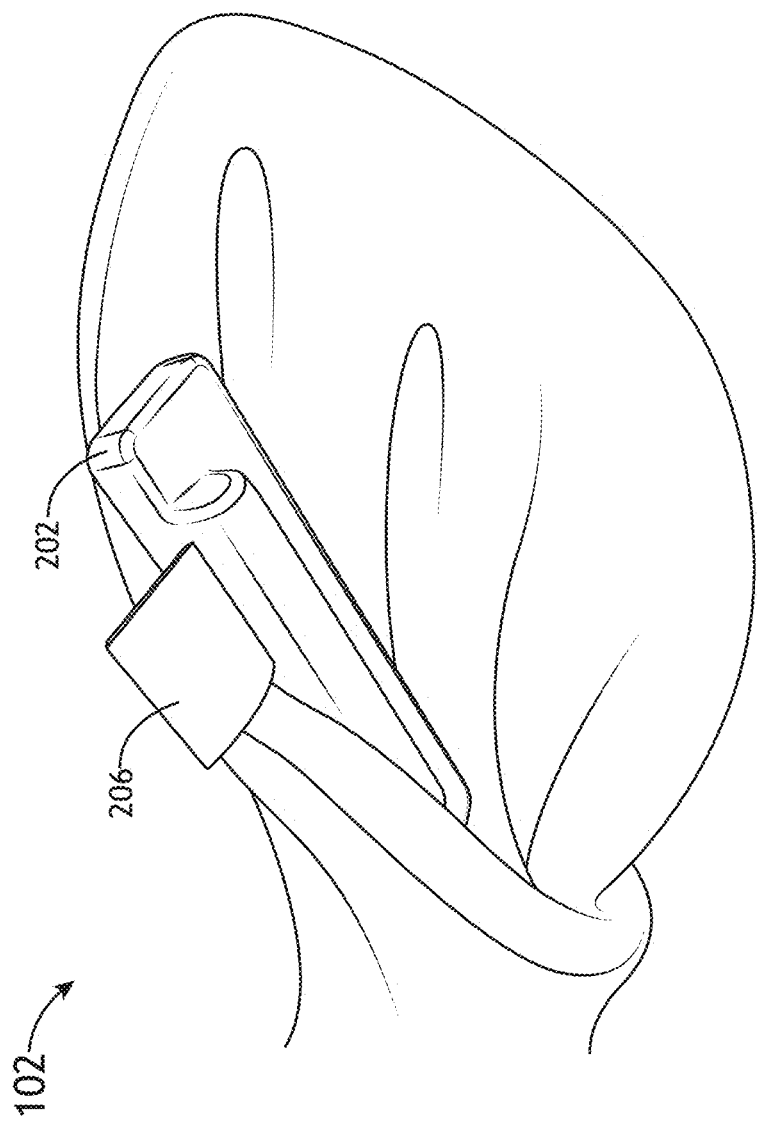
Figure 2G:
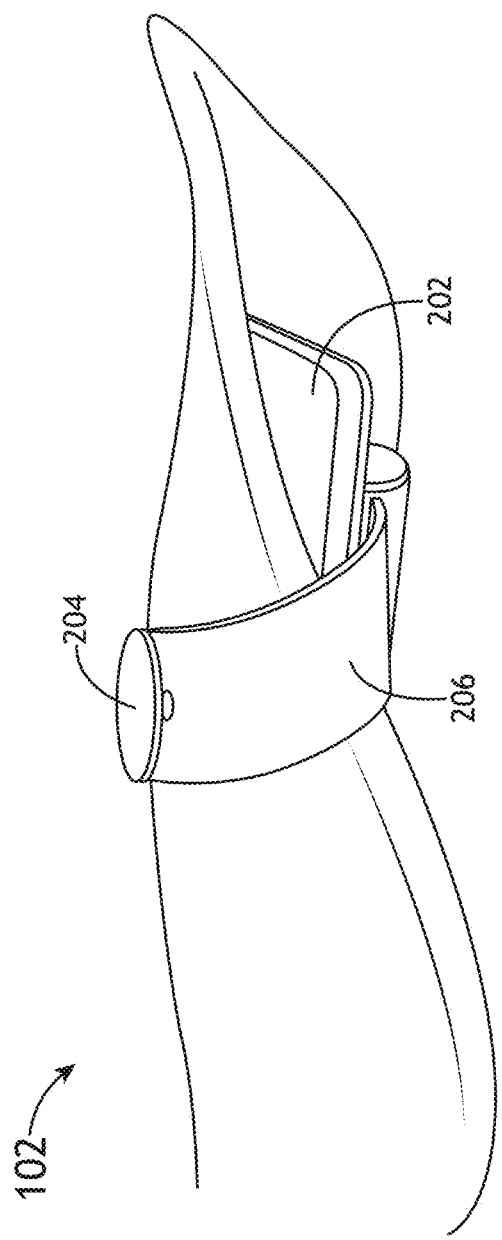

FIGS. 2F and 2G illustrate schematic views of tag assembly 102 attached to the ear of a cow, in accordance with one or more embodiments of the present disclosure. As depicted in FIG. 2F, tag assembly 102 may be contoured to match the ear shape of an animal (e.g., a cow) such that it may be securely fastened to the animal's ear. It is noted herein, however, that tag assembly 102 may be attached to an animal at any point on the animal's body, and that the example depicted in FIG. 2F is provided merely for illustrative purposes.

In one embodiment, the attachment assembly 206 may be coupled to the tag body 202 at an angle. For example, referring again to FIG. 2B, attachment assembly 206 may be coupled to the tag body 202 at an angle 212, where the angle 212 is defined as the angle between the attachment assembly 206 and the tag body 202. For instance, attachment assembly 206 may be coupled to the tag body 202 at an angle 212 of between 55 and 85 degrees (i.e. 5 to 35 degrees from normal). It is noted herein that coupling the attachment assembly 206 to the tag body 202 at an angle 212 (e.g., in a non-orthogonal configuration) may provide the tag assembly 102 with added support when attaching the tag assembly 102 to an animal.

By way of example, reference will be made to FIGS. 2F and 2G. As shown in FIGS. 2F and 2G, coupling the attachment assembly 206 to the tag body 202 at an angle 212 allows the attachment assembly 206 to wrap around the animal's ear. Additionally, wrapping the attachment assembly 206 around the animal's ear at an angle 212 may increase the surface area which tag assembly 102 couples to animal's ear, and prevent the tag assembly 102 from rotating within the animal's ear. Notably, the tag assembly 102 of the present disclosure may prevent fallout and provide for a more efficient, effective, and reliable attachment procedure.

It is noted herein that one or more features of the tag assembly 102 may be modified in order to more reliably attach the tag assembly 102 to various animals. The tag assembly 102 may be modified based on any number of factors including, but not limited to, the type of animal, expected weather conditions, expected wear and tear, desired duration of attachment, and the like. Similarly, tag assembly 102 may be modified in any number of ways including, but not limited to, altering the length of attachment assembly 206, altering the width of attachment assembly 206, modifying angle 212, modifying the shape of tag body 202, and the like.

Figure 3A:
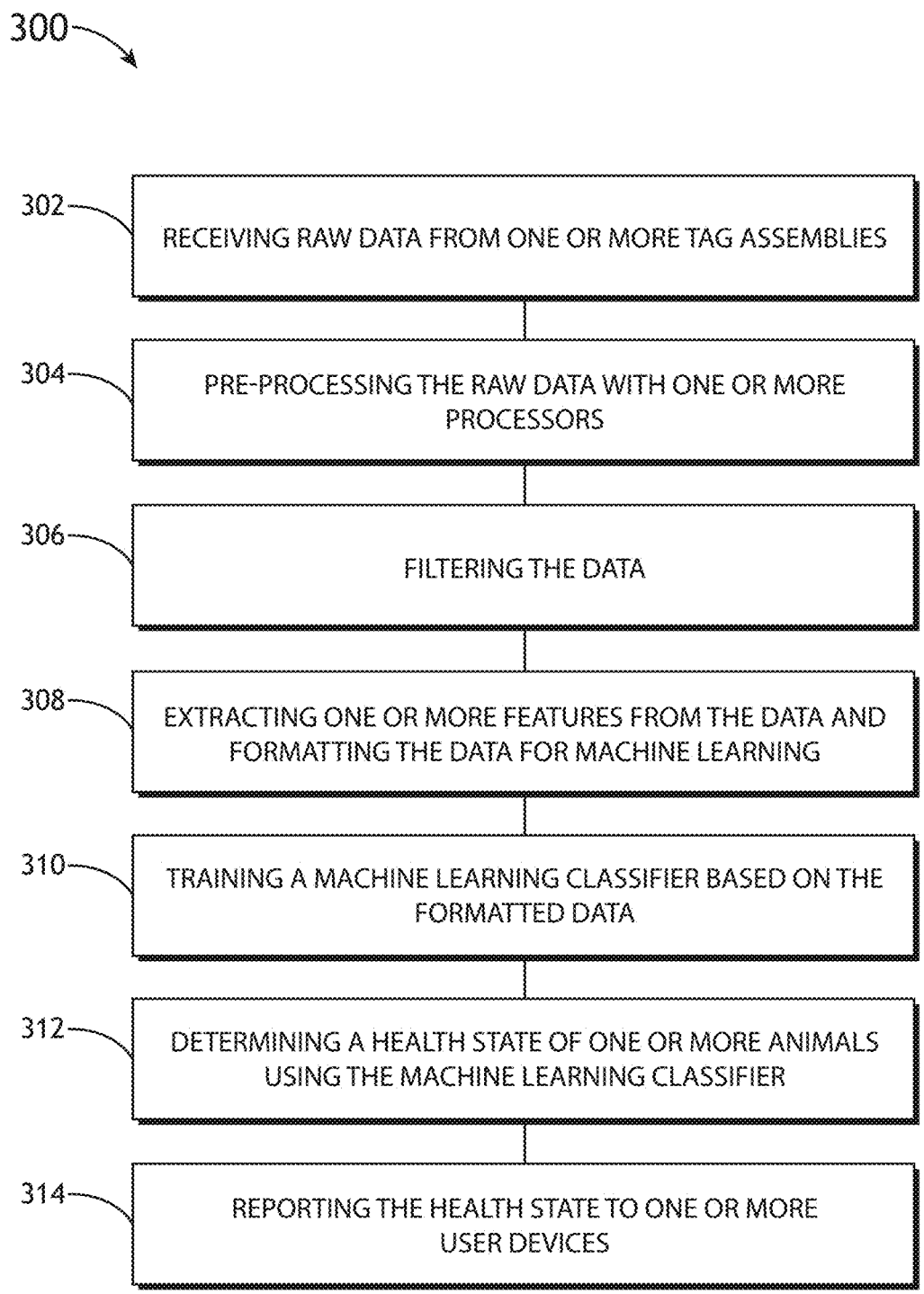
FIGS. 3A-3B illustrate flowcharts of a method for processing data associated with one or more members of an animal population with machine learning techniques, in accordance with one or more embodiments of the present disclosure.

FIG. 3A illustrates a flowchart of a method 300 for processing data associated with one or more members of an animal population with machine learning techniques, in accordance with one or more embodiments of the present disclosure. It is noted herein that the steps of method 300 may be implemented all or in part by system 100. It is further noted, however, that method 300 is not limited to the system 100 in that additional or alternative system-level embodiments may carry out all or part of the steps of method 300.

As shown in FIG. 3A, a method 300 may include receiving raw data from one or more tag assemblies in a step 302, pre-processing the raw data in a step 304, filtering the data in a step 306, extracting one or more features from the data and formatting the data for machine learning in a step 308, using the formatted data to train a machine learning classifier in step 310, and making one or more assessments and/or one or more predictions regarding the health state of one or more animals using machine learning in a step 312.

In a step 302, raw data is received from the one or more tag assemblies 102. It is noted that tag assembly 102 may collect and/or transmit raw data to the remote server 108 for any timeframe. For example, the remote server 108 may receive raw data from the tag assemblies 102 throughout the entire day or for a specified time period. It is further noted that data may be transmitted by tag assembly 102 and received by the remote server 108 at any interval known in the art including, but not limited to, specified intervals (e.g., every ten seconds, thirty seconds, one minute, and the like) random intervals, and the like. Furthermore, it is noted that the frequency at which one or more tag assemblies 102 may transmit data may be dependent upon the tag assemblies 102 ability to transmit data (e.g., within range of concentrator 104, free from terrestrial interference, and the like). In this regard, the data may be stored until the tag assembly 102 is back in range or otherwise able to transmit data. When the tag assembly 102 is able to transmit data, the data may then be transmitted to the concentrator 104, then to the remote server 108 via network 106. It is noted that data may be transmitted and/or collected using any interval other known in the art including, but not limited to, random intervals.

In a step 304, the raw data may be pre-processed by the one or more processors 130 of remote server 108. Pre-processing may include any statistical and/or ad hoc mathematical techniques known in the art in order to convert the raw data readings (e.g., temperature readings, heart rate readings, head tilt readings, movement readings, and the like) into a format which may be used for downstream data processing.

It is noted that pre-processing in step 304 may alter the raw data to be used for downstream statistical analysis, or may leave the raw data in substantially the same form in which it was collected. In this regard, it is noted that pre-processing in step 304 may be omitted from method 300 without departing from the spirit or scope of the present disclosure. In this regard, it is further noted that method 300 may omit any of the steps described herein, or may include additional steps, without departing from the spirit or scope of the present disclosure.

In a step 306, the data may be filtered. It is noted that step 306 may include any filtering techniques known in the art. For example, filtering the data may include filtering the data such that it only includes data for one animal, a group of animals, multiple groups of animals, and the like. In another embodiment, filtering the data may include filtering the data to include data only from a particular time period.

In a step 308, one or more features may be extracted from the filtered data, and the data may be formatted for machine learning. Feature extraction in step 308 may include any mathematical manipulation or transformation known in the art which will convert the data into a form which may be used by a machine learning classifier in step 310. Step 308 is illustrated in further detail in FIG. 3B.

Figure 3B:
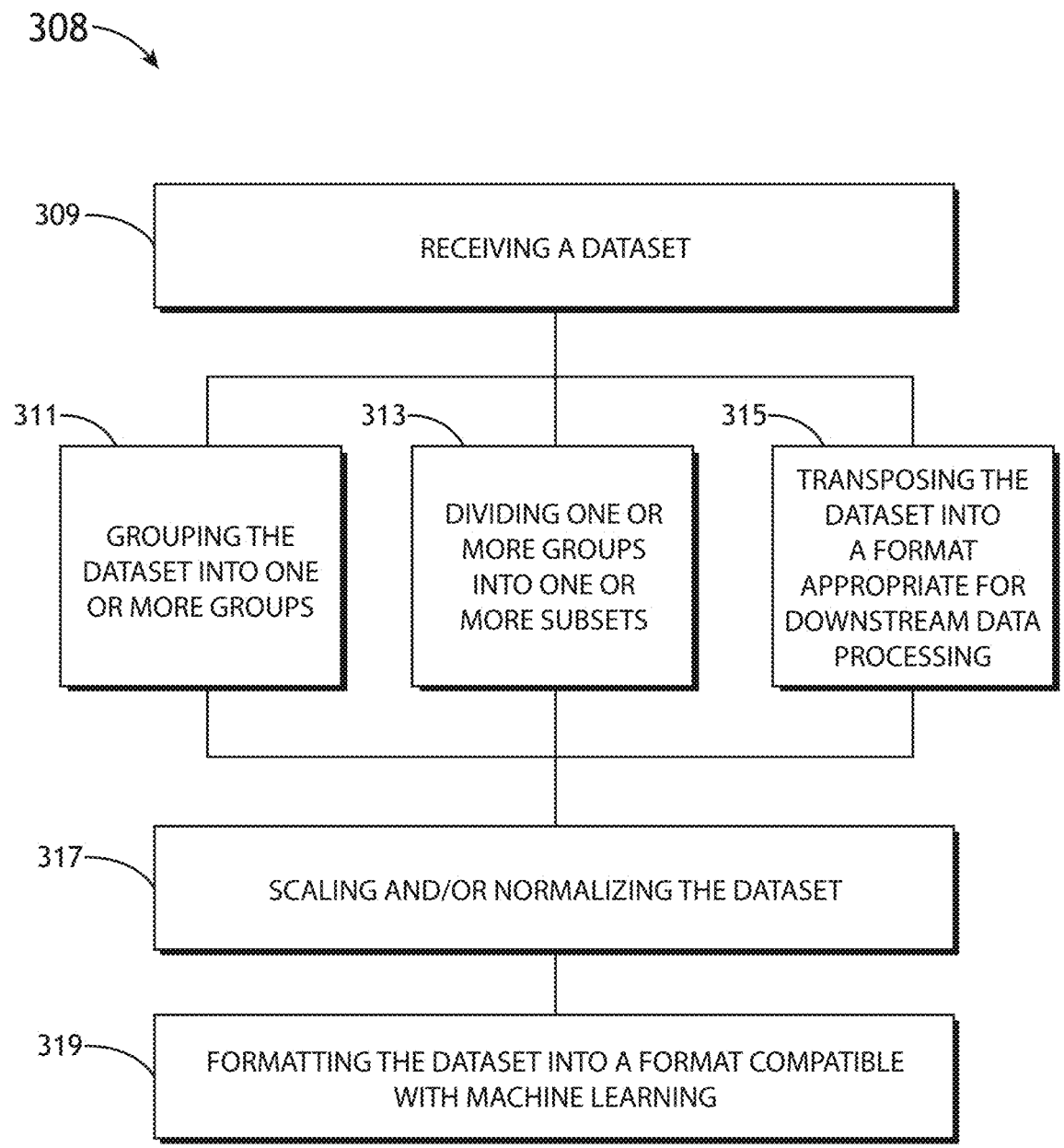

FIG. 3B depicts a flowchart illustrating the feature extraction of step 308, in accordance with one or more embodiments of the present disclosure.

In a step 309, feature extraction in step 308 may include receiving a filtered dataset from step 306. In a step 311, the dataset may be grouped into one or more groups. Similarly, in a step 313, one or more groups may be divided into one or more subsets. It is noted that the readings in the dataset may be broken into groups and subsets according to, but not limited to, timeframe, animal, group of animals, location, and the like.

In a step 315, the dataset may be transposed into a format appropriate for downstream data processing. For example, step 315 may include transposing the dataset into a format that allows for "time-series" consistent objects. In this regard, the dataset may be transposed such that the data is arranged and sorted according to time/space relationships.

In a step 317, the dataset may be scaled and or normalized. For example, the dataset may be scaled such that each set of data points relating to a physiological and/or behavioral characteristic has a mean of zero and a standard deviation one. By further way of example, the dataset may be normalized such that all values of the dataset are between zero and one. It is noted that scaling and normalizing in step 317 may be necessary for accurate machine learning assessments and predictions.

In a step 319, the dataset may be formatted into a format that is compatible with machine learning. It is noted that the formatting in step 319 may be dependent on the algorithms to be performed in the downstream data analysis (e.g., machine learning predictions). In this regard, the formatting in step 319 may be algorithm-specific, and may serve as a final tuning step in order to ensure compatibility with the algorithms to be used in the downstream machine learning.

Returning to FIG. 3A, in a step 310, a machine learning classifier is trained using the formatted data from step 308. In one embodiment, datasets taken from animals with known physiological and behavioral characteristics (e.g., known healthy physiological state, known bacterial infection, known viral infection, known normal behavior, and the like) may be used to train a machine learning classifier. For example, temperature readings, heart rate readings, movement readings, and the like, obtained from animals with healthy physiological states may be used to train the machine learning classifier. For instance, the remote server 108 of system 100 may be used to determine the standard deviation, median, average, minimum, and maximum readings (e.g., temperature readings, heart rate readings, movement readings, and the like) of a group of animals with known demographic information (e.g., known to be healthy, known to have a viral infection, known to have a bacterial infection). This information may then be used to generate a classifier. For instance, temperature readings above a certain temperature and movement readings below a certain level may be associated with an infected animal. In this regard, the classifier may be configured to generate a multi-variable correlation regarding the physiological state of a group of animals. The classifier, in turn, may then be used to classify the health status of additional animals in step 312.

In a step 312, a health state of one or more animals is determined using the machine learning classifier. In one embodiment, determining a health state of one or more animals may include making one or more assessments and/or one or more predictions regarding the health state of one or more animals.

In one embodiment, the machine learning classifier in step 312 may be configured to correlate multiple dataset characteristics to a particular health state. For example, the machine learning classifier may be able to correlate multiple physiological and/or behavior characteristics to a particular health state of an animal. In this regard, a multi-variable relationship between the health state of an animal and two or more physiological and/or behavior characteristics may be determined. For example, the classifier may be configured to relate the health state of one or more animals to two or more of temperature, heart rate, head tilt, feeding frequency, amount of movement (e.g., steps) and etc. For instance, a first head tilt value, a first temperature value and a first feeding frequency value may be associated with a "healthy" animal, while a second head tilt value, a second temperature value and a second feeding frequency value may be associated with an "unhealthy" animal. It is recognized that any of the measured characteristics described previously herein may be utilized in a multi-variable context to determine the health state of an animal. Again, in the event an unhealthy, or a potentially unhealthy, animal is identified, the remote server 108 may notify a user via user devices 112a or 112b that the animal is unhealthy or potentially unhealthy.

In one embodiment, machine learning in step 312 may be able to make several inferences regarding the data including, but not limited to, classification assignments, regression coefficients, behavioral predictions, health assessments, and the like. For example, if a machine learning classified received information regarding an animal's activity over the previous ten days, the machine learning classifier may be used to predict the animal's activity over the next ten days.

In a step 314, the health state is reported to one or more user devices. It is contemplated herein that producers and/or animal owners may utilize the reported health state (e.g., one or more assessments, predictions, and the like) to take one or more preventative and/or curative actions intended to improve the health state of the animal. Preventative and/or curative actions may include any actions known in the art including, but not limited to, limiting contact between the animal and other animals, administering a vaccine to the animal, administering an antibiotic to the animal, altering the animal's feeding regimen, culling the animal, and the like.

Figure 4A:
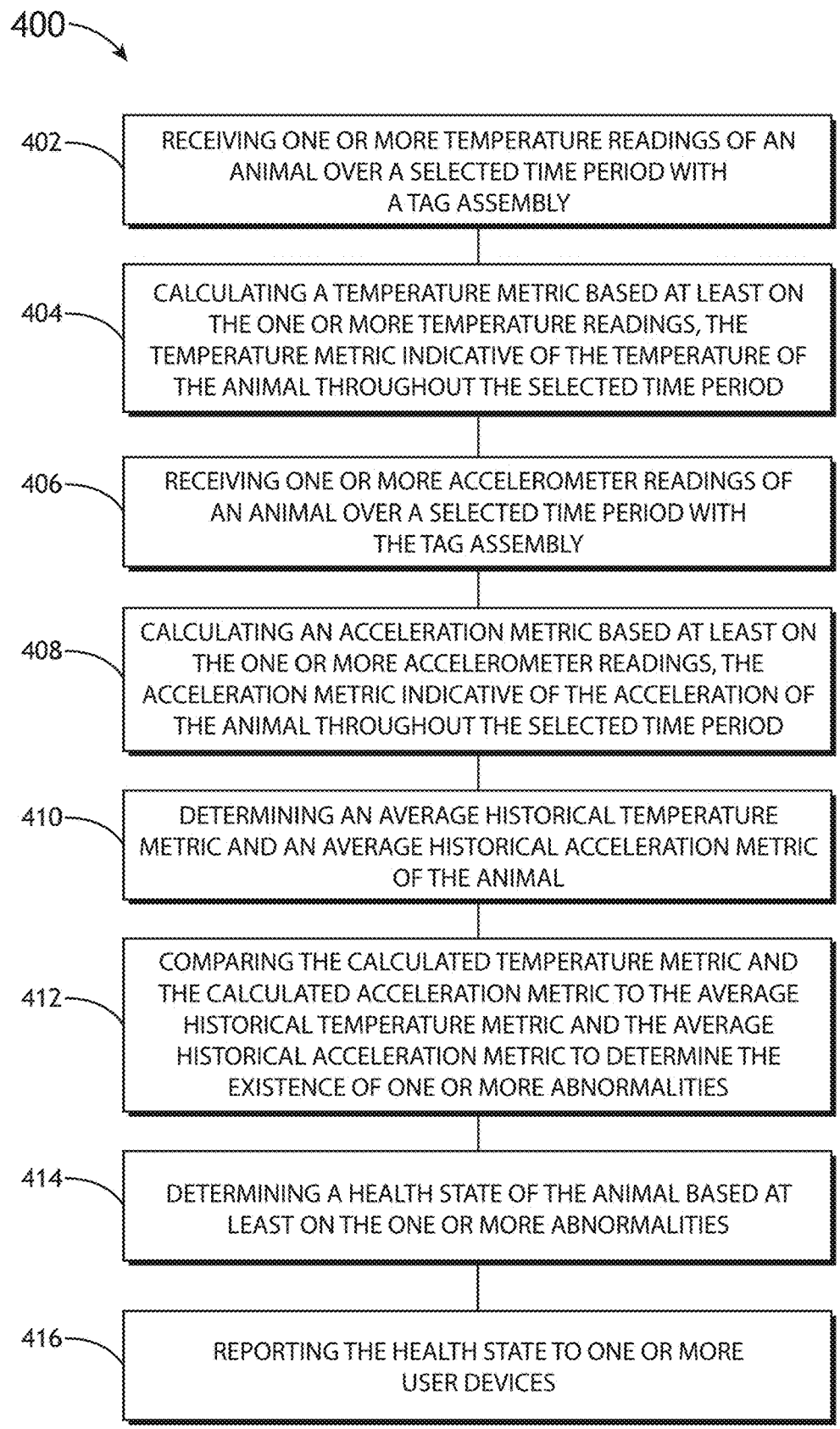
FIGS. 4A-4B illustrate flowcharts of methods for processing data associated with one or more members of an animal population, in accordance with one or more embodiments of the present disclosure.
Figure 4B:
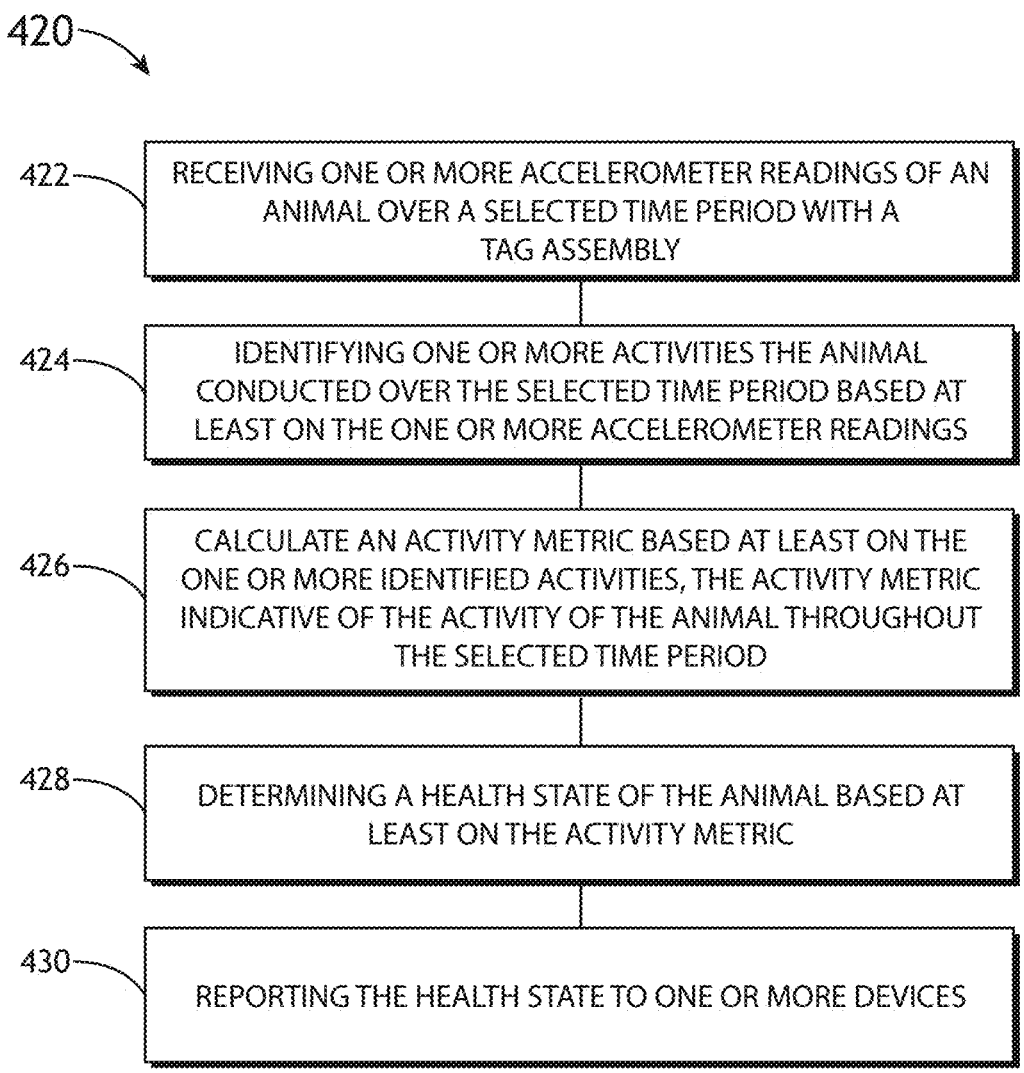

FIG. 4A illustrates a flowchart of a method 400 for processing data associated with one or more members of an animal population, in accordance with one or more embodiments of the present disclosure. It is noted herein that the steps of method 400 may be implemented all or in part by system 100. It is further noted, however, that method 400 is not limited to the system 100 in that additional or alternative system-level embodiments may carry out all or part of the steps of method 400.

In a step 402, one or more temperature readings of an animal are received by a tag assembly over a selected time period. By way of example, tag assembly 102 may collect temperature readings (e.g., raw data) for an animal over the course of an hour. The one or more temperature readings may include temperature readings at different locations including, but not limited to, an inner ear temperature (IET), ambient temperature near canal (ANC), ear surface temperature (EST), ambient local weather temperature, and the like.

As noted previously herein, one or more processors 116 of the tag assembly 102 may pre-process the received raw data (e.g., received temperature readings, received accelerometer readings, and the like). Pre-processing may include any statistical and/or ad hoc mathematical techniques known in the art in order to convert the raw data readings (e.g., temperature readings, accelerometer readings, heart rate readings, head tilt readings, movement readings, and the like) into a format which may be used for downstream data processing. Furthermore, any data processing steps may be carried out on any of the sub-systems of the present disclosure (e.g., tag assembly 102, concentrator 104, remote server 108, user device 110, and the like). For example, any of the data processing steps (e.g., calculation of temperature metrics, calculation of acceleration metrics, and the like) which are described as being carried out on the one or more processors 116 of the tag assembly 102 may additionally and/or alternatively be carried out by the one or more processors 130 of the remote server 108. By way of another example, some data processing steps may be carried out on the tag assembly 102, while other data processing steps may be carried out on the remote server 108. For instance, one or more data pre-processing steps may be carried out on the tag assembly 102, while the remaining data processing steps may be carried out on the remote server 108.

In a step 404, a temperature metric is determined based at least on the one or more temperature readings. In one embodiment, the temperature metric is indicative of the temperature of the animal throughout the selected time period. It is contemplated that the temperature metric may be determined using any mathematical formula or algorithm known in the art including, but not limited to, averages, sums, and the like. By way of example, the temperature metric may be determined by determining the average temperature reading over a selected time period. It is noted that a temperature metric which is wholly and/or partially based on an average may mitigate variance.

In a step 406, one or more accelerometer readings of an animal are received by a tag assembly over a selected time period. By way of example, tag assembly 102 may collect accelerometer readings (e.g., raw data) for an animal over the course of an hour. It is noted herein that the selected time period in step 406 may be the same or different from the selected time period in step 402.

In a step 408, an acceleration metric is determined based at least on the one or more accelerometer readings. In one embodiment, the acceleration metric is indicative of the acceleration of the animal throughout the selected time period. It is contemplated that the acceleration metric may be determined using any mathematical formula or algorithm known in the art including, but not limited to, averages, sums, and the like.

In a step 410, an average historical temperature metric and an average historical acceleration metric of the animal are determined. In one embodiment, animal's average historical temperature and acceleration metrics may be determined as an average for the same selected time period for which the one or more temperature and acceleration metrics are being collected. For instance, if system 100 collects temperature readings and determines a temperature metric for the animal for an hour between 4 PM and 5 PM, step 410 may include determining the animal's average historical temperature metric between the times of 4 PM and 5 PM. In additional and/or alternative embodiments, step 410 may include determining an average historical temperature metric and an average historical acceleration metric of a different animal, or a group of animals, of an animal population, and the like.

In a step 412, the calculated temperature metric and the calculated acceleration metric are compared to the average historical temperature metric and the average historical acceleration metric to determine the existence of one or more abnormalities. In additional and/or alternative embodiments, step 412 may include comparing calculated metrics of the animal to average historical metrics of another animal, of other groups of animals, of animal populations, and the like, as discussed previously herein.

In step 414, a health state of the animal is determined based at least on the one or more abnormalities. In one embodiment, the determined health state includes one or more assessments and/or one or more predictions regarding the health state of the animal. For example, if the animal's calculated temperature metric is higher than the animal's average historical temperature metric for that selected time period, this may indicate the animal is suffering from a particular health defect.

In a step 428, the determined health state is reported to one or more user devices. It is contemplated herein that producers and/or animal owners may utilize the one or more reported health states to take one or more preventative and/or curative actions intended to improve the health state of the animal. Preventative and/or curative actions may include any actions known in the art including, but not limited to, limiting contact between the animal and other animals, administering a vaccine to the animal, administering an antibiotic to the animal, altering the animal's feeding regimen, culling the animal, and the like.

FIG. 4A illustrates a flowchart of a method 420 for processing data associated with one or more members of an animal population, in accordance with one or more embodiments of the present disclosure. It is noted herein that the steps of method 420 may be implemented all or in part by system 100. It is further noted, however, that method 400 is not limited to the system 100 in that additional or alternative system-level embodiments may carry out all or part of the steps of method 420. Lastly, it is noted herein that method 420 may be implemented in addition to the steps of method 400, or in alternative to one or more steps of method 400.

In a step 422, one or more accelerometer readings of an animal are received by a tag assembly over a selected time period. By way of example, tag assembly 102 may collect accelerometer readings (e.g., raw data) for an animal over the course of an hour. It is noted herein that the selected time period in step 406 may be the same or different from the selected time period in step 402.

In a step 424, one or more activities the animal conducted over the selected time period are identified based at least on the one or more accelerometer readings. By way of example, as noted previously herein, specific time sequences of peaks and valleys in Z-axis acceleration readings ($a_z$) may indicate that the animal is feeding. Similarly, specific time sequences of acceleration patterns may indicate that the animal is walking, coughing, standing, laying, or the like.

In a step 426, an activity metric is calculated based at least on the one or more identified activities. The activity metric may be indicative of the activity of the animal throughout the selected time period. By way of example, if it were identified that an animal walked and/or ate for the majority of a selected time period, system 100 may calculate a relatively high activity metric for the animal for that selected time period. By way of another example, if it were identified that an animal was laying down for the majority of a selected time period, system 100 may calculate a relatively low activity metric for the animal for that selected time period.

In step 428, a health state of the animal is determined based at least on the activity metric. By way of example, a health state may be determined by comparing the calculated activity metric to one or more values including, but not limited to, an average historical activity metric for the animal, an average historical activity metric for another animal, an average historical activity metric for an animal population, standard activity metric characteristics for the type of animal, and the like.

In a step 430, the determined health state is reported to one or more user devices. It is contemplated herein that producers and/or animal owners may utilize the one or more reported health states to take one or more preventative and/or curative actions intended to improve the health state of the animal. Preventative and/or curative actions may include any actions known in the art including, but not limited to, limiting contact between the animal and other animals, administering a vaccine to the animal, administering an antibiotic to the animal, altering the animal's feeding regimen, culling the animal, and the like.

Figure 5:
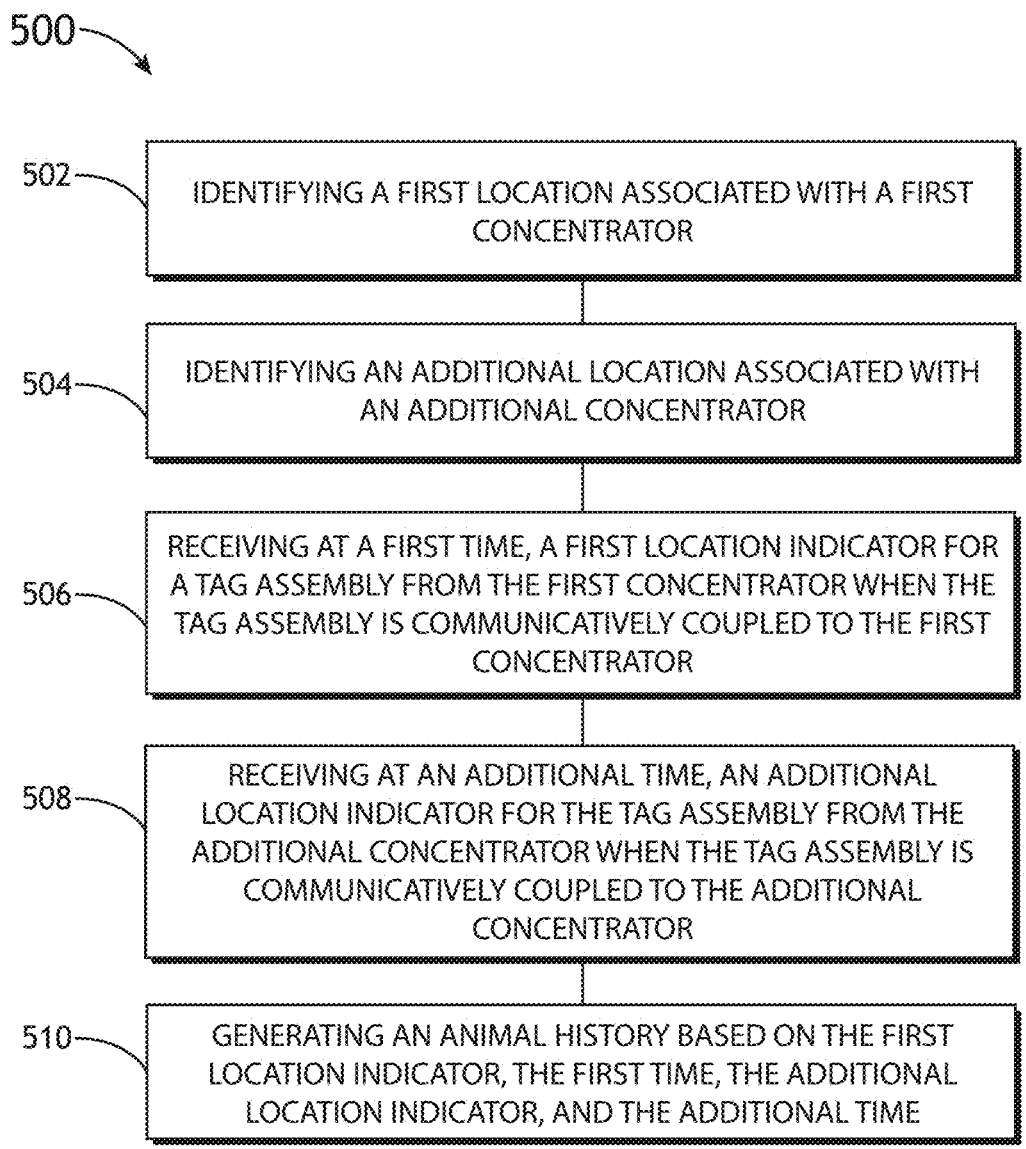
FIG. 5 illustrates a flowchart of a method for processing data associated with one or more members of an animal population, in accordance with one or more embodiments of the present disclosure.

FIG. 5 illustrates a flowchart of a method 500 for processing data associated with one or more members of an animal population, in accordance with one or more embodiments of the present disclosure. It is noted herein that the steps of method 500 may be implemented all or in part by system 100. It is further noted, however, that method 500 is not limited to the system 100 in that additional or alternative system-level embodiments may carry out all or part of the steps of method 500.

In a step 502, a first location associated with a first concentrator is identified. For example, remote server 108 of system 100 may identify a location of a first concentrator 104*a* via a GPS chip 128 located on the first concentrator 104*a*. For instance, the remote server 108 may identify that the fist concentrator 104*a* is located on a first feed lot.

In a step 504, an additional location associated with an additional concentrator is identified. For example, remote server 108 of system 100 may identify a location of a second concentrator 104*b* via a GPS chip 128 located on the second concentrator 104*b*. For instance, the remote server 108 may identify that the fist concentrator 104*a* is located on a second feed lot. It is noted herein that system 100 and/or method 500 may include any number of concentrators 104*n*. For example, as noted with respect to FIG. 1C, a first concentrator 104*a* may be located on a first feed lot, a second concentrator 104*b* may be located on a second feed lot, and a third concentrator 104*c* may be located at a packing facility. It is contemplated that every location and/or facility involved in the animal production process may be equipped with at least one concentrator 104 such that animals may be fully "traced" through the animal production process.

In a step 506, at a first time, a first location indicator for a tag assembly is received from the first concentrator when the tag assembly is communicatively coupled to the first concentrator. For example, when tag assembly 102 is communicatively coupled to the first concentrator 104*a*, the first concentrator 104*a* may transmit a location indicator to remote server 108, indicating that the first concentrator 104*a* and the tag assembly 102 are communicatively coupled. In one embodiment, the location indicators transmitted by concentrators 104 are time-stamped. Concentrators 104 may periodically and/or continuously transmit location indicators to remote server 108 indicating that the tag assembly 102 is communicatively coupled to the respective concentrator 104. In another embodiment, because the remote server 108 may identify the location of the first concentrator 104*a* (step 502), and because the first location indicator may indicate that the first concentrator 104*a* and the tag assembly 102 are communicatively coupled, the remote server 108 may be configured to determine that the tag assembly 102 is in a location proximate to the first concentrator 104*a*.

In a step 508, at an additional time, an additional location indicator for the tag assembly is received from the additional concentrator when the tag assembly is communicatively coupled to the additional concentrator. For example, when tag assembly 102 is communicatively coupled to the second concentrator 104*b*, the second concentrator 104*b* may transmit a location indicator to remote server 108, indicating that the second concentrator 104*b* and the tag assembly 102 are communicatively coupled. Furthermore, because the remote server 108 may identify the location of the second concentrator 104*b* (step 504), and because the second location indicator may indicate that the second concentrator 104*b* and the tag assembly 102 are communicatively coupled, the remote server 108 may be configured to determine that the tag assembly 102 is in a location proximate to the second concentrator 104*b*.

In a step 510, an animal history is generated. In one embodiment, the animal history is based at least on the first location indicator, the first time, the additional location indicator, and the additional time. Due to the fact that each location indicator may be time-stamped, the animal history for the tag assembly 102 may represent a time-stamped location history for the animal (tag assembly 102) as the animal is moved throughout the animal production process. In one embodiment, the animal history may be reported via user device 110.

All of the embodiments described herein may include storing results of one or more steps in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed:

1. A system for monitoring one or more characteristics in an animal population, comprising:
    a concentrator communicatively couplable to a plurality of animal tag assemblies, each animal tag assembly configured for being disposed on an animal of the animal population, each of the animal tag assemblies including one or more sensors configured to measure one or more animal characteristics of the animal of the animal population, wherein the concentrator is configured to acquire the one or more animal characteristics from the plurality of animal tag assemblies; and
    a remote server communicatively coupled to the concentrator, wherein the remote server includes one or more processors configured to execute a set of program instructions stored in memory and configured to cause the remote server to:
        train a machine learning classifier based on data from the plurality of animal tag assemblies associated with one or more animals having a known health state;
        receive data from the plurality of animal tag assemblies, the data indicative of two or more animal characteristics of one or more animals of the animal population;
        assign one or more health states to one or more animals of the animal population with the machine learning classifier based on at least the data received from the plurality of animal tag assemblies, wherein the one or more health states comprise at least one of a healthy state, a sick state, a diseased state, or an injured state; and
        report the determined health state to one or more user devices.

2. The system of claim 1, wherein the assign one or more health states to one or more animals of the animal population is also based on a multi-variable correlation between at least two of the two or more animal characteristics derived from at least the data received from the plurality of animal tag assemblies.

3. The system of claim 1, wherein the assign one or more health states to one or more animals of the animal population also comprises:
    calculating a temperature metric of the animal for a selected time period, where the temperature metric is indicative of the animal's temperature throughout the selected time period;
    calculating an acceleration metric of the animal over the selected time period where the acceleration metric is indicative of the animal's acceleration throughout the selected time period;
    determining an average historical temperature metric and an average historical acceleration metric of the animal;

comparing the calculated temperature metric and the calculated acceleration metric to the average historical temperature metric and the average historical acceleration metric to determine the existence of one or more abnormalities; and wherein the assign one or more health states to one or more animals of the animal population is also based on at least one of the one or more abnormalities.

4. The system of claim 1, wherein the plurality of animal tag assemblies include a first animal tag assembly and at least a second animal tag assembly, wherein the first animal tag assembly is configured for being disposed on a first animal of the animal population and the at least a second animal tag assembly is configured for being disposed on at least a second animal of the animal population.

5. The system of claim 4, wherein the first animal tag assembly includes one or more sensors configured to measure one or more animal characteristics of the first animal of the animal population and at least a second animal tag assembly includes one or more sensors configured to measure one or more animal characteristics of the at least a second animal of the animal population.

6. The system of claim 1, wherein one or more animal tag assemblies of the plurality of animal tag assemblies include a plurality of sensors.

7. The system of claim 6, wherein the plurality of sensors includes one or more temperature sensors configured to measure at least one of an inner ear temperature, or an ear surface temperature.

8. The system of claim 1, wherein the remote server is further configured to receive local weather data for a location associated with the concentrator.

9. The system of claim 6, wherein the plurality of sensors further includes an inertial measurement unit.

10. The system of claim 1, wherein one or more animal tag assemblies of the plurality of the animal tag assemblies comprise:
one or more animal ear tag assemblies.

11. The system of claim 1, wherein the assign one or more health states to one or more animals of the animal population also comprises:
comparing the received data indicative of one or more animal characteristics of one or more animals of the animal population to a set of standardized characteristics associated with the two or more animal characteristics to determine the existence of one or more abnormalities; and
wherein the assign one or more health states to one or more animals of the animal population is also based on at least one the one or more abnormalities.

12. The system of claim 1, wherein the one or more animal characteristics comprise:
at least one of a physiological characteristic or a behavioral characteristic.

13. The system of claim 12, wherein the physiological characteristic comprises:
at least one of a temperature or a heart rate.

14. The system of claim 12, wherein the behavioral characteristic comprises:
at least one of a position characteristic, an activity characteristic, or a posture characteristic.

15. The system of claim 14, wherein the posture characteristic comprises:
a head tilt measurement.

16. The system of claim 1, wherein the animal population comprises:
at least one of a population of livestock, a population of horses, a population of pet animals, a population of zoo animals, a population of wild animals, or a population of humans.

17. The system of claim 1, wherein the one or more user devices comprise:
at least one of a laptop, a smartphone, a tablet, or a wearable device.

18. The system of claim 1, wherein the particular animal tag assembly is configured to transmit a provisioning packet to the concentrator in a provisioning time slot and wherein the concentrator is configured to transmit an allotted data timeslot to the particular tag in response to receiving the provisioning packet, wherein the particular tag is configured to transmit one or more signals indicative of the one or more animal characteristics to the concentrator at a time corresponding to the allotted data timeslot received from the concentrator.

19. The system of claim 2, wherein the data from the plurality of animal tag assemblies comprises raw data, wherein the assign one or more health states to one or more animals of the animal population based on the multi-variable correlation between at least two of the two or more animal characteristics derived from at least the data received from the plurality of animal tag assemblies comprises:
assign one or more health states to one or more animals of the animal population based on a multi-variable correlation between at least two of the two or more animal characteristics derived from at least the raw data received from the plurality of animal tag assemblies.

20. The system of claim 1, further comprising:
training the machine learning classifier with at least the data from the animal tag assemblies.

21. The system of claim 2, wherein the data from the plurality of animal tag assemblies comprises raw data, wherein the assign one or more health states to one or more animals of the animal population based on the multi-variable correlation between at least two of the two or more animal characteristics derived from at least the data received from the plurality of animal tag assemblies comprises:
pre-processing the raw data into a format suitable for machine learning; and
assign one or more health states to one or more animals of the animal population based on a multi-variable correlation between at least two of the two or more animal characteristics derived from at least the pre-processed data.

22. The system of claim 21, further comprising:
filtering the pre-processed data based on at least one of a selected animal of the animal population, a selected group of animals of the animal population, or a selected time period prior to the assign one or more health states to one or more animals of the animal population based on the multi-variable correlation between at least two of the two or more animal characteristics derived from at least the pre-processed data.

23. The system of claim 1, wherein the data received from the plurality of animal tag assemblies comprises at least temperature data and acceleration data.

24. The system of claim 1, further comprising:
predicting one or more future health states of one or more animals of the animal population based on the two or more animal characteristics derived from at least the data received from the plurality of animal tag assemblies.

* * * * *